US007206646B2

(12) United States Patent
Nixon et al.

(10) Patent No.: US 7,206,646 B2
(45) Date of Patent: Apr. 17, 2007

(54) METHOD AND APPARATUS FOR PERFORMING A FUNCTION IN A PLANT USING PROCESS PERFORMANCE MONITORING WITH PROCESS EQUIPMENT MONITORING AND CONTROL

(75) Inventors: Mark J. Nixon, Round Rock, TX (US); Marion A. Keyes, IV, St. Louis, MO (US); Trevor D. Schleiss, Austin, TX (US); John A. Gudaz, Bel Air, MD (US); Terrence L. Blevins, Round Rock, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 261 days.

(21) Appl. No.: 09/953,811

(22) Filed: Sep. 17, 2001

(65) Prior Publication Data

US 2002/0077711 A1 Jun. 20, 2002

Related U.S. Application Data

(63) Continuation-in-part of application No. 09/707,580, filed on Nov. 7, 2000, now Pat. No. 6,774,786, and a continuation-in-part of application No. 09/256,585, filed on Feb. 22, 1999, now Pat. No. 6,298,454.

(60) Provisional application No. 60/273,164, filed on Mar. 1, 2001.

(51) Int. Cl.
*G06F 15/00* (2006.01)
*G06F 11/30* (2006.01)

(52) U.S. Cl. .................... 700/83; 700/79; 702/182

(58) Field of Classification Search ............... 700/108, 700/79, 83, 17, 49; 702/183, 184, 182; 340/511
See application file for complete search history.

(56) References Cited

U.S. PATENT DOCUMENTS 3,096,434 A 7/1963 King .......................... 235/151

(Continued)

FOREIGN PATENT DOCUMENTS

CN 1007757 B 4/1990

(Continued)

OTHER PUBLICATIONS

U.S. Appl. No. 09/151,084 entitled "A Shadow Function Block Interface for Use in a Process Control Network," filed on Sep. 10, 1998.

(Continued)

*Primary Examiner*—Jungwon Chang
(74) *Attorney, Agent, or Firm*—Marshall, Gerstein & Borun LLP

(57) ABSTRACT

A process control system uses a data collection and distribution system and an asset utilization suite to collect data or information pertaining to the assets of a process plant from various sources or functional areas of the plant including, for example, the process control functional areas, the maintenance functional areas and the process performance monitoring functional areas. This data and information is manipulated in a coordinated manner by the data collection and distribution system and is redistributed to other applications where this it is used to perform overall better or more optimal control, maintenance and business activities. Information or data may be collected by maintenance functions pertaining to the health, variability, performance or utilization of a device, loop, unit, area, etc. and this information may then be sent to and displayed to a process operator or maintenance person to inform that person of a current or future problem. A user interface is provided that enables users to access and manipulate the expert engine to optimize plant operation or cause optimization of plant operation, to get information about the operation of the plant, etc. Furthermore, applications, such as work order generation applications may automatically generate work orders, parts or supplies orders, etc. based on events occurring within the plant.

43 Claims, 17 Drawing Sheets

U.S. PATENT DOCUMENTS

| | | | |
|---|---|---|---|
| 3,404,264 A | 10/1968 | Kugler | 235/194 |
| 3,701,280 A | 10/1972 | Stroman | 73/194 |
| 3,705,516 A | 12/1972 | Reis | |
| 3,981,836 A | 9/1976 | Pangle, Jr. et al. | 524/549 |
| RE29,383 E | 9/1977 | Gallatin et al. | 137/14 |
| 4,058,275 A | 11/1977 | Banks et al. | 244/3.15 |
| 4,099,413 A | 7/1978 | Ohte et al. | 374/175 |
| 4,322,976 A | 4/1982 | Sisson et al. | 73/659 |
| 4,337,516 A | 6/1982 | Murphy et al. | 364/551 |
| 4,408,285 A | 10/1983 | Sisson et al. | 364/508 |
| 4,425,798 A | 1/1984 | Nagai et al. | 73/659 |
| 4,435,770 A | 3/1984 | Shiohata et al. | 364/508 |
| 4,493,042 A | 1/1985 | Shima et al. | 364/507 |
| 4,517,468 A | 5/1985 | Kemper et al. | |
| 4,527,271 A | 7/1985 | Hallee et al. | |
| 4,530,234 A | 7/1985 | Cullick et al. | 73/53 |
| 4,607,325 A | 8/1986 | Horn | |
| 4,635,214 A | 1/1987 | Kasai et al. | 364/551 |
| 4,642,782 A | 2/1987 | Kemper et al. | 364/550 |
| 4,644,478 A | 2/1987 | Stephens et al. | 364/550 |
| 4,644,749 A | 2/1987 | Somes | 60/459 |
| 4,649,515 A | 3/1987 | Thompson et al. | 364/900 |
| 4,657,179 A | 4/1987 | Aggers et al. | |
| 4,683,542 A | 7/1987 | Taniguti | 364/508 |
| 4,707,796 A | 11/1987 | Calabro et al. | 364/552 |
| 4,734,873 A | 3/1988 | Malloy et al. | |
| 4,758,964 A | 7/1988 | Bittner et al. | 364/508 |
| 4,763,243 A | 8/1988 | Barlow et al. | |
| 4,764,862 A | 8/1988 | Barlow et al. | |
| 4,777,585 A | 10/1988 | Kokawa et al. | 364/164 |
| 4,819,233 A | 4/1989 | Delucia et al. | 371/19 |
| 4,831,564 A | 5/1989 | Suga | 364/999.999 |
| 4,843,557 A | 6/1989 | Ina et al. | 364/999.999 |
| 4,853,175 A | 8/1989 | Book | 376/216 |
| 4,873,655 A | 10/1989 | Kondraske | 364/553 |
| 4,885,694 A | 12/1989 | Pray et al. | |
| 4,885,707 A | 12/1989 | Nichol et al. | 364/999.999 |
| 4,907,167 A | 3/1990 | Skeirik | |
| 4,910,691 A | 3/1990 | Skeirik | |
| 4,922,412 A | 5/1990 | Lane et al. | 364/157 |
| 4,924,418 A | 5/1990 | Bachman et al. | 364/550 |
| 4,934,196 A | 6/1990 | Romano | 73/999.999 |
| 4,942,514 A | 7/1990 | Miyagaki et al. | 364/190 |
| 4,944,035 A | 7/1990 | Aagardl et al. | |
| 4,956,793 A | 9/1990 | Bonne et al. | |
| 4,964,125 A | 10/1990 | Kim | 371/20 |
| 4,965,742 A | 10/1990 | Skeirik | |
| 4,980,844 A | 12/1990 | Demjanenko et al. | 364/550 |
| 4,992,965 A | 2/1991 | Holter et al. | 364/999.999 |
| 5,005,142 A | 4/1991 | Lipchak et al. | 354/550 |
| 5,006,992 A | 4/1991 | Skeirik | |
| 5,008,810 A | 4/1991 | Kessel et al. | |
| 5,015,934 A | 5/1991 | Holley et al. | |
| 5,018,215 A | 5/1991 | Nasr et al. | |
| 5,043,862 A | 8/1991 | Takahashi et al. | 364/162 |
| 5,043,863 A | 8/1991 | Bristol et al. | |
| 5,050,095 A | 9/1991 | Samad | |
| 5,053,815 A | 10/1991 | Wendell | 355/208 |
| 5,070,458 A | 12/1991 | Gilmore et al. | |
| 5,081,598 A | 1/1992 | Bellows et al. | 364/513 |
| 5,089,978 A | 2/1992 | Lipner et al. | 364/999.999 |
| 5,089,984 A | 2/1992 | Struger et al. | 364/200 |
| 5,094,107 A | 3/1992 | Schoch | 73/570 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 364/513 |
| 5,121,467 A | 6/1992 | Skeirik | |
| 5,122,976 A | 6/1992 | Bellows et al. | 364/550 |
| 5,130,936 A | 7/1992 | Sheppard et al. | 364/999.999 |
| 5,134,574 A | 7/1992 | Beaverstock et al. | |
| 5,140,530 A | 8/1992 | Guha et al. | |
| 5,142,612 A | 8/1992 | Skeirik | |
| 5,148,378 A | 9/1992 | Shibayama et al. | 364/999.999 |
| 5,161,013 A | 11/1992 | Rylander et al. | |
| 5,167,009 A | 11/1992 | Skeirik | |
| 5,175,678 A | 12/1992 | Frerichs et al. | 364/148 |
| 5,187,674 A | 2/1993 | Bonne | |
| 5,193,143 A | 3/1993 | Kaemmerer et al. | |
| 5,197,114 A | 3/1993 | Skeirik | |
| 5,197,328 A | 3/1993 | Fitzgerald | 73/168 |
| 5,200,028 A | 4/1993 | Tatsumi | 156/656 |
| 5,200,958 A | 4/1993 | Hamilton et al. | 371/16.4 |
| 5,210,704 A | 5/1993 | Husseiny | 364/999.999 |
| 5,212,765 A | 5/1993 | Skeirik | |
| 5,214,582 A | 5/1993 | Gray | 364/999.999 |
| 5,224,203 A | 6/1993 | Skeirik | |
| 5,228,780 A | 7/1993 | Shepard et al. | 374/175 |
| 5,235,527 A | 8/1993 | Ogawa et al. | 364/999.999 |
| 5,251,151 A | 10/1993 | Demjanenko et al. | 364/550 |
| 5,265,031 A | 11/1993 | Malczewski | 364/497 |
| 5,265,222 A | 11/1993 | Nishiya et al. | 395/3 |
| 5,274,572 A | 12/1993 | O'Neill et al. | 364/550 |
| 5,282,131 A | 1/1994 | Rudd et al. | 364/164 |
| 5,282,261 A | 1/1994 | Skeirik | |
| 5,291,190 A | 3/1994 | Scarola et al. | |
| 5,293,585 A | 3/1994 | Morita | 395/52 |
| 5,301,101 A | 4/1994 | MacArthur et al. | |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,311,447 A | 5/1994 | Bonne | |
| 5,311,562 A | 5/1994 | Palusamy | 376/215 |
| 5,315,521 A | 5/1994 | Hanson et al. | 364/468 |
| 5,317,520 A | 5/1994 | Castle | 364/482 |
| 5,325,522 A | 6/1994 | Vaughn | 364/600 |
| 5,327,357 A | 7/1994 | Feinstein et al. | 364/502 |
| 5,329,443 A | 7/1994 | Bonaquist et al. | 364/153 |
| 5,333,240 A | 7/1994 | Matsumoto et al. | 395/23 |
| 5,333,298 A | 7/1994 | Bland et al. | |
| 5,347,449 A | 9/1994 | Meyer et al. | 364/185 |
| 5,349,541 A | 9/1994 | Alexandro, Jr. et al. | 364/578 |
| 5,351,184 A | 9/1994 | Lu et al. | |
| 5,353,207 A | 10/1994 | Keeler et al. | |
| 5,353,315 A | 10/1994 | Scarola et al. | 376/259 |
| 5,361,612 A | 11/1994 | Voiculescu et al. | 70/241 |
| 5,369,599 A | 11/1994 | Sadjadi et al. | |
| 5,373,452 A | 12/1994 | Guha | |
| 5,384,698 A | 1/1995 | Jelinek | |
| 5,384,699 A | 1/1995 | Levy et al. | 364/999.999 |
| 5,386,373 A | 1/1995 | Keeler et al. | 364/577 |
| 5,390,287 A | 2/1995 | Obata | 395/67 |
| 5,390,326 A | 2/1995 | Shah | |
| 5,394,341 A | 2/1995 | Kepner | 364/999.999 |
| 5,394,543 A | 2/1995 | Hill et al. | 395/575 |
| 5,396,415 A | 3/1995 | Konar et al. | |
| 5,398,303 A | 3/1995 | Tanaka | |
| 5,400,246 A | 3/1995 | Wilson et al. | 364/146 |
| 5,404,064 A | 4/1995 | Mermelstein et al. | 310/319 |
| 5,408,406 A | 4/1995 | Mathur et al. | |
| 5,408,586 A | 4/1995 | Skeirik | 395/23 |
| 5,414,645 A | 5/1995 | Hirano | 364/999.999 |
| 5,419,197 A | 5/1995 | Ogi et al. | 73/659 |
| 5,430,642 A | 7/1995 | Nakajima et al. | 364/148 |
| 5,440,478 A | 8/1995 | Fisher et al. | 364/188 |
| 5,442,544 A | 8/1995 | Jelinek | |
| 5,461,570 A | 10/1995 | Wang et al. | 364/468 |
| 5,467,355 A | 11/1995 | Umeda et al. | 371/29.1 |
| 5,469,735 A | 11/1995 | Watanabe | 73/118.1 |
| 5,483,387 A | 1/1996 | Bauhahn et al. | 359/885 |
| 5,485,753 A | 1/1996 | Burns et al. | 73/720 |
| 5,486,920 A | 1/1996 | Killpatrick et al. | |
| 5,486,996 A | 1/1996 | Samad et al. | |
| 5,488,697 A | 1/1996 | Kaemmerer et al. | |

| Patent No. | Date | Inventor | Class |
|---|---|---|---|
| 5,489,831 A | 2/1996 | Harris | 318/701 |
| 5,499,188 A | 3/1996 | Kline, Jr. et al. | 364/468 |
| 5,500,941 A | 3/1996 | Gil | 395/183.14 |
| 5,511,004 A | 4/1996 | Dubost et al. | 364/999.999 |
| 5,511,442 A | 4/1996 | Tame | 74/502.6 |
| 5,521,814 A * | 5/1996 | Teran et al. | 700/266 |
| 5,521,842 A | 5/1996 | Yamada | 364/999.999 |
| 5,528,510 A | 6/1996 | Kraft | 364/488 |
| 5,533,413 A | 7/1996 | Kobayashi | 73/865.9 |
| 5,537,310 A | 7/1996 | Tanake et al. | |
| 5,541,833 A | 7/1996 | Bristol et al. | |
| 5,546,301 A | 8/1996 | Agrawal et al. | |
| 5,548,528 A | 8/1996 | Keeler et al. | 364/497 |
| 5,559,690 A | 9/1996 | Keeler et al. | |
| 5,561,599 A | 10/1996 | Lu | |
| 5,566,065 A | 10/1996 | Hansen et al. | |
| 5,570,282 A | 10/1996 | Hansen et al. | |
| 5,570,300 A | 10/1996 | Henry et al. | 364/999.999 |
| 5,572,420 A | 11/1996 | Lu | |
| 5,574,638 A | 11/1996 | Lu | |
| 5,586,066 A | 12/1996 | White et al. | 364/576 |
| 5,596,704 A | 1/1997 | Geddes et al. | |
| 5,598,521 A | 1/1997 | Kilgore et al. | 395/155 |
| 5,600,148 A | 2/1997 | Cole et al. | 250/495.1 |
| 5,602,757 A | 2/1997 | Haseley et al. | 364/999.999 |
| 5,602,761 A | 2/1997 | Spoerre et al. | 364/554 |
| 5,604,914 A | 2/1997 | Kabe | 395/800 |
| 5,610,339 A | 3/1997 | Haseley et al. | 73/660 |
| 5,623,598 A | 4/1997 | Voigt et al. | 395/184.01 |
| 5,625,574 A | 4/1997 | Griffiths et al. | 364/550 |
| 5,631,825 A * | 5/1997 | van Weele et al. | 700/83 |
| 5,640,491 A | 6/1997 | Bhat et al. | |
| 5,640,493 A | 6/1997 | Skeirik | 395/23 |
| 5,646,350 A | 7/1997 | Robinson et al. | 73/602 |
| 5,666,297 A | 9/1997 | Britt et al. | |
| 5,671,335 A | 9/1997 | Davis et al. | 395/23 |
| 5,671,351 A | 9/1997 | Wild et al. | 395/183.14 |
| 5,675,504 A | 10/1997 | Serodes et al. | 364/496 |
| 5,680,409 A | 10/1997 | Qin et al. | 371/48 |
| 5,682,309 A | 10/1997 | Bartusiak et al. | 364/149 |
| 5,687,090 A | 11/1997 | Chen et al. | |
| 5,691,895 A * | 11/1997 | Kurtzberg et al. | 700/29 |
| 5,692,158 A | 11/1997 | Degeneff et al. | |
| 5,698,788 A | 12/1997 | Mol et al. | 73/659 |
| 5,704,011 A | 12/1997 | Hansen et al. | |
| 5,715,158 A | 2/1998 | Chen | |
| 5,729,661 A | 3/1998 | Keeler et al. | |
| 5,740,324 A | 4/1998 | Mathur et al. | |
| 5,742,513 A | 4/1998 | Bouhenguel et al. | |
| 5,754,451 A * | 5/1998 | Williams | 702/185 |
| 5,757,371 A | 5/1998 | Oran et al. | 345/348 |
| 5,761,518 A | 6/1998 | Boehling et al. | |
| 5,764,891 A | 6/1998 | Warrior | |
| 5,768,119 A | 6/1998 | Havekost et al. | 364/133 |
| 5,777,872 A | 7/1998 | He | |
| 5,781,432 A | 7/1998 | Keeler et al. | |
| 5,781,878 A | 7/1998 | Mizoguchi et al. | 701/109 |
| 5,790,898 A | 8/1998 | Kishima et al. | |
| 5,796,602 A | 8/1998 | Wellan et al. | 364/130 |
| 5,796,606 A | 8/1998 | Spring | 364/138 |
| 5,796,609 A | 8/1998 | Tao et al. | |
| 5,798,939 A | 8/1998 | Ochoa et al. | |
| 5,805,442 A | 9/1998 | Crater et al. | |
| 5,809,490 A | 9/1998 | Guiver et al. | |
| 5,819,050 A | 10/1998 | Boehling et al. | |
| 5,819,232 A | 10/1998 | Shipman | |
| 5,825,645 A | 10/1998 | Konar et al. | |
| 5,826,249 A | 10/1998 | Skeirik | |
| 5,838,561 A | 11/1998 | Owen | 364/152 |
| 5,842,189 A | 11/1998 | Keeler et al. | |
| 5,847,952 A | 12/1998 | Samad | |
| 5,848,365 A | 12/1998 | Coverdill | 701/35 |
| 5,855,791 A | 1/1999 | Hays et al. | 210/696 |
| 5,859,773 A | 1/1999 | Keeler et al. | |
| 5,859,885 A | 1/1999 | Rusnica et al. | 376/259 |
| 5,859,964 A | 1/1999 | Wang et al. | |
| 5,875,420 A | 2/1999 | Piety et al. | 702/182 |
| 5,877,954 A | 3/1999 | Klimasauskas et al. | |
| 5,880,716 A | 3/1999 | Kunugi | 345/173 |
| 5,892,679 A | 4/1999 | He | |
| 5,892,939 A | 4/1999 | Call et al. | |
| 5,898,869 A | 4/1999 | Anderson | |
| 5,901,058 A | 5/1999 | Steinman et al. | |
| 5,905,989 A | 5/1999 | Biggs | 707/104 |
| 5,906,214 A | 5/1999 | Gueret | 395/835 |
| 5,907,701 A | 5/1999 | Hanson | |
| 5,909,370 A | 6/1999 | Lynch | |
| 5,909,541 A | 6/1999 | Sampson et al. | |
| 5,909,586 A | 6/1999 | Anderson | |
| 5,917,840 A | 6/1999 | Cheney et al. | |
| 5,918,233 A | 6/1999 | La Chance et al. | |
| 5,922,963 A | 7/1999 | Piety et al. | 73/659 |
| 5,924,086 A | 7/1999 | Mathur et al. | |
| 5,940,290 A | 8/1999 | Dixon | |
| 5,948,101 A | 9/1999 | David et al. | |
| 5,949,417 A | 9/1999 | Calder | |
| 5,951,654 A | 9/1999 | Avsan et al. | 710/5 |
| 5,960,214 A | 9/1999 | Sharpe, Jr. et al. | 395/835 |
| 5,960,441 A | 9/1999 | Bland et al. | |
| 5,975,737 A | 11/1999 | Crater et al. | |
| 5,984,502 A | 11/1999 | Calder | |
| 5,988,847 A | 11/1999 | McLaughlin et al. | |
| 5,995,916 A * | 11/1999 | Nixon et al. | 702/182 |
| 5,997,167 A * | 12/1999 | Crater et al. | 700/79 |
| 6,006,171 A * | 12/1999 | Vines et al. | 702/184 |
| 6,008,985 A | 12/1999 | Lake et al. | |
| 6,014,612 A | 1/2000 | Larson et al. | 702/183 |
| 6,017,143 A | 1/2000 | Eryurek et al. | |
| 6,026,352 A | 2/2000 | Burns et al. | |
| 6,033,257 A | 3/2000 | Lake et al. | |
| 6,035,339 A | 3/2000 | Agraharam et al. | 709/234 |
| 6,038,486 A * | 3/2000 | Saitoh et al. | 700/96 |
| 6,041,263 A | 3/2000 | Boston et al. | |
| 6,047,221 A | 4/2000 | Piche et al. | |
| 6,055,483 A | 4/2000 | Lu | |
| 6,061,603 A | 5/2000 | Papadopoulos et al. | |
| 6,067,505 A | 5/2000 | Bonoyer et al. | |
| 6,076,124 A | 6/2000 | Korowitz et al. | |
| 6,078,843 A | 6/2000 | Shavit | |
| 6,093,211 A | 7/2000 | Hamielec et al. | |
| 6,106,785 A | 8/2000 | Havlena et al. | |
| 6,108,616 A | 8/2000 | Borchers et al. | |
| 6,110,214 A | 8/2000 | Klimasaukas | |
| 6,122,555 A | 9/2000 | Lu | |
| 6,128,279 A | 10/2000 | O'Neil et al. | |
| 6,134,574 A | 10/2000 | Oberman et al. | 708/551 |
| 6,144,952 A | 11/2000 | Keeler et al. | 706/21 |
| 6,169,980 B1 | 1/2001 | Keeler et al. | 706/21 |
| 6,185,470 B1 | 2/2001 | Pado et al. | 700/104 |
| 6,192,281 B1 | 2/2001 | Brown et al. | 700/2 |
| 6,197,480 B1 | 3/2001 | Iguchi et al. | 430/286.1 |
| 6,246,972 B1 | 6/2001 | Klimasauskas | 703/2 |
| 6,259,959 B1 | 7/2001 | Martin | 700/99 |
| 6,266,726 B1 | 7/2001 | Nixon et al. | |
| 6,298,377 B1 | 10/2001 | Hartikainen et al. | |
| 6,298,454 B1 | 10/2001 | Schleiss et al. | |
| 6,317,638 B1 | 11/2001 | Schreder et al. | 700/79 |
| 6,317,701 B1 | 11/2001 | Pyötsiä et al. | |
| 6,332,110 B1 | 12/2001 | Wolfe | |
| 6,389,331 B1 | 5/2002 | Jensen et al. | 700/275 |
| 6,397,114 B1 | 5/2002 | Eryurek et al. | 364/999.999 |
| 6,400,681 B1 | 6/2002 | Bertin et al. | 370/351 |
| 6,418,465 B1 | 7/2002 | Hirosawa et al. | 709/206 |
| 6,421,571 B1 * | 7/2002 | Spriggs et al. | 700/17 |
| 6,445,963 B1 | 9/2002 | Blevins et al. | 700/44 |
| 6,507,797 B1 | 1/2003 | Kliman et al. | 702/75 |

| | | | |
|---|---|---|---|
| 6,529,780 B1 * | 3/2003 | Soergel et al. | 700/10 |
| 6,535,769 B1 * | 3/2003 | Konar | 700/14 |
| 6,549,130 B1 | 4/2003 | Joao | 340/539 |
| 6,567,718 B1 | 5/2003 | Campbell et al. | 700/30 |
| 6,571,273 B1 | 5/2003 | Shirai et al. | 709/201 |
| 6,591,260 B1 | 7/2003 | Schwarzhoff et al. | 707/2 |
| 6,609,040 B1 * | 8/2003 | Brunnemann | 700/108 |
| 6,628,994 B1 * | 9/2003 | Turicchi et al. | 700/32 |
| 6,633,782 B1 * | 10/2003 | Schleiss et al. | 700/26 |
| 6,651,012 B1 | 11/2003 | Bechhoefer | 702/34 |
| 6,654,697 B1 | 11/2003 | Eryurek et al. | 702/183 |
| 6,690,274 B1 | 2/2004 | Bristol | 340/506 |
| 6,704,689 B1 | 3/2004 | Hogan et al. | 702/184 |
| 6,717,513 B1 | 4/2004 | Shprecher et al. | 340/506 |
| 6,721,609 B1 | 4/2004 | Wojsznis et al. | 700/28 |
| 6,732,191 B1 | 5/2004 | Baker et al. | 710/1 |
| 6,738,388 B1 | 5/2004 | Stevenson et al. | 370/465 |
| 6,758,168 B2 | 7/2004 | Koskinen et al. | |
| 6,760,782 B1 | 7/2004 | Swales | 709/224 |
| 6,774,786 B1 | 8/2004 | Havekost et al. | 340/517 |
| 2002/0022894 A1 | 2/2002 | Eryurek et al. | 709/224 |
| 2002/0029130 A1 | 3/2002 | Eryurek et al. | 702/183 |
| 2002/0067370 A1 | 6/2002 | Forney et al. | 345/733 |
| 2002/0077711 A1 | 6/2002 | Schliess et al. | 700/83 |
| 2002/0147511 A1 | 10/2002 | Eryurek et al. | 340/517 |
| 2002/0161940 A1 | 10/2002 | Eryurek et al. | 700/108 |
| 2002/0163427 A1 | 11/2002 | Eryurek et al. | 340/517 |
| 2003/0002969 A1 | 1/2003 | Risser | 414/542 |
| 2003/0009572 A1 | 1/2003 | Thurner | 709/230 |
| 2003/0014500 A1 | 1/2003 | Schleiss et al. | 709/218 |
| 2003/0028268 A1 | 2/2003 | Eryurek et al. | 709/200 |
| 2003/0195934 A1 | 10/2003 | Peterson et al. | 709/206 |
| 2004/0075689 A1 | 4/2004 | Schleiss et al. | 700/83 |
| 2004/0181364 A1 | 9/2004 | Reeves et al. | 702/182 |
| 2004/0249583 A1 | 12/2004 | Eryurek et al. | 702/183 |
| 2005/0007249 A1 * | 1/2005 | Eryurek et al. | 340/511 |
| 2005/0240289 A1 * | 10/2005 | Hoyte et al. | 700/49 |

FOREIGN PATENT DOCUMENTS

| | | |
|---|---|---|
| CN | 1097804 | 1/1995 |
| CN | 1267373 A | 9/2000 |
| DE | 35 40204 C1 | 9/1986 |
| DE | 40 08 560 A1 | 9/1990 |
| DE | 44 33 593 A1 | 6/1995 |
| DE | 195 02 499 A1 | 8/1996 |
| EP | 0 122 622 | 10/1984 |
| EP | 0 377 736 | 7/1990 |
| EP | 0 413 814 | 2/1991 |
| EP | 0 487 419 | 5/1992 |
| EP | 0 594 227 | 4/1994 |
| EP | 0 612 039 | 8/1994 |
| EP | 0 644 470 | 3/1995 |
| EP | 0 362 386 | 6/1995 |
| EP | 0 626 697 | 7/1997 |
| EP | 0 827 096 | 3/1998 |
| EP | 0 624 847 | 8/1999 |
| EP | 0 959 398 | 11/1999 |
| EP | 0 965 897 | 12/1999 |
| EP | 0 964 325 | 8/2002 |
| EP | 0 961 184 | 12/2003 |
| GB | 2 083 258 | 3/1982 |
| GB | 2 294 129 | 4/1996 |
| GB | 2 294 793 | 5/1996 |
| GB | 2 347 234 | 8/2000 |
| GB | 2 380 833 | 4/2003 |
| JP | 06242192 | 2/1994 |
| JP | 07234988 | 5/1995 |
| WO | WO 98/38585 | 9/1998 |
| WO | WO 99/13418 | 3/1999 |
| WO | WO 00/50851 | 8/2000 |
| WO | WO 02/023405 | 3/2002 |
| WO | WO 02/095633 | 11/2002 |
| WO | WO 03/075206 | 9/2003 |

OTHER PUBLICATIONS

U.S. Appl. No. 09/707,580 entitled "Integrated Alarm Display in a Process Control Network," filed on Nov. 7, 2000.

Examination Report under Section 18(3) issued in GB 0212610.0 application by the United Kingdom Patent Office on Sep. 16, 2004.

"Components of GE Predictor™Services," GE Industrial Systems, available at http://www.geindustrial.com/cwc/services?id=74 on Jul. 18, 2002.

"Customer Benefits," GE Industrial Systems, available at http://www.geindustrial.com/cwc/services?id=75 on Jul. 18, 2002.

"Customer Impact," GE Industrial Systems, available at http://www.geindustrial.com/cwc/services?id=73 on Jul. 18, 2002.

"Electrical Equipment Coverage," GE Industrial Systems, available at http://geindustrial.com/cwc/services?id=72 on Jul. 18, 2002.

"GE Predictor™Services: GE Predictor Services Overview," GE Industrial Systems, available at http://www.geindustrial.com/cwc/service?id=71 on Jul. 18, 2002.

dotnet.za.net, "Web Services - A Guide for Business and IT Managers (Sep. 23, 2001)", (Copyright 2001), www.dotnet.za.net.

European Examination Report issued in EP 02717514.0, dated Jun. 29, 2004.

European Examination Report issued in EP 02723319.6, dated Jul. 1, 2004.

First Office Action issued in Chinese Application No. 02122060.3 on Feb. 4, 2005.

First Office Action issued in Chinese Application No. 02805785.6 on Nov. 11, 2005.

First Office Action issued in Chinese Application No.02805854.2 on Nov. 11, 2005.

Great Britain Examination Report under Section 18(3) issued Dec. 17, 2003 in Application No. GB 0126490.2 on Dec. 17, 2003.

Great Britain Examination Report under Section 18(3) issued in GB 0308687.9 by the United Kingdom Patent Office on Mar. 11, 2005.

International Preliminary Examination Report issued in PCT/US02/15901, mailed Sep. 10, 2003.

International Preliminary Examination report issued in PCT/US02/16033 mailed Sep. 16, 2003.

International Preliminary Examination Report issued in PCT/US02/05874 mailed Feb. 3, 2003.

International Search Report issued in PCT/US02/06577, mailed Nov. 13, 2002.

International Search Report issued in PCT/US02/15901, mailed Jun. 17, 2003.

International Search Report issued in PCT/US02/16033 issued Jun. 17, 2003.

International Search Report issued in PCT/US04/004939, mailed Sep. 29, 2004.

International Search Report issued in PCT/US02/05874, issued Nov. 13, 2002.

Kalkhoff, W. "Agent-Oriented Robot Task Transformation," Proceeding of the International Symposium on Intelligent Control, IEEE, pp. 242-247 (Aug. 27, 1995).

Lighthammer Illuminator ™ Manufacturing Intelligence Brochure "Now you can see all your manufacturing information from a single interface - in real-time, from anywhere.".

Lighthammer Software Development, "Illuminator ™ The $1_{st}$ 'Plant information Portal' ™" (Copyright 1999).

Mazeda et al., "Supervision and Optimised Process Control in Sugar beet Factories," Centre of Sugar Technology, Spain from www.univ-reims.fr/externes/avh10mazaeda.pdf.

Search Report under Section 17(5) issued by Great Britain Patent Office, dated Jun. 11, 2002 in Application No. GB 0126490.2 (UK 2083258) on Jun. 11, 2002.

Search Report under Section 17(5) issued in GB 0416908.2 application by the United Knigdom Patent Office on Oct. 13, 2004.

Search Report under Section 17(5) issued in GB 0308687.9 by the United Kingdom Patent Office on Aug. 29, 2003.

"Status Signals of Field Instruments," NAMUR Recommendation, NA 64, Feb. 1, 2001, pp. 1-8.

Systinet, "Introduction to Web Services", (Copyright 2001, 2002), www.systinet.com.
Web Services Architect, "What are Web Services", www.webservicearchitect.com.
Written Opinion issued in PCT/US02/15901, mailed Jul. 16, 2003.
Written Opinion issued in PCT/US02/16033, mailed Jul. 21, 2003.
Written Opinion issued in PCT/US04/004939, mailed Sep. 29, 2004.

Written Opinion issued in PCT/US02/05874, mailed Nov. 13, 2002.
U.S. Appl. No. 60/273,164, filed Mar. 1, 2001, "Asset utilization Expert in a Process controls Plant".
Zolera Systems, "A Brief Guide to Web Services Protocols" (Copyright 2001), www.zolera.com.

* cited by examiner

FIG. 15

METHOD AND APPARATUS FOR PERFORMING A FUNCTION IN A PLANT USING PROCESS PERFORMANCE MONITORING WITH PROCESS EQUIPMENT MONITORING AND CONTROL

RELATED APPLICATION

This application claims the benefit of the filing date of co-pending U.S. Provisional Application Ser. No. 60/273,164, entitled "Asset Utilization Expert in a Process Control Plant" filed Mar. 1, 2001. This application is also a continuation in part of, and claims priority from U.S. patent application Ser. No. 09/707,580, now U.S. Pat. No. 6,774,786, entitled "Integrated Alarm Display in a Process Control Network," filed Nov. 7, 2000. This application is also a continuation in part of, and claims priority from U.S. patent application Ser. No. 09/256,585 now U.S. Pat. No. 6,298,454, entitled "Diagnostics in a Process Control System," which was filed Feb. 22, 1999.

FIELD OF THE INVENTION

The present invention relates generally to process control systems within process plants and, more particularly, to a coordinated system that uses multiple types of data from different and divergent data sources, such as those associated with equipment monitoring, process control monitoring and performance monitoring, to assist in and enhance asset utilization in a process control plant or environment.

DESCRIPTION OF THE RELATED ART

Process control systems, like those used in chemical, petroleum or other processes, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure and flow rate sensors), perform functions within the process such as opening or closing valves and measuring process parameters. The process controller receives signals indicative of process measurements or process variables made by or associated with the field devices and/or other information pertaining to the field devices, uses this information to implement a control routine and then generates control signals which are sent over one or more of the buses to the field devices to control the operation of the process. Information from the field devices and the controller is typically made available to one or more applications executed by an operator workstation to enable an operator to perform desired functions with respect to the process, such as viewing the current state of the process, modifying the operation of the process, etc.

While a typical process control system has many process control and instrumentation devices, such as valves, transmitters, sensors, etc. connected to one or more process controllers which execute software that controls these devices during the operation of the process, there are many other supporting devices which are also necessary for or related to process operation. These additional devices include, for example, power supply equipment, power generation and distribution equipment, rotating equipment such as turbines, etc., which are located at numerous places in a typical plant. While this additional equipment does not necessarily create or use process variables and, in many instances, is not controlled or even coupled to a process controller for the purpose of affecting the process operation, this equipment is nevertheless important to and ultimately necessary for proper operation of the process. In the past however, process controllers were not necessarily aware of these other devices or the process controllers simply assumed that these devices were operating properly when performing process control.

Still further, many process plants have other computers associated therewith which execute applications related to business functions or maintenance functions. For example, some plants include computers which execute applications associated with ordering raw materials, replacement parts or devices for the plant, applications related to forecasting sales and production needs, etc. Likewise, many process plants, and especially those which use smart field devices, include equipment monitoring applications which are used to help monitor and maintain the devices within the plant regardless of whether these devices are process control and instrumentation devices or are other types of devices. For example, the Asset Management Solutions (AMS) application sold by Fisher-Rosemount Systems, Inc. enables communication with and stores data pertaining to field devices to ascertain and track the operating state of the field devices. An example of such a system is disclosed in U.S. Pat. No. 5,960,214 entitled "Integrated Communication Network for use in a Field Device Management System." In some instances, the AMS application may be used to communicate with devices to change parameters within the device, to cause the device to run applications on itself, such as self calibration routines or self diagnostic routines, to obtain information about the status or health of the device, etc. This information may be stored and used by a maintenance person to monitor and maintain these devices. Likewise, there are other types of applications which are used to monitor other types of devices, such as rotating equipment and power generation and supply devices. These other applications are sometimes available to the maintenance persons and are used to monitor and maintain the devices within a process plant. In many cases, however, outside service organizations may perform services related to monitoring process performance and equipment. In these cases, the outside service organizations acquire the data they need, run typically proprietary applications to analyze the data and merely provide results and recommendations to the process plant personnel. While helpful, the plant personnel have little or no ability to view the raw data measured or to use the analysis data in any other manner.

Thus, in the typical plant or process, the functions associated with the process control activities, the device and equipment maintenance and monitoring activities, and the business activities such as process performance monitoring are separated, both in the location in which these activities take place and in the personnel who typically perform these activities. Furthermore, the different people involved in these different functions generally use different tools, such as different applications run on different computers to perform the different functions. In many instances, these different tools collect or use different types of data associated with or collected from the different devices within the process and are set up differently to collect the data they need. For example, process control operators who generally oversee the day to day operation of the process and who are primarily responsible for assuring the quality and continuity of the process operation typically affect the process by setting and changing set points within the process, tuning loops of the process, scheduling process operations such as batch operations, etc. These process control operators may use available tools for diagnosing and correcting process control problems within a process control system, including, for example, auto-tuners, loop analyzers, neural network systems, etc. Process control operators also receive process variable information from the process via one or more process controllers which provide information to the operators about the operation of the process, including alarms generated within the process. This information may be provided to the process control operator via a standard user interface.

Still further, it is currently known to provide an expert engine that uses process control variables and limited information about the operating condition of the control routines or function blocks or modules associated with process control routines to detect poorly operating loops and to provide information to an operator about suggested courses of action to correct the problem. Such an expert engine is disclosed in U.S. patent application Ser. No. 09/256,585 entitled "Diagnostics in a Process Control System," which was filed on Feb. 22, 1999 and in U.S. patent application Ser. No. 09/499,445 entitled "Diagnostic Expert in a Process Control System," which was filed on Feb. 7, 2000, both of which are hereby expressly incorporated by reference herein. Likewise, it is known to run control optimizers, such as real time optimizers, within a plant to optimize the control activities of the process plant. Such optimizers typically use complex models of the plant to predict how inputs may be changed to optimize operation of the plant with respect to some desired optimization variable such as, for example, profit. In many cases, however, these optimizers are provided by outside service organizations and, thus, are not directly accessible to other areas of the plant.

On the other hand, maintenance personnel who are primarily responsible for assuring that the actual equipment within the process is operating efficiently and for repairing and replacing malfunctioning equipment, use tools such as maintenance interfaces, the AMS application discussed above, as well and many other diagnostic tools which provide information about operating states of the devices within the process. Maintenance persons also schedule maintenance activities which may require shut down of portions of the plant. For many newer types of process devices and equipment, generally called smart field devices, the devices themselves may include detection and diagnostic tools which automatically sense problems with the operation of the device and automatically report these problems to a maintenance person via a standard maintenance interface. For example, the AMS software reports device status and diagnostic information to the maintenance person and provides communication and other tools that enable the maintenance person to determine what is happening in devices and to access device information provided by the devices. Typically, maintenance interfaces and maintenance personnel are located apart from process control operators, although this is not always the case. For example, in some process plants, process control operators may perform the duties of maintenance persons or vice versa, or the different people responsible for these functions may use the same interface.

Still further, persons responsible and applications used for business applications, such as ordering parts, supplies, raw materials, etc., making strategic business decisions such as choosing which products to manufacture, what variables to optimize within the plant, etc. based on process performance measures are typically located in offices of the plant that are remote from both the process control interfaces and the maintenance interfaces. Likewise, managers or other persons may want to have access to certain information within the process plant from remote locations or from other computer systems associated with the process plant for use in overseeing the plant operation and in making long term strategic decisions.

Because, for the most part, very different applications used to perform the different functions within a plant, e.g., process control operations, maintenance operations and business operations are separated, the different applications used for these different tasks are not integrated and, thus, do not share data or information. In fact, many plants only include some, but not all, of these different types of applications. In many cases, some of the tasks, such as monitoring equipment, testing the operation of devices, determining if the plant is running in an optimal manner, etc. are performed by outside consultants or service companies who measure the data needed, perform an analysis and then provide only the results of the analysis back to the plant personnel. In these cases, the data is typically collected and stored in a proprietary manner and is rarely made available to the plant personnel for other reasons.

Still further, even if all of the applications are located within a plant, because different personnel use these different applications and analysis tools and because these tools are generally located at different hardware locations within the plant, there is little if any flow of information from one functional area of the plant to another, even when this information may be useful to other functions within the plant. For example, a tool, such as a rotating equipment data analysis tool, may be used by a maintenance person to detect a poorly functioning power generator or piece of rotating equipment (based on non-process variable type data). This tool may detect a problem and alert the maintenance person that the device needs to be calibrated, repaired or replaced. However, the process control operator (either a human or a software expert) does not have the benefit of this information, even though the poorly operating device may be causing a problem that is affecting a loop or some other component which is being monitored by the process control operation. Likewise, the business person is not aware of this fact, even though the malfunctioning device may be critical to and may be preventing optimization of the plant in a manner that the business person may desire. Because the process control expert is unaware of a device problem which may be ultimately causing poor performance of a loop or unit in the process control system and because the process control operator or expert assumes that this equipment is operating perfectly, the process control expert may misdiagnose the problem it detects within the process control loop or may try to apply a tool, such as a loop tuner, which could never actually correct the problem. Likewise, the business person may make a business decision to run the plant in a manner that will not achieve the desired business effects (such as optimizing profits) because of the malfunctioning device.

Due to the abundance of data analysis and other detection and diagnostic tools available in the process control environment, either in the plant itself or via outside service companies or consultants, there is a lot of information about the health and performance of devices available to the maintenance person which could be helpful to the process operator and the business persons. Similarly, there is a lot of information available to the process operator about the current operational status of the process control loops and other routines which may be helpful to the maintenance person or to the business person. Likewise, there is information generated by or used in the course of performing the business functions which could be helpful to the maintenance person or the process control operator in optimizing the operation of the process. However, in the past, because these functions were separated, the information generated or collected in one functional area was not used at all, or not used very well in other functional areas which led to an overall sub-optimal use of the assets within process plants.

SUMMARY

A process control system includes a data collection and distribution system that collects and stores data from different data sources, each of which may use it own proprietary manner of acquiring or generating the data in the first place. The data collection and distribution system then makes the stored data available to other applications associated with or provided in the process control system or to applications associated with the data sources themselves for use in any desired manner. In this manner, applications may use data from vastly different data sources to provide a better view or insight into the current operational status of a plant, to make better or more complete diagnostic or financial decisions regarding the plant, etc. Thus, applications may be provided which combine or use data from previously disparate collection systems such as process control monitoring systems, equipment monitoring systems and process performance models to determine a better overall view or state of a process control plant, to better diagnose problems and to take or recommend actions in production planning and maintenance within the plant. For example, information or data may be collected by maintenance functions pertaining to the health, variability, performance or utilization of a device, loop, unit, etc. This information may then be sent to and displayed to a process operator or maintenance person to inform that person of a current or future problem. This same information may be used by the process operator to correct a current problem within a loop or to change, for example, the plant operating point to account for and to correct for a sub-optimally operating device. The diagnostic applications may generate measurement, control and device indexes pertaining to non-process variables, such as the health of a device. These equipment performance indexes may be determined from models calculating key performance variables, such as efficiency and cost of production. A process control expert may use these measurement, control and device indexes along with process variable data to optimize operation of the process.

Using the disclosed data collection and distribution system, process variable data and non-process variable data may be combined, for example, to generate process models. Likewise, the detection of a device problem, such as one which requires shutdown of the process, may cause business software to automatically order replacement parts or alert the business person that chosen strategic actions will not produce the desired results due to the actual state of the plant. The change of a control strategy performed within the process control function may cause business software to automatically order new or different raw materials. There are, of course, many other types of applications to which the fusion data related to process control, equipment monitoring and performance monitoring data can be an aid by providing different and more complete information about the status of the assets within a process control plant to all areas of the process plant.

BRIEF DESCRIPTION OF THE DRAWINGS

FIG. 15 is still another exemplary depiction of a display that may be provided by a graphical user interface to enable a user to track or generate work orders.

DETAILED DESCRIPTION

Figure 1:
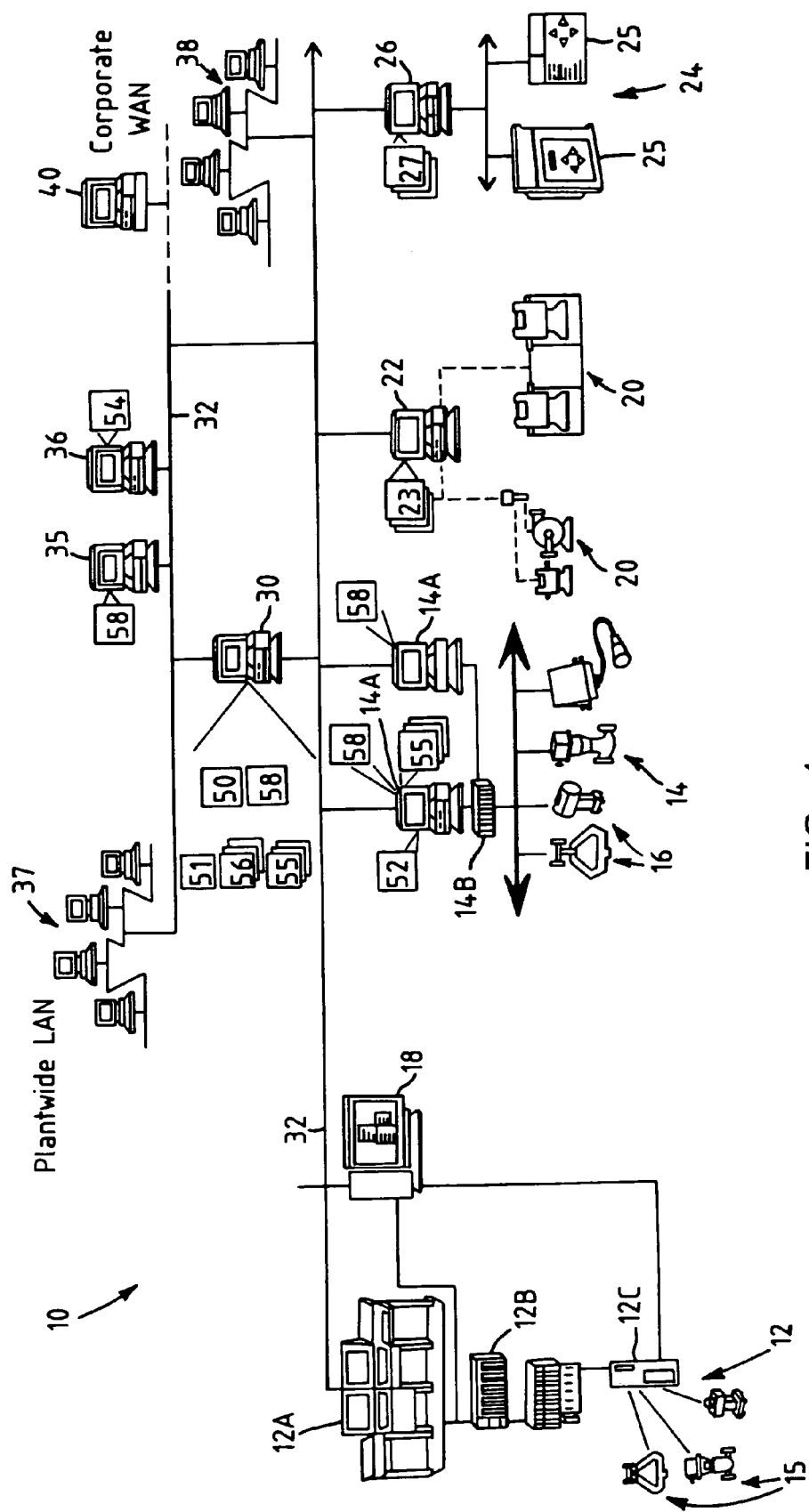
FIG. 1 is a block diagram of a process control plant having numerous equipment and process monitoring devices configured to receive and send data to one or more data collection and distribution stations, which may send this data to viewing and diagnostic routines that use the collected data to provide numerous benefits in the process control plant.

Referring now to FIG. 1, a typical process control plant 10 includes a number of business and other computer systems interconnected with a number of control and maintenance systems by one or more communication networks. The illustrated process control plant 10 also includes one or more process control systems 12 and 14. The process control system 12 may be a traditional process control system such as a PROVOX or RS3 system or any other DCS. The system 12 illustrated in FIG. 1 includes an operator interface 12A coupled to a controller 12B and to input/output (I/O) cards 12C which, in turn, are coupled to various field devices such as analog and Highway Addressable Remote Transmitter (HART) field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Fisher-Rosemount Systems, Inc. of Austin, Tex. or any other desired type of controllers. The controllers 14B are connected via I/O devices to one or more field devices 16, such as for example, HART or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools available to the process control operator for controlling the operation of the process including, for example, control optimizers, diagnostic experts, neural networks, tuners, etc.

Still further, maintenance systems, such as computers executing the AMS application or any other device or equipment monitoring and communication applications may be connected to the process control systems 12 and 14 or to the individual devices therein to perform maintenance and monitoring activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as the AMS application may be installed in and executed by one or more of the user interfaces 14A associated with the distributed process control system 14 to perform maintenance and monitoring functions, including data collection related to the operating status of the devices 16.

The illustrated process control plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23 provided by, for example, CSi Systems or other any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced. In some cases, outside consultants or service organizations may temporary acquire or measure data pertaining to the equipment 20 and use this data to perform analyses for the equipment 20 to detect problems, poor performance or other issues effecting the equipment 20. In these cases, the computers running the analyses may not be connected to the rest of the system 10 via any communication line or may be connected only temporarily.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such a as those provided by, for example, Liebert and ASCO or other service companies to control and maintain the power generation and distribution equipment 25. Again, in many cases, outside consultants or service organizations may temporary acquire or measure data pertaining to the equipment 25 and use this data to perform analyses for the equipment 25 to detect problems, poor performance or other issues effecting the equipment 25. In these cases, the computers (such as the computer 26) running the analyses may not be connected to the rest of the system 10 via any communication line or may be connected only temporarily.

Of course, any other equipment and process control devices could be attached to or be part of the plant 10 and the system described herein is not limited to the equipment specifically illustrated in FIG. 1 but can, instead or in addition, include any other types of process control equipment or devices.

In the past, the various process control systems 12 and 14 and the power generating and maintenance systems 22 and 26 have not been interconnected with each other in a manner that enables them to share data generated in or collected by each of these systems in a useful manner. As a result, each of the different functions such as the process control functions, power generation functions and rotating equipment functions have operated on the assumption that the other equipment within the plant which may be affected by or have an affect on that particular function is operating perfectly which, of course, is almost never the case. However, because the functions are so different and the equipment and personnel used to oversee these functions are different, there has been little or no meaningful data sharing between the different functional systems within the plant 10.

To overcome this problem, a data collection and distribution system is provided to acquire data from the disparate sources of data, format this data to a common data format or structure and then provide this data, as needed to any of a suite of applications run at, for example, a computer system 30, or disbursed between workstations throughout the process control network. The suite of applications is provided to fuse or integrate the use of data from previously disparate and separate systems to provide a better measurement, viewing, control and understanding of the entire plant 10. As illustrated in FIG. 1, the computer system 30 is communicatively connected to the computers or interfaces associated with the various functional systems within the plant 10, including the process control functions 12 and 14, the maintenance functions such as those implemented in the computers 18, 14A, 22 and 26 and the business functions such as performing process performance monitoring. In particular, the computer system 30 is communicatively connected to the traditional process control system 12 and to the maintenance interface 18 associated with that control system, is connected to the process control and/or maintenance interfaces 14A of the distributed process control system 14, is connected to the rotating equipment maintenance computer 22 and to the power generation and distribution computer 26, all via a bus 32. The bus 32 may use any desired or appropriate local area network (LAN) or wide area network (WAN) protocol to provide communications. Of course the computer system 30 could be connected to these different parts of the plant 10 via other communication links including fixed or intermittent links, hard-wired or over-the-air links or any physical medium such as one of wired, wireless, coaxial cable, telephone modem, fiber optic, optical, meteor burst, satellite medium using one of a Fieldbus, IEEE 802.3, blue tooth, X.25 or X.400 communication protocol, etc.

As illustrated in FIG. 1, the computer 30 may also be connected via the same or a different network bus 32 to business system computers and maintenance planning computers 35 and 36, which may execute, for example, enterprise resource planning (ERP), material resource planning (MRP), process modeling for performance modeling, accounting, production and customer ordering systems, maintenance planning systems or any other desired business applications such as parts, supplies and raw materials ordering applications, production scheduling applications, etc. The computer 30 may also be connected via, for example, the bus 32, to a plantwide LAN 37, a corporate WAN 38 as well as to a computer system 40 that enables remote monitoring of or communication with the plant 10 from remote locations.

The data collection and distribution system mentioned above may also be provided in the computer 30 or may be dispersed at numerous locations throughout the process network 10 to acquire and process data from any source of data such as the controller systems 12 and 14, the monitoring systems 22 and 26, the financial systems 35, 36, etc. If the data collection and distribution system is located in the computer 30, it may receive data from the disparate sources of data, such as the controllers, equipment monitoring and financial applications separately using different data formats, or using a common format. In one embodiment, the communications over the bus 32 occur using the XML protocol. Here, data from each of the computers 12A, 18, 14A, 22, 26, 35, 36, etc. is wrapped in an XML wrapper and is sent to an XML data server which may be located in, for example, the computer 30. Because XML is a descriptive language, the server can process any type of data. At the server, if necessary, the data is encapsulated and mapped to a new XML wrapper, i.e., this data is mapped from one XML schema to one or more other XML schemas which are created for each of the receiving applications. One method of providing this communication is described in co-pending U.S. application Ser. No. 09/902,201 filed Jul. 10, 2001, entitled "Transactional Data Communications for Process Control Systems" which is assigned to the assignee of this application and which is hereby expressly incorporated by reference herein. With this system, each data originator can wrap its data using a schema understood or convenient for that device or application, and each receiving application can receive the data in a different schema used for or understood by the receiving application. The server is configured to map one schema to another schema depending on the source and destination(s) of the data. If desired, the server may also perform certain data processing functions or other functions based on the receipt of data. The mapping and processing function rules are set up and stored in the server prior to operation of suite of data integration applications described herein. In this manner, data may be sent from any one application to one or more other applications.

In another embodiment, the data collection and distribution applications may be dispersed throughout the network 10 and collection of data may be accomplished at distributed locations. The collected data may then be converted to a common format at the distributed locations and sent to one or more central databases for subsequent distribution. Thus, generally speaking, one or more data collection routines are provided to collect the data from disparate sources of data and to provide this data in a common or consistent format to the suite of applications which may use this data, such as the applications within the computer 30. The data collection and distribution applications are referred to herein as a data collection and distribution system while the applications which use the collected data (e.g. that integrate this data) are referred to herein collectively as an asset utilization suite 50.

The applications within the asset utilization suite 50 use the collected data and other information generated by the process control systems 12 and 14, the maintenance systems 18, 22 and 26 and the business and process modeling systems 35 and 36 as well as information generated by data analysis tools executed in each of these systems. Generally speaking, the asset utilization suite 50 may include one or more user display applications such as those disclosed in U.S. patent application Ser. No. 09/256,585 or 09/499,445, and one or more diagnostic experts or other type of expert system applications based on, for example, the OZ expert system currently provided by NEXUS. However, the asset utilization suite 50 may use any other desired type of expert system including, for example, any type of data mining system. The asset utilization suite 50 may also include other applications which integrate data from various functional systems for any other purpose, such as for user information purposes, for diagnostic purposes and for taking actions within the process plant, such as process control actions, equipment replacement or repair actions, altering the type or amount of product produced based on financial factors, process performance factors, etc. Thus, the data collection and distribution system may, in one sense, operate as a data and information clearinghouse in the process plant 10 to coordinate the distribution of data or information from one functional area, such as the maintenance area, to other functional areas, such as the process control or the business functional areas. As a result, the asset utilization suite 50 may use the collected data to generate new information or data which can be distributed to one or more of the computer systems associated with the different functions within the plant 10 and may execute or oversee the execution of other applications that use the collected data to generate new types of data to be used within the process control plant 10.

In one case, the asset utilization suite 50 may provide a number of applications which use data from the process control functions and the equipment monitoring functions and, if desired, from process performance monitoring functions performed within a process control network. These applications may provide a coordinated user display for display of information or attributes about the plant that use two or more of process control data, process performance modeling data, or equipment monitoring data. An application associated with the asset utilization suite 50 may also diagnose conditions or problems within the process control plant 10 based on data from two or more of process control monitoring applications, process performance monitoring applications, and equipment monitoring applications. Still further, the applications associated with the asset utilization suite 50 may take actions within the process plant 10 in response to a diagnosed or detected problem or may recommend actions to be taken to a user, which may be any of, for example, a process control operator, a maintenance technician or a business person in the "front office" of the plant 10 who is responsible for the overall operation of the plant 10.

More particularly, in one embodiment, the asset utilization suite 50 may include or execute index generation software 51 that collects or creates indexes associated with devices, like process control and instrumentation devices, power generation devices, rotating equipment, units, areas, etc, or that are associated with process control entities, like loops, etc. within the plant 10. These indexes can then be provided to the process control applications to help optimize process control and can be provided to the business software or business applications to provide the business persons more complete or understandable information associated with the operation of the plant 10. The asset utilization suite 50 can also provide maintenance data (such as device status information) and business data (such as data associated with scheduled orders, timeframes, etc.) to a control expert 52 associated with, for example, the process control system 14 to help an operator perform control activities such as optimizing control. The control expert 52 may be located in, for example, the user interface 14A or any other computer associated with the control system 14 or within the computer 30 if desired.

If desired, the control expert 52 may be, for example, the control expert described in U.S. patent application Ser. Nos. 09/256,585 and 09/499,445 identified above. However, these control experts may additionally incorporate and use data related to the status of devices or other hardware within the process control plant 10 or of performance data generated using process performance models in the decision making performed by these control experts. In particular, in the past, the software control experts generally only used process variable data and some limited device status data to make decisions or recommendations to the process operator. With the communication provided by or collected by the asset utilization suite 50, especially that related to device status information such as that provided by the computer systems 18, 14A, 22 and 26 and the data analysis tools implemented thereon, the control expert 52 can receive and incorporate device status information such as health, performance, utilization and variability information into its decision making along with process variable information.

Additionally, the asset utilization suite 50 can provide information pertaining to states of devices and the operation of the control activities within the plant 10 to the business systems 35 and 36 where, for example, a work order generation application or program 54 can automatically generate work orders and order parts based on detected problems within the plant 10 or where supplies can be ordered based on work being performed. Similarly, changes in the control system detected by the asset utilization expert 50 may cause the business systems 35 or 36 to run applications that perform scheduling and supply orders using, for example, the program 54. In the same manner, changes in customer orders etc. can be entered into the business systems 35 or 36 and this data can be sent to the asset utilization suite 50 and sent to the control routines or control expert 52 to cause changes in the control to, for example, begin making the newly ordered products or to implement the changes made in the business systems 35 and 36.

Additionally, the asset utilization suite 50 can send information to one or more process models used by, for example, optimizers 55 within the plant 10. For example, a process model 56 and a control optimizer 55 can be located in the computer 14A and can run one or more control optimization routines 55A, 55B, etc. Additionally or alternatively, process models 56 and optimizer routines 55 could be stored in and executed by the computer 30 or any other computer, and the data necessary therefor could be sent by the asset utilization expert 50. The results of the models 56 can be input to the asset utilization expert 50 or a control or other expert such as the control expert 52 to perform modeling functions, the purpose of which will be described in more detail herein. Generally speaking, however, the models 56 can be used to determine process unit or area performance that can then be input to the optimizer routines 55 or displayed to a user or used for other purposes. The models 56 may be models such as those created by and sold by MDC Technology located in Teeside, England or may be any other desired types of models. There are, of course, many other applications that can be provided within the plant 10 and that can use the data from the asset utilization expert 50 and the system described herein is not limited to the applications specifically mentioned herein. Overall, however, the asset utilization suite 50 helps to optimize the use of all of the assets within the plant 10 by enabling the sharing of data and coordination of assets between all of the functional areas of the plant 10.

Also, generally speaking, one or more user interface routines 58 can be stored in and executed by one or more of the computers within the plant 10. For example, the computer 30, the user interface 14A, the business system computer 35 or any other computer may run a user interface routine 58. Each user interface routine 58 can receive or subscribe to information from the asset utilization suite 50 and may provide information to the asset utilization suite 50 and either the same or different sets of data may be sent to each of the user interface routines 58. Any one of the user interface routines 58 can provide different types of information using different screens for different users if so desired. For example, one of the user interface routines 58 may provide a screen or set of screens to a control operator or to a business person to enable that person to set constraints or to choose optimization variables for use in a standard control routine or in a control optimizer routine. The user interface routine 58 may provide a control guidance tool that enables a user to view the process performance and indexes created by the index generation software 51 or process performance models 56 in some coordinated manner. This operator guidance tool may also enable the operator or any other person to obtain information about the states of devices, control loops, units, etc. and to easily see the information related to the problems with these entities, as that information has been detected by other software within the process plant 10. The user interface routine 58 may also provide performance monitoring screens using performance monitoring data provided by or generated by the tools 23 and 27, the maintenance programs such as the AMS application or any other maintenance programs, or as generated by the models in conjunction with the asset utilization suite 50. Of course, the user interface routine 58 may provide any user access to and enable the user to change preferences or other variables used in any or all functional areas of the plant 10.

Figure 2:
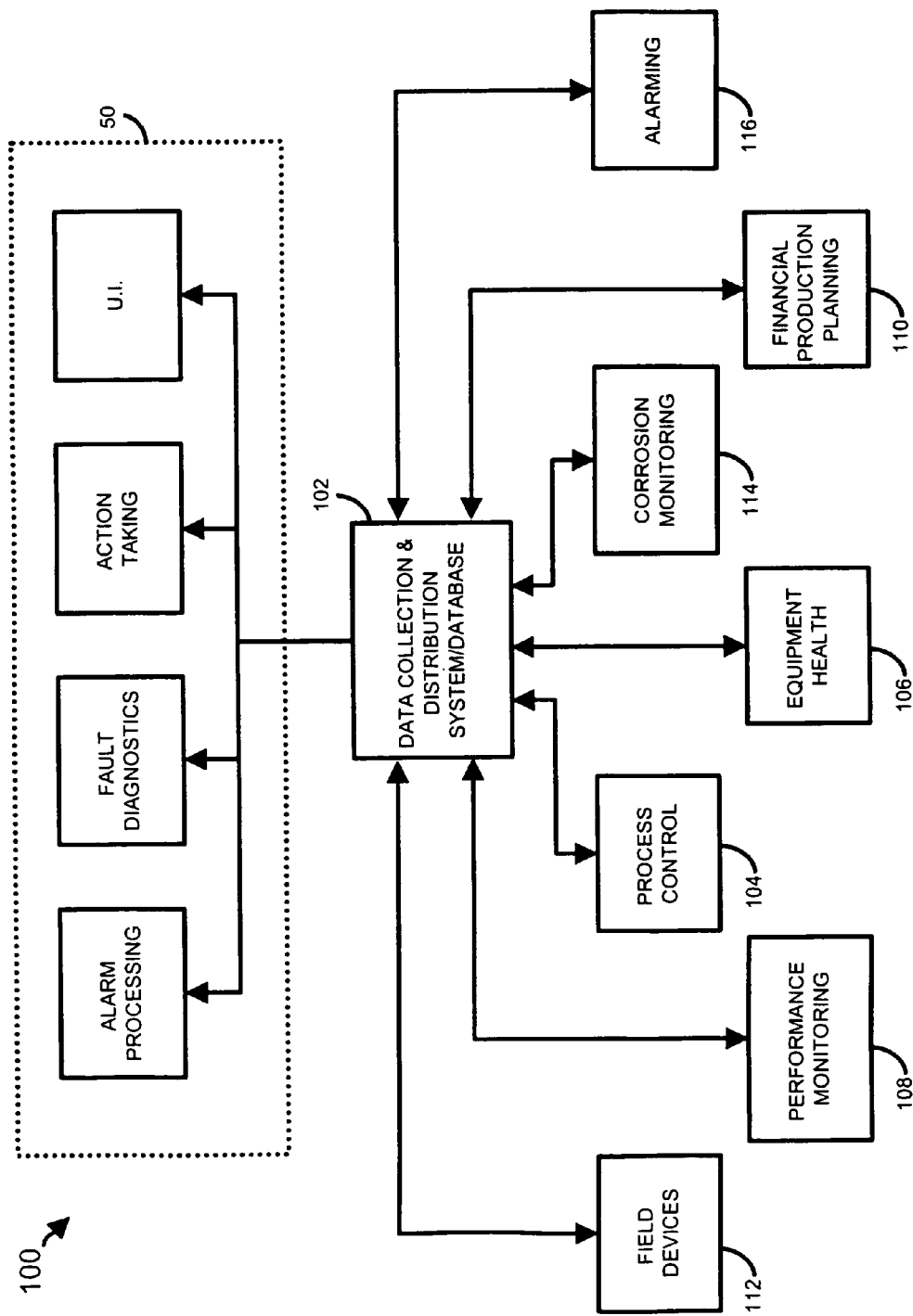
FIG. 2 is a functional diagram illustrating data flow between various data sources and applications which combine this data to perform various functions.

Referring now to FIG. 2, a simplified functional block diagram 100 illustrates data flow and communication associated with or used by a data collection and distribution system 102 described herein to enable data from disparate data sources to be used by the asset utilization suite 50. In particular, the diagram 100 includes the data collection and distribution system 102 which receives data from numerous sources of data. For example, a process control data source 104 (which may include traditional process control activities and applications such as process control and monitoring applications, process control diagnostic applications, process control alarming applications, etc.) provides data to the data collection and distribution system 102. The block 104 may send data acquired by or generated by traditional or stand alone process controllers, by DCSs, by the DeltaV system, by PLCs, etc. within the process control environment.

An equipment or process health data source 106 (which may include traditional equipment monitoring applications, equipment diagnostic applications, equipment alarming applications, abnormal situation analysis applications, environmental monitoring applications, etc.) also sends data to the data collection and distribution system 102. As a result, the source 106 may send data acquired by or generated by any type of traditional equipment monitoring and diagnostic applications or sources, such as those provided by CSI, the AMS application sold by Fisher-Rosemount Systems, Inc., Nexis applications, etc.

A performance monitoring data source 108 (which may include performance monitoring applications such optimization applications, process models used to monitor or model process operation, process or equipment health, etc.) also provides data to the system 102. The data source 108 may include or provide data acquired by or generated by any type of performance monitoring equipment or applications. Still further, a financial or production planning data source 110 (which may include applications that perform financial or cost type analysis functions within the process control system, such as deciding how to run the plant to maximize profits, to avoid environmental fines, deciding what or how much of a product to make, etc.) is connected to the system 102. Both the financial planning and the process control applications may utilize information provided by the same or different process models.

Field devices 112, such as smart field devices, may provide still further data to the data collection and distribution system 102. Of course, the data provided by the field devices 112 may be any data measured by or generated by these field devices, including alarms, alerts, measurement data, calibration data, etc. Likewise, a corrosion monitoring data source 114 may provide data collected by or generated by corrosion monitoring services or applications to the collection system 102. Likewise, an alarming data source 116 may provide data collected by or generated by advanced alarming applications or services to the system 102. The alarming data source 116 may include applications or services which measure or take samples, perform lab analyses and generate alarms or other information based on these analyses.

It should be noted that still other data may be provided from any other sources of data in addition or instead of the sources of data illustrated in FIG. 2. Furthermore, the data provided by the data sources of FIG. 2 can be raw measured data, can be data generated by an analysis or other routine based on measured data or some combination of the two. Still further, it will be understood that the data provided from any or all of the data sources of FIG. 2 can be measured, generated or communicated in any format, including proprietary formats used by the different organizations or applications which might measure or generate this data. Thus, for example, different field devices 112 may collect and generate data in different formats and then send this data to the data collection and distribution system 102. Likewise, the financial data sources 110, the corrosion data sources 114, the alarming data sources 116, etc. may provide data measured in or generated in any standard or proprietary format, and may use any proprietary or open-code applications to measure or generate the data. Generally speaking, therefore, any applications or devices now used (or developed in the future for use) in a process control environment to measure or generate data, results, conclusions, recommendations, etc. may act as a data source to the data collection and distribution system 102 even if these data sources are partially or completely proprietary in nature.

The data collection and distribution system 102 will collect the data from the different data sources in a common format or will convert that data, once received, to a common format for storage and use later by other elements, devices or applications in the process control system. In one embodiment, the different data sources may use a data conversion protocol, such as OPC, PI, Fieldbus, etc. to communicate the data to the data collection and distribution system 102. Of course, the OPC or other conversion interface may be stored in the data collection and distribution system 102 or in the data sources themselves. Further, if desired, any of the data sources may convert its data to a common format used by the data collection and distribution system 102 and communicate that converted data to the system 102. Of course, the data collection and distribution system 102 may convert the data sent by the different data sources to any common format or protocol and store and organize that data in a database in any desired manner. The data collection and distribution system 102 may receive the data from the different data sources in a periodic or aperiodic manner, continuously, or intermittently, synchronously or asynchronously, or at any desired time.

Once received and converted, the data is stored in a database in some accessible manner and is made available to applications or users within the asset management suite 50. For example, applications related to process control, alarming, device maintenance, fault diagnostics, predictive maintenance, financial planning, optimization, etc. may use, combine and integrate the data from one or more of the different data sources to operate better than these applications have been able to operate in the past without data from vastly different or previously unaccessible data sources. The applications illustrated in FIG. 2 as being part of the asset utilization suite 50 may be any of the applications described in FIG. 1 or can be any other types of applications if so desired. Of course, both the data sources and the applications which use the collected data illustrated in FIG. 2 are exemplary in nature and more, less or different data sources and applications may be used. Likewise, the data sources themselves may be configured to receive data collected by the data collection and distributions system 102. In this manner, different vendors or service providers, who may have proprietary applications, may collect certain data that they had not or were incapable of previously acquiring from the data collection and distribution system 102 which may enhance the products or services being offered by these service providers.

In one embodiment, it is expected that traditional process control service providers, who in the past have collected and generated data apart from the process control network using typically proprietary applications, will now provide the collected or generated data to the data collection and distribution system 102 which will then make that data available to other applications. These other applications can be applications executed within computers communicatively connected to the process control environment, such as applications within host devices, user interfaces, controllers, etc. Additionally, these other applications may be applications provided by or used by the traditional service organizations. In this manner, any application can now be designed to use any data generated within the process control system in any manner, whether by applications owned by the process system owners or applications owned and managed by service providers. As a result, there are many, many instances in which applications can be enhanced because they can use data that was previously unavailable to them. For example, a corrosion analysis service provider may be able to use data collected by a proprietary process control system or proprietary equipment monitoring application to enhance the reliability or predictability of the corrosion analysis. Such cross pollenation of data from vastly different types of service providers and applications was previously unavailable.

Figure 3:
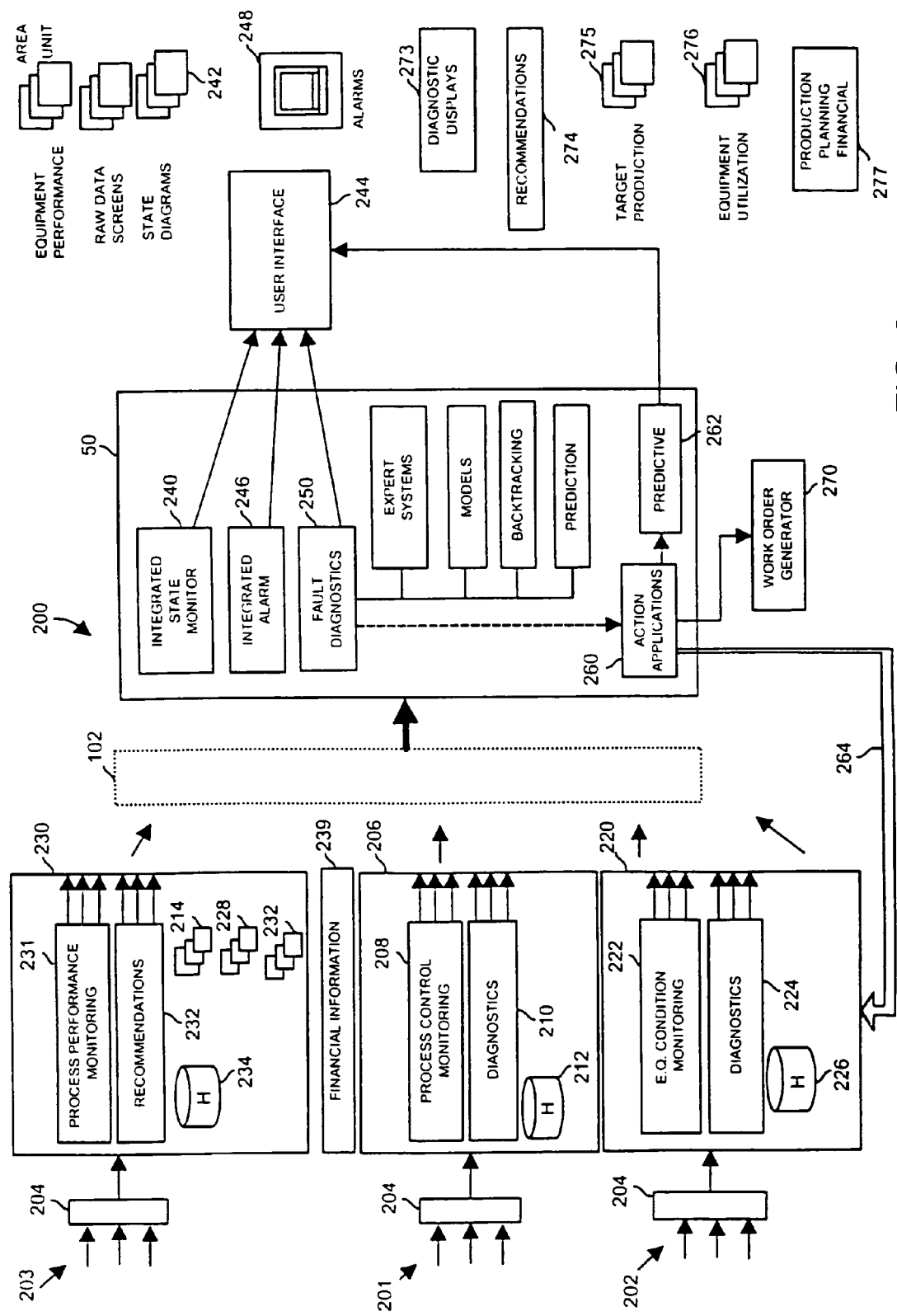
FIG. 3 is a more detailed data flow diagram illustrating the data flow from numerous sources of equipment monitoring, process device monitoring and process performance monitoring data to a data collection and distribution system which then provides this data to an asset utilization and production planning suite that fuses the collected data to create more complete views and/or better diagnostics for a process control plant.

Referring now to FIG. 3, a more detailed data flow diagram 200 illustrating data flow within the process control plant 10 is provided. Beginning at the left side of the diagram 200, data associated with the process plant 10 is collected by or at different functional areas or data sources within the plant 10. In particular, process control data 201 is collected by, for example, typical process control devices such as field devices, input/output devices, handheld or remote transmitters, or any other devices which may be, for example, communicatively connected to process controllers. Likewise equipment monitoring data 202 associated with traditional equipment monitoring activities is collected by, for example, sensors, devices, transmitters, or any other devices within the plant 10. Process performance data 203 may be collected by the same or other devices within the plant 10. If desired, financial data may be collected by other applications run in computers in the process control plant as part of the performance monitoring data. In some instances, the collected data may be from applications or sources outside of the traditional process control network, such as applications owned and operated by service organizations or venders. Of course the data collected may be any of, but is not limited to rotating equipment angular position, velocity, acceleration data (as well as transforms of this data to provide power spectral density, frequency amplitude, etc.), equipment stress data, strain data, wall thickness data, corrosion extent and rate of corrosion progress data, corrosivity of process fluids data, lubrication and wear data, bearing and seal data, leakage presence rate and composition of escaping liquids and gasses data including but not limited to data about volatile organic and inorganic compounds, bearing temperature data, acoustic transducer data, process physical and compositional measurement data, etc. This data may be collected in any manner including automatically or manually. Thus, data collectors may include hand held collection devices, laboratory chemical and physical measurements, fixed or temporary on-line devices, devices which periodically (e.g., RF) telemeter data from remote process and equipment measurement devices, on-line device inputs or remote multiplexers and/or concentrators or any other data collection devices.

The process control data, equipment monitoring data and process performance data may be reconciled, verified, validated and/or formatted by data collection and reconciliation applications 204 (which may be part of the data collection and distribution system 102 of FIG. 2) run within the data collection device or within any other device such as at a central data historian, process controllers, equipment monitoring applications, etc. or any other device which receives or processes this data. Of course, the collected data may be reconciled or massaged in any known or desired manner. For example, the data may be put into a common format or scale, may be converted to different or standard.(common) units, may be scanned for outliers, erroneous or incorrect data, may be verified or validated in any known or desired manner, etc. There are many known methods or techniques of performing data reconciliation and method of reconciling, messaging, verifying or collecting data may be used. Still further, the different types of data may be collected by a common collector or data collector routines even though this data may be in different formats, protocols, etc.

After being reconciled in any known or desired manner or, in some cases, not being reconciled at all, the collected data may be provided to one or more applications typically associated with the different functional areas of the process control system 10. For example, as is known, different process controller or control applications 208 illustrated in FIG. 3 as part of the process control function block 206 may use the collected process control data 201 for a number of reasons or purposes. These process control applications may include, for example, traditional DCS, PLC and SCADA systems, computer control systems, hybrid systems and digital control systems of any type now known or developed in the future. Thus, the process controller applications 208, using any known or desired process control software or techniques, use the process control data 201 to monitor and control ongoing process functions. Such applications may perform any type of process control, including for example, PID, fuzzy logic, model predictive, neural network, etc. process control activities. The process control applications 208 may create, generate or pass alarm data or alarm messages to a process operator, may detect problems or concerns or perform audits associated with regulatory agencies, such as environmental protection agency (EPA) constraints, food and drug administration (FDA) constraints, and may perform other known process control functions which are too numerous to list here. Still further, one or more diagnostic applications 210 may use the collected process control data 201 to perform process control diagnostics. Such diagnostic applications may include, for example, applications which help an operator pinpoint problems within process control loops, instruments, actuators, etc., such as that disclosed in U.S. patent application Ser. No. 09/256,585, entitled "Diagnostics in a Process Control System," which was filed Feb. 22, 1999, is assigned to the assignee of the present application, and is hereby expressly incorporated by reference herein. The diagnostic applications 210 may also include expert diagnostic engines such as that disclosed in U.S. patent application Ser. No. 09/499,445, entitled "Diagnostic Expert in a Process Control System," which was filed Feb. 7, 2000, is assigned to the assignee of the present application, and is hereby expressly incorporated by reference herein. Of course, the process diagnostic applications 210 can take the form of any other typical or standard process diagnostic applications and are not limited to these specifically mentioned herein. Still further, the outputs of these diagnostic applications 210 can take any form and may, for example, indicate faulty or poorly performing loops, functions blocks, areas, units, etc. within the process control system, may indicate where loops need to be tuned, etc.

As also indicated in FIG. 3, a process control historian 212 may be used to store previously collected process control data 201, or outputs of the process control monitoring applications 208, the process control diagnostic applications 210 or any other desired process data. Of course, the process control monitoring applications 208 and the diagnostic applications 210 may use the data stored in the historian 212 in any known or desired manner. Still further, the applications 208 and 210 may use process models 214 (which may be part of the models 56 of FIG. 1 and part of a performance monitoring functional area) which may be created to model all or part of the process units or areas within the process 10.

Still further, an equipment monitoring functional block 220 receives the equipment condition data 202 or the reconciled version of such data if reconciliation is performed on that data. The equipment monitoring functional block 220 includes equipment or condition monitoring applications 222 which may, for example, accept or generate alarms indicating problems with various pieces of equipment, detect poorly performing or faulty equipment within the plant 10 or detect other equipment problems or conditions which may be of interest to a maintenance person. Equipment monitoring applications are well known and typically include utilities adapted to the different specific types of equipment within a plant. As such, a detailed discussion of these applications is not necessary. Likewise, equipment diagnostic applications 224 may be implemented to detect and diagnose equipment problems based on raw data measured pertaining to the equipment. Such equipment diagnostic applications 224 may include, for example, vibration sensor applications, rotating equipment applications, power measurement applications, etc. Of course, there are many different types of known equipment condition monitoring and diagnostic applications which can produce many kinds of different types of data associated with the state or operating condition of different pieces of equipment within a process control plant. Still further, a historian 226 may store raw data detected by equipment monitoring devices, may store data generated by the equipment condition monitoring and diagnostic applications 222 and 224 and may provide data to those applications as needed. Likewise, equipment models 228 (which may be part of the models 56 of FIG. 1 and thus part of the performance monitoring functional area) may be provided and used by the equipment condition monitoring and diagnostic applications 222 and 224 in any desired manner. The creation and use of such models is well known in the art and need not be described further herein.

Likewise, a process performance monitoring functional block 230 illustrated in FIG. 3 receives process performance data 203 which may or may not be reconciled, formatted, etc. by the data collector 204. The process monitoring functional block 230 includes process performance monitoring applications 231 which may, for example, use process control models 214, process equipment models 228 or performance models 232 to perform process performance monitoring in any known or desired manner. Another set of applications 233 may use the output of the process performance monitoring to make recommendations to user or advise user how to change process equipment configuration to perform better overall use of the process or to produce a process which operates more efficiently or makes more money. A process performance monitoring historian 234 may store raw data detected by the process performance monitoring devices, may store data generated by the process performance monitoring applications 231 and the recommendation applications 233 and may provide this data to other applications as needed. The creation and use of process models and process performance monitoring applications is known and will not be described further herein.

As illustrated in FIG. 3, financial data, in the form of financial constraint data and process operation constraint data including, for example, what products must be produced, the quality of the produced products, time deadlines, cost and supply constraints, pricing and valuation data of products made or sold, etc. may be collected at a functional block 239. Generally speaking, although it is not necessary, the functional block 239 will include a computer running one or more data input applications that collects process performance data from the models 214, 228 and 232 and financially related data from persons associated with the process 10, such as managers, or from other sources. These financial applications may also generate this data. However, this financial data may come from many other sources instead or in addition to those listed here.

While the collection and processing of data as described above with respect to FIG. 3 is currently being performed in process control plants, generally speaking, the collected data, i.e., the process control data, the process monitoring data, and the equipment monitoring data is provided to different people, is collected and used in different formats and is used by completely different applications for different purposes. Thus, as explained above, some of this data may be measured or developed by service organizations who use applications that are proprietary and not compatible with rest of the process control system. Likewise, data collected by or generated by financial applications typically used in a process control environment may not be in a format or protocol recognizable or useable by process control or alarming applications. As a result, a maintenance person and the equipment monitoring and diagnostic applications that such a person uses do not typically have access to (and have not be constructed to use) data collected by or generated by any of the process control applications, process models or financial applications. Likewise, the process control operator and the process control monitoring and diagnostic applications used by that person do not generally have access to (and have not be constructed to use) data collected by or generated by the equipment monitoring applications and performance modeling or financial applications. Similarly, a business person may not have any access to data collected by or generated by either of the process control or equipment monitoring applications and, in fact, may have a whole different set of data on which to operate and make decisions about the operation of the plant 10. Likewise, much of the data measured by or generated in the functional blocks 206, 220, 230 and 239 is done so by service organizations who use proprietary applications and who generally do not make much of their data available for other uses.

To overcome the limitation of limited or no access to data from various external sources, the data collection and distribution system 102 is provided to collect data, convert that data if necessary into a common format or protocol that can be accessed and used by applications within the asset utilization suite 50 illustrated in FIG. 3. In this manner, the applications within the asset utilization suite 50 receive the different types of data from the different functional areas or data sources including the process control functional area 206, the equipment monitoring functional area 220 and the performance monitoring functional area 230, and integrates this data in any of a number of ways to the direct benefit of the operation of the plant 10. The goal of the asset utilization suite 50 may be to produce a better view of the plant 10, enable better understanding of the overall condition of the plant 10, and allow better decisions to be made regarding the control or use of the plant 10 or the assets of the plant 10 based on all of the data in the plant and, overall, to run the plant 10 more optimally. The integration of the different types of functional data may provide or enable improved personnel safety, higher process and equipment uptime, avoidance of catastrophic process and/or equipment failures, greater operating availability (uptime) and plant productivity, higher product throughput stemming from higher availability and the ability to safely and securely run faster and closer to design and manufacturing warrantee limits, higher throughput stemming from the ability to operate the process at the environmental limits, and improved quality due to the elimination or minimization of equipment related process and product variations. To the contrary, in the past, the different functional areas, e.g., the process monitoring, the equipment monitoring and the performance monitoring, were performed independently and each tried to "optimize" their associated functional area without regard to the effect that given actions might have on the other functional areas. As a result, for example, a low priority equipment problem may have been causing a large problem in achieving a desired or critical process control performance, but was not being corrected because it was not considered very important in the context of equipment maintenance. With the data collection and distribution system 102 providing data to the asset utilization suite 50, however, persons can have access to a view of the plant 10 based on two or more of equipment monitoring data, process performance data, and process control monitoring data. Similarly, diagnostics performed for the plant 10 may take into account data associated with process operation and the equipment operation and provide a better overall diagnostic analysis. Thus, applications within the asset utilization suite 50 may use the process control, equipment monitoring and process performance data to make better or more complete decisions that, while not being strictly optimal for one functional area, may optimize the overall plant operation in a way that the independent operation of the different functional areas does not allow.

While the data collection and distribution system 102 can be located between the functional data collection or generation sources 206, 220, 230 and 239 and the asset utilization suite, it can also or instead be located elsewhere in the system 10 depending on what the different data sources which are collecting the disparate data are. In fact, the data collection and distribution system 102 can be located anywhere in the flow diagram of FIG. 3 depending on what the data sources are and which sources are already integrated or provide data in a standard or recognizable format. As indicated above, the data collection and distribution system 102 may be located between the asset utilization suite 50 and the functional areas 206, 220, 230 and 239, which will normally be the case. However, the data collection and distribution system 102 may be located in front of any or all of the functional areas 206, 220, 230 or 239 or some combination of these two. Still further, while the data collection and distribution system 102 has been illustrated as being centralized, i.e., in one place, it could be spread out and implemented at multiple places in the system 10. Thus components of this data collection and distribution software could be executed in multiple different devices in order to be able to collect more or better data from disparate data sources. Each of these multiple data collection applications could operate to collect data from one or more sources, depending on the collection needs and placement of these applications and each application could then provide the collected and formatted data to one or more centralized databases within the system from which this data can be accessed by other applications.

Referring again to FIG. 3, the asset utilization suite 50 is illustrated as including a number of applications which use data collected from different functional areas or data sources within the process control plant 10 including, for the sake of illustration, the performance monitoring functional area 230, the process control functional area 206, and the equipment monitoring functional area 220. Of course, the asset utilization suite 50 may receive any of the data from these areas including the raw data, the reconciled data, the data stored in the historians 212, 226 and 234, the data produced by the monitoring applications 208 and 222, the data produced by the performance models 232, and the data produced by the diagnostic applications 210 and 224. If desired, the asset utilization suite 50 may also use the process models 214 and the equipment models 228. It will be understood that while the asset utilization suite 50 is illustrated as including a specific number of applications, the suite 50 could include any number of applications including one or more which perform any one or more of the functions described herein.

In particular, the asset utilization suite 50 illustrated in FIG. 3 may include one or more integrated plant state monitor applications 240. Such plant state monitor applications 240 may include the index generation application 51 of FIG. 1 that creates indexes associated with devices, like process control and instrumentation devices, power generation devices, rotating equipment, units, areas, etc. and/or associated with process control entities, like units, loops, areas, etc. within the plant 10 based on two or more of process control information and device information and performance information. The generation and display of these indexes will be described in more detail later. However, generally speaking these indexes may be based on process control data as well as process performance and equipment monitoring data and may be displayed in a consistent format to a user via an integrated display.

As illustrated in FIG. 3, the asset utilization suite 50 may include or use an integrated display application 244 (which may be any or all of the interface applications 58 of FIG. 1) that displays different data to any user in an integrated or common manner. Generally speaking, the display application 244 is configured to provide different information to any user, wherein the displayed information reflects or is based on two or more of the process control data 201, the equipment monitoring data 202 and the process performance data 203. The application 244 receives inputs from other applications within the suite 50 and may enable a user to view the raw data 201, 202 and 203, may enable a user to go from screen to screen to view different parts or aspects of the plant 10 based on the raw data or processed data, may enable a user to view processed data, such as data generated by the equipment condition, process monitoring or performance monitoring applications 222, 208 and 231 the process models 214, the equipment or process diagnostic applications 224 and 210, or data generated by other applications within the asset utilization suite 50.

The asset utilization suite 50 may also include an integrated alarming application 246 which may receive both process and device alarms and may display these alarms in a consistent format to a user. Such an integrated alarm display application is disclosed in U.S. patent application Ser. No. 09/707,580, entitled "Integrated Alarm Display in a Process Control Network," which was filed Nov. 7, 2000, is assigned to the assignee of this application and which is expressly incorporated by reference herein. The integrated alarm application 246 may produce user displays 248 which provide information on the received alarms, provide an alarm banner integrating the alarms, etc.

The asset utilization suite 50 may also include one or more integrated diagnostic applications 250 which integrate the process control data 201, the process performance data 205 and the equipment condition data 202 to perform diagnostics on a plant wide basis. For example, there are many instances when process equipment data and process control data can be combined to produce a better diagnostic analysis about a condition within the plant 10 than the use of just one of those types of data. Likewise, the output of an equipment condition diagnostic application 224 and the output of a process control diagnostic application 210 can be combined to produce a more complete diagnostic analysis for a process plant than the output of either of the individual applications. The integrated diagnostic applications 250 may include expert engines of any desired types, process and/or equipment models and predictive applications that make predictions about conditions in the plant 10 based on data received or other diagnostic decisions made from other applications. Of course, the integrated diagnostic application 250 may provide a user display via the interface application 244 to indicate different diagnostic analyses. Further, the integrated diagnostic application 250 may enable a user to configure the application 250 to thereby create specific integrated diagnostic determinations. For example, a user may be presented a configuration screen in which the user selects different diagnostic applications to be performed (including for example, both process diagnostic applications 210 and equipment monitoring applications 224) and may then combine or make other diagnostic decisions based on the outputs of these selected diagnostic applications. In this case, the user may connect the outputs of certain known process and equipment monitoring or diagnostic applications to a new function (which may be, for example, a process performance function) which combines or evaluates these outputs in some way to make a diagnostic determination. Alternatively, a new diagnostic application using both process control data 201 and equipment monitoring data 202 may be created to perform plant diagnostics. In these examples, the diagnostic application 250 may output to a user display via, for example, the user interface application 244.

The fault diagnostic applications 250 may also include a backtracking application that uses both process control data 201 and equipment condition data 202 to determine the source of a detected problem. Backtracking applications which try to locate sources of detected problems based on either process control data or equipment conditioning data exist, but no such backtracking application has been used to pinpoint the problems in a plant based on both process control data and equipment conditioning data. The use of a backtracking application using both process and equipment data may provide a better or more complete answer as to the cause of a problem or condition within the process plant 10 than previous backtracking applications that use only one of process or equipment data. Of course, these backtracking applications integrate process control and equipment monitoring data and, if desired, process performance data to determine a cause of a problem. Such a cause may be a combination of factors that may be weighted differently, a detection of process and equipment conditions that should not exist simultaneously (such as a pump running and a shutoff valve closed), etc. The presentation of these problems may be in terms of probabilities, weighting, predicate condition states, etc. These backtracking or other diagnostic applications may use formal models of the process and equipment, as well as the derivatives of the input and output variables and actual measurements of these variables to compute the total derivative of the output variables with respect to the input variables and evaluate this total derivative using real process measurements to compute the causal contributions of different potential sources. The causal data may also be verified, validated and reconciled with the actual output data from the plant 10 to determine how well the predictions held out.

In any event, one or more other action applications 260 may be provided to take some action with respect to diagnostic decisions made by the integrated diagnostic application 250 or in response to alarms or other conditions. For example, the application 260 may provide a list of potential actions or recommendations to a user via the user interface application 244, or to a predictive application 262 which may predict the result of such recommendations and display such results to a user via the integrated display application 244. These recommendations may, for example, be designed to take actions to correct a problem, to get longer life out of the plant 10, to run the plant 10 more economically or within set financial or EPA constraints, to avoid future problems based on current or predicted process and equipment functionality, etc. The application 260 may also enable the user to run simulations of the plant 10 based on proposed actions to see the simulated effect of these applications prior to implementing the action. The application 260 may take actions to collect more or better data in the act of making a better diagnostic decision. This data collection may entail automatically causing the equipment condition monitoring or the process monitoring applications or the performance monitoring applications to collect more or different types of data.

The application 260 may also, if so configured, automatically take actions within the plant 10, such as resetting set points, tuning loops, reconfiguring equipment, etc. as indicated by the feedback path 264 based on the diagnostic decisions made by the application 250, alarms, etc. These actions may or may not involve using process control applications, equipment monitoring and control applications to implement changes to the system. These actions may also entail reconfiguring the plant 10 to make a different or more of one type of product over another or to otherwise reconfigure the plant 10 to maximize financial gains or effect other concerns. Still further, the application 260 may call other applications, such as an automatic work order generation application 270 (which may be the application 54 of FIG. 1) to order parts needed for equipment, to order raw materials needed to produce new products, etc. Of course, the application 260 may, use integrated alarming, financial constraints or directives or other data to take emergency actions, to perform control to cause automatic or manual changes to be made to the plant 10 to effect directives etc. as necessary.

As will be understood, the user interface 244 can display any or all of a number of different types of user screens based on the application within the suite 50 being executed. Thus, for example, the user interface 244 may display equipment performance screens, raw data screens, sates diagrams 242, etc. The user interface 244 may also display integrated alarm screens 248 produced by the integrated alarm application 246. Similarly, diagnostic displays 273, recommendation screens 274, and screens indicating target production and equipment utilization 275 and 276 may be created by any of the fault diagnostics applications 250. Likewise, production planning and financial screens 277 of any nature may be created by the action taking applications 260. Of course, other types of screens and displays may be created by these and other applications based on data from numerous data sources.

It will be noted that, while FIG. 3 illustrates the process control, the equipment monitoring and diagnostic, and the performance monitoring applications as being separate from the suite of applications 50, these specific applications could be part of or used by the suite of integration applications 50 if so desired. Further, while FIG. 3 illustrates data associated with one embodiment of a plant 10, FIG. 3 is not meant to indicate physical locations of any of the applications within the suite of applications 50. Thus, any and all of the applications and hardware illustrated in FIG. 3 can be located at any desired places within the plant (or even away from the plant 10 if so desired) and these applications need not be located in the same place. Still further, the flow of data between data collectors and the data collection and distribution system 102 as well as between the data collection and distribution system 102 and the applications illustrated in FIG. 3 may occur over any desired network, such as a LAN or WAN, the Internet, any Intranet, etc. Data may be transported in any desired manner using any desired hardware including, for example, any physical medium, any dedicated or shared information transport method including without limit the use of wired, wireless, coaxial cable, telephone modem, fiber otic, optical, meteor burst, satellite, etc. devices. This communication may also use any desired protocol including without limit, Fieldbus, XML, TCP/IP, IEEE 802.3, blue tooth, X.25, X.400, protocols or any other protocol now known or developed in the future.

Moreover, the data may be conditioned or compressed in any stage of being sent to, used by or sent from the integration applications 50. Of course, any known or desired compression may be used including, for example, wavelet signal representation, Fourier, Hadamard, etc. transformation, communication of Fourier etc. coefficients, exception processing, swinging door data compression, etc.

Still further, the integration applications 50 such as the diagnostic application 250 may use any joint models of process equipment and behavior to make diagnostic or predictive decisions including, for example, formal mathematical models, statistical correlations, Kalman filter based estimators, neural networks, fuzzy logic based models or any combination of these or other models.

In one embodiment, the diagnostic application 250 may enable a user to view the characteristics of the waveforms of process or condition monitoring sensor outputs and trend and/or alarm and/or invoke control changes when these patterns change. This functionality can be implemented by pattern recognition with alarm bounds on the feature set, or by looking at the Fourier components and providing trending and/or alarming and/or control initiation based on limits set on the individual Fourier coefficients or a weighted combination of the Fourier coefficients or some function thereof (e.g. the square, total AC power, the PSD coefficients etc.)

In one embodiment, one or more cards, such as input/output (I/O) cards connected to one or more of the process controllers 12 or 14 of FIG. 1 may be provided to collect, convert and process or buffer condition monitoring inputs from process and equipment monitoring activities and thus, these cards may implement part or all of the data collection and distribution system 102. These I/O cards (which may be subassembly processors having data collection routines implemented thereon) may perform data collection activities for some or all of the devices, areas, etc. of the process plant 10 to provide the data needed by the integrated applications within the plant 10. These cards may be configured to collect any or all of the process control data, equipment monitoring data or process performance data from various and multiple and different device types or sources within the process control system. Again, such data sources may include, for example, hand held collection devices, laboratory chemical and physical measurement sources, direct on-line input sources and remote sources. Still further, another card, such as an I/O card connected to a controller may be provided to store and implement the one or more of the integrated applications described herein. Thus, while FIG. 1 illustrates the data collection and distribution applications, as well as the integrated applications within the asset utilization suit being implemented in a centralized computer 30, these applications, and the data collection activities for these applications may be implemented in one or more dedicated cards or other devices distributed throughout the process plant 10. These cards or subassembly processors could be connected directly to a user interface and controller via a system bus such as the bus 32 of FIG. 1 or could be part of an input/output system associated with one or more of the controllers, or could be located elsewhere. Of course, one such dedicated card could run all of the integrated applications or any subset thereof depending on the configuration and nature of the process plant 10 in which it is being used. In some cases, some preprocessing of data collected at the controller level may be performed and this preprocessed or partially processed data may then be provided to another device, such as the computer system 30, which may complete the integrated processing. In this manner, the integrated applications 50 may be distributed in nature when implemented within a plant environment.

One method of collecting and integrating data from disparate data sources will now be discussed with reference to FIGS. 4–6. In this example, it will be understood the data collected from disparate sources of data is converted into a format being used by the process control system which is implemented using the DeltaV process control system sold by Fisher Rosemount Systems, Inc. As a result, the process control data is not a remote data source. However, other data, such as maintenance data, performance monitoring data, process model data, financial data, etc. is from external data sources. Generally speaking, this system is configured using a configuration system that stores data about and tracks the configuration of the system. In the past, such a configuration system was limited to the placement and interaction of process control devices, software and strategies and, to a limited extent, included maintenance information about certain devices such as field devices. However, because the main focus of the system was to cater to process control operators, the information displayed to the user and tracked by the configuration system was generally limited to process control data. In this known system, a configuration data base stored, and an explorer application displayed information pertaining to the process control devices and the data collected by and generated by these devices.

Generally, in order to enable data from different data sources to be collected and used in a single system, a configuration database or other integrated configuration system is now provided to enable different data sources to provide data to the system for use as a single data source. Such a configuration database is used to collect and store data from other, disparate sources of data and an explorer-type display or hierarchy is provided to allow the manipulation, organization and use the collected data to thereby make that data available to different applications.

Figure 4:
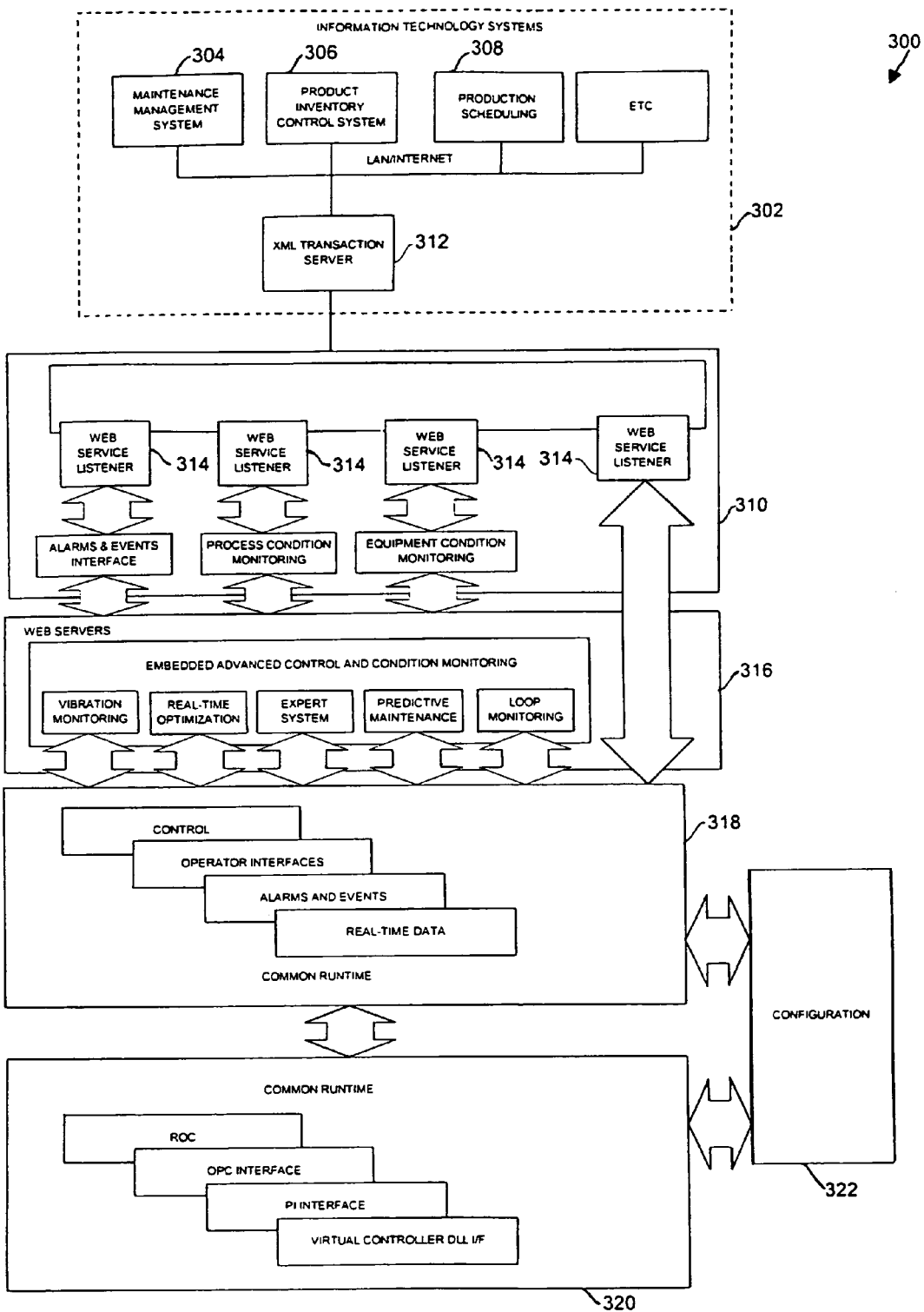
FIG. 4 is a block diagram illustrating an architecture for one embodiment of a process control environment that implements a data collection and distribution system associated with multiple disparate data sources.

FIG. 4 illustrates an architectural overview of a system 300 which implements the collection of data from disparate data sources with a process control system. Generally, the system 300 includes an information technology systems (ITS) section 302 which may include a maintenance management system 304, a product inventory control system 306, a production scheduling system 308, as well as other systems connected by a LAN, the Internet, etc. The ITS 302 is connected to a web services section 310 via an XML transaction server 312. The server 312 sends XML wrapped data to the web services 310 indicative of the data used by or generated by the blocks 304, 306, and 308.

The web services 310 includes a series of web service listeners 314 which listen for or which subscribe to certain data from other data sources and provide this data to the subscribing applications. The subscribing applications may be associated with the applications within the ITS 302 or a process control system. The web listening services (which may be part of the data collection and distribution system 102) may listen for and redistribute alarms and events data, process condition monitoring data and equipment condition monitoring data. Interfaces for this data are used to convert the data to a standard format or protocol, such as the Fieldbus or DeltaV protocol or to XML as desired.

The web services 310 are in contact with and receive data from other external data sources via web servers 316. These external sources may include vibration monitoring data sources, real-time optimization data sources, expert system analysis data sources, predictive maintenance data sources, loop monitoring data sources or other data sources. Of course, each source may be connected via a different external server or the two or more of the data sources may share servers where possible. Likewise, these data sources may be embedded in the process control environment or may be separate from it and connected to the external servers via the Internet or other LAN or WAN. In any event, the web servers 316 may implement some of the functionality of the data collection and distribution system 102 by formatting the received data, if desired.

A process control runtime system 318 is in contact with the web services 310 and the external servers 316. The runtime system 318 includes control applications, operator interface applications, alarms and events applications and real-time data applications any of which can use the data from the external servers or from the web services (and thus from the ITS 302). An Interop system 320 is provided to organize and collect the data from the web servers 316 and web services 310 to make this data available in a common or consistent format useable by the process control runtime system 318. The Interop system 320 may include conversion interfaces such as ROC, OPC, PI and Virtual Controller DLL I/F interfaces which can perform data conversion and recognition on the data received from the web servers 316 and the web service listeners 314.

Finally, a configuration database 322 is used to store and organize the data from the Interop system 320 and the process control runtime system 318, including any data from the remote data sources, such as from the external web servers 316 and the ITS 302. Of course, the ITS 302 may also subscribe to and get data from the process control system and the remote data sources via the web services 310.

Figure 5A:
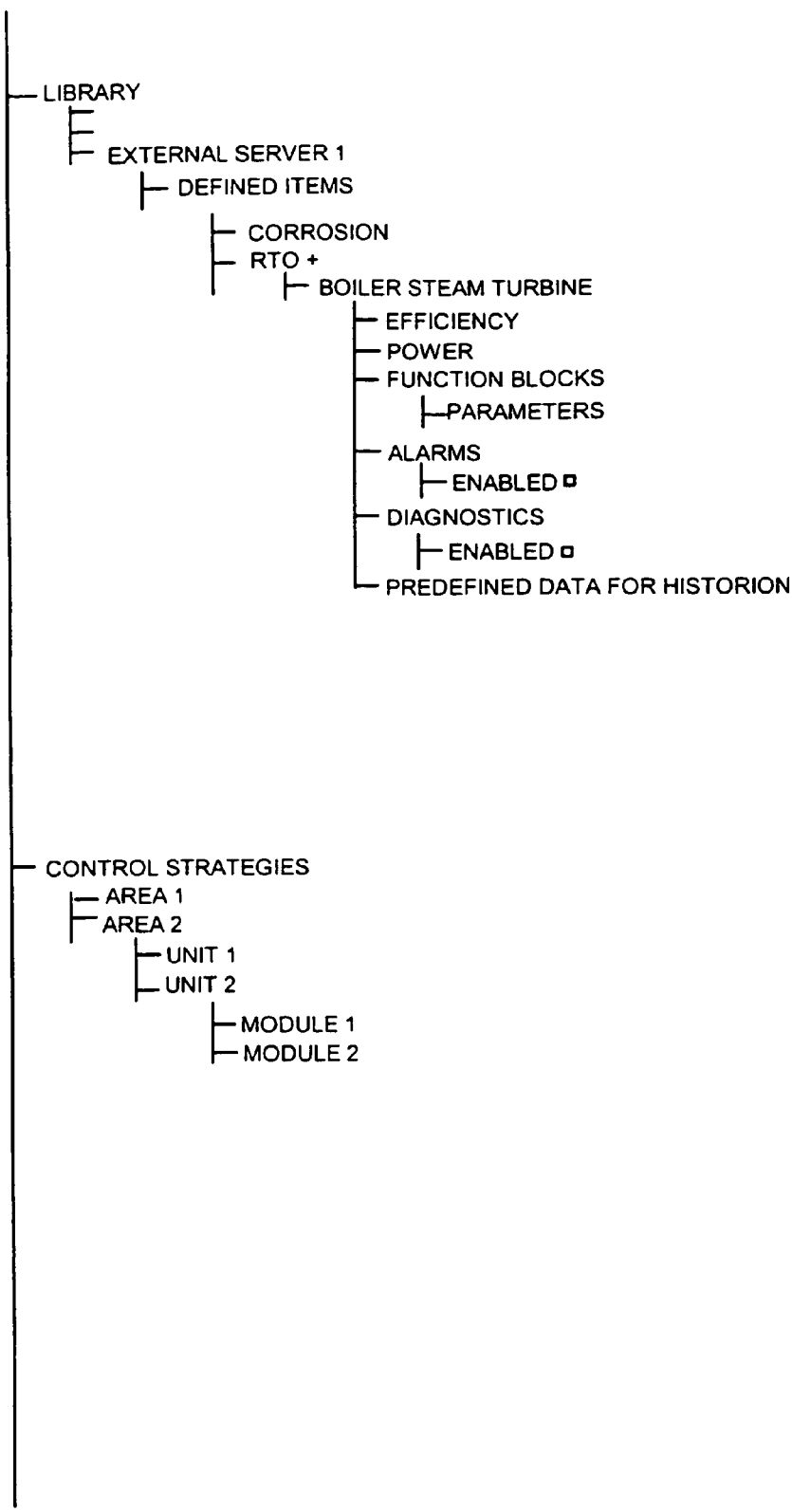
FIGS. 5A and 5B depict one manner of organizing and storing data collected from numerous data sources in a configuration database in a manner that makes this data commonly available to other applications.
Figure 5B:
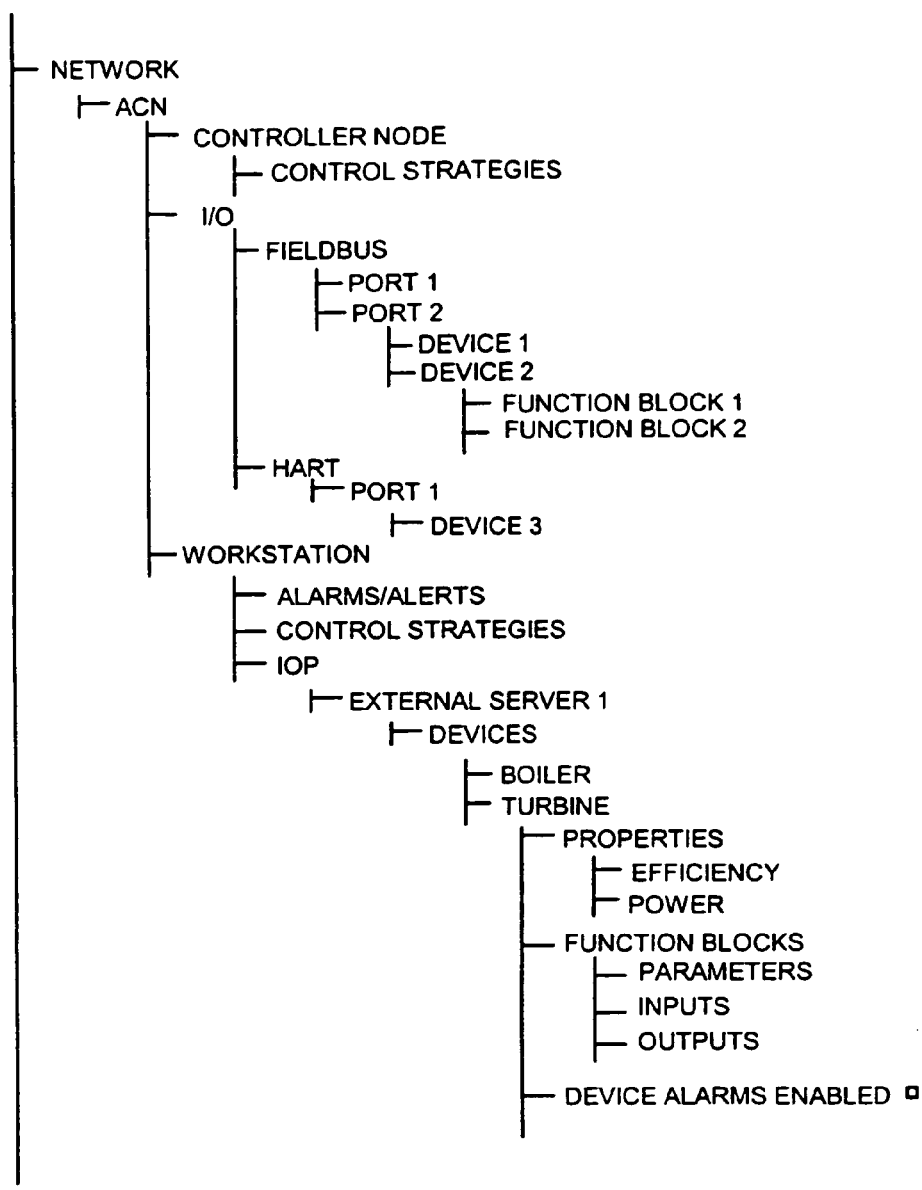

FIG. 5 illustrates an example display 350 generated by an explorer-type navigation tool which may be used to store, organize and access the data collected by the data collection and distribution system 102 as stored in the configuration database 322. The display or hierarchy 350 includes numerous different sections which can be used for different purposes. However, the hierarchy 350 represents an organization of, illustrates an overview of and provides access to the data or other elements available to the system. Thus, the hierarchy 350 is used to represent the data stored in the configuration database as well as to manipulate that data so as to change the configuration of the system in some manner. As can be seen, the example hierarchy of FIG. 4 includes a number of different sections including a "library" section, a "control strategies" section and a "network" section, each of which can be used for different purposes or to represent different data or different organizations of the data stored in or available to the configuration database.

Generally speaking the library section includes lists of and provides access to different elements stored in or associated with the configuration. These elements may be hardware or software elements including, for example, template software modules, field devices, controllers, workstations, etc. To represent, organize and provide access to data from disparate data sources, the library may also include one or more external servers which will be used as data flow conduits from the disparate data sources to the integrated system. These servers are illustrated in FIG. 4 as the web servers 316. As used herein, the integrated system includes all of the hardware and software elements above the data collection and distribution system 102 of FIG. 2. Put another way, the integrated system includes the elements that use the same data format within the system 10.

Beneath each external server and, therefore, associated with it, are defined elements or parameters of the data source using that server as a conduit of data. The defined parameters of the server and, therefore, the data source, may be icons representing applications or hardware devices connected to or stored in the server. These defined parameters may be populated by XML scripts provided by the actual external servers and associated with the different data sources. In some cases, the owners or persons who created the data sources, such as service providers or application creators, may provide the XML scripts defining the operational capability of the servers or data sources associated therewith. Conversely, a user or an operator within the integrated system may populate the library with the information defining the purpose and attributes of the external server.

An example data source illustrated as being associated with an external server in FIG. 4 is the RTO+ application. Generally speaking, the RTO+ application is an optimization application provided and generally implemented by a process control system service provider. This application is usually tailored to a particular process control system and uses models to model the process control plant for the purpose of optimizing the control of the plant. Under the RTO+ icon, which is physically located on the data source side of the external server, the RTO+ application is illustrated as being concerned with a boiler steam turbine. The RTO+ application provides such information as efficiency of that turbine, the power output by that turbine, and other parameters or data measured by or generated by the RTO+ software regarding the turbine. Further, other elements related to the boiler steam turbine, as provided by the RTO+ software, are illustrated in the library. For example, function blocks defined for or associated with the turbine or listed here as well as parameters of those functions blocks. Likewise, alarms associated with the turbine are illustrated and may be enabled (turned on) or disabled (turned off) here. Likewise, an indication of whether other applications, such as diagnostic applications, which may need to collect data from the turbine via the RTO+ software, are enabled or disabled. Still further, other predefined history data collections, which define data to be collected and stored about the turbine, is listed in this section of the library. It is to be noted that the alarms and other services such as the diagnostic services are not actually parts of the boiler steam turbine. However, they are listed in the library under this element because they acquire data from the turbine and therefore support the turbine.

Referring now to the control strategies portion of the hierarchy 350, the control strategies are organized by, for example, geographical areas such as Area 1, Area2, etc. Each area may be broken down into different units such as Unit1, Unit2, etc. Still further, each unit then can have numerous modules associated therewith. These modules may be any modules, such as modules developed within the process control network in the consistent format or modules associated with disparate data sources. These modules are generally used to configure how different applications operate in conjunction with each other and communicate with each other. This functionality will be described in more detail with respect to FIG. 6.

The control strategies section illustrates information, as stored in the configuration database, regarding the current configuration of the system 10, including the location and interaction of different hardware in the system 10, the location and interaction of different software elements within the system 10, etc. An operator or user can manipulate the configuration of the system by manipulating the elements within the display 350. For example, to download a piece of software into a hardware device, the user may drag and drop an icon representing that software onto the hardware element. Placing a new device icon into the hierarchy 350 reflects a new device being physically added to the system.

Generally speaking, the configuration database is designed to store and allow manipulation of the modules illustrated in the control strategies sections. Other elements, either hardware or software elements, may be represented by a single module or by a combination of interconnected modules. Thus, when a user is manipulating the icons within the display 350, that user is actually manipulating modules within the configuration database or other databases or memories in which these modules are located.

To enable the collection and use of data from different data sources, the display or hierarchy 350 represents the different data sources as modules or combination of modules. Such modules can then be placed in the configuration hierarchy and can be manipulated in the same manner that modules associated with entities within the integrated system, such as process control modules, are manipulated in the configuration database. When creating a module for a previously unknown or unconnected data source, the user defines the type, nature or meaning of data to be received from that data source in the context of a module. Using this information construct, the data actually received from that data source can then be categorized, labeled, recognized and used within the integrated system in the same manner as data from other modules of elements within the integrated system. In this manner, any type of data that is received from a disparate data source can be collected and stored, even if an organization or person completely unassociated with the integrated system has created the application or device that actually generates the data. Of course it will be understood that the data from the data source is communicated to the configuration database after being converted by a data conversion technique, such as OPC, PI, Fieldbus, etc. As indicated above, this function is performed by the data collection and distribution system 102, not actually shown in the hierarchy 350 of FIG. 5. A more detailed description of a modules for the steam turbine is provided with respect to FIG. 6.

The network section of the hierarchy 350 illustrates the physical and operational interconnections of the network. Of course, there will generally be many different types of devices and elements associated with the network. However, one illustrated element is an ACN (Area Control Node) which includes a controller node. The controller node, in turn, has control strategies, such as control and communication software stored therein. The ACN also includes one or more input/output (I/O) devices which may be Fieldbus I/O devices, HART I/O devices, etc. Of course each I/O device may have different ports, devices, function blocks, etc. connected thereto or communicatively tied to the I/O device. One or more workstations may also be associated with the ACN. These workstations may be user interfaces or other types of workstations. The workstation illustrated in FIG. 5 supports or implements numerous applications or other functional elements including, in this example, alarms and alerts processing or display applications and control strategy applications, such as those which are used to configure the controller, field devices, etc., to get information about the controller and field devices.

To enable the collection of data from different or disparate data sources, an Interoperation (IOP) section is also provided or executed by this workstation. The IOP section (which is also illustrated in FIG. 4) includes one or more of the external servers identified in library section of the hierarchy 350. Here, the RTO+ external server (called external server 1) is supported by the workstation illustrated in the ACN. Of course, other external servers associated with other data sources such as those described with respect to FIGS. 2 and 3 may be provided in this workstation, in other workstations in this ACN or in other ACNs, as desired. Any reasonable number of devices may be supported by the external server. While all of these devices may be associated with the RTO+application or service, not all devices supported by a server need to be associated with one particular data source. In this manner, a single server can support many different data sources.

In this example, one of devices being supported by the external server 1 is the boiler steam turbine discussed previously. As similarly indicated in the library section, the boiler steam turbine may include properties, such as efficiency, power, etc., function blocks, alarms, etc. Also similar to the library section, the user may configure to receive or enable alarms such as device alarms in this location of the hierarchy by selecting the alarm of the turbine device and enabling it here. Still further, the user can access the alarms, properties (such as efficiency and power), function blocks and parameter data in this location of the hierarchy 350.

In this manner, using the IOP section of the hierarchy 350, a user can define and then provide access to data from devices, applications, etc. associated with data sources that were previously unconnected to the integrated system. In some cases, the user will define one or more modules for the external data sources, such as for external devices or applications, and uses these modules to organize and make the data collected from the disparate data sources available to other applications. As part of this process, the user may device function blocks, parameters, alarms, etc. associated with the external data sources. This is the case even though the modules or function blocks for the external data sources do not actually exist within the external data sources but are, instead, located within the data collection and distribution system 102 as implemented by the workstation and external server connected to that external data source.

Using the configuration hierarchy 350 of FIG. 5, the user defines or imports modules associated with data sources, such as devices or applications, connected through external servers supported by the IOP services. FIG. 6 illustrates a configuration screen presented by a configuration application which enables modules to be created and manipulated so as to be connected to other modules within the integrated system. Using this configuration screen, modules for applications and devices within the integrated system and modules for applications and devices outside of the integrated system, i.e., associated with the disparate data sources, can be connected together so as to communicate with one another. This connectedness then defines the data flow between modules and, thus, the data flow between external data sources and applications within the integrated system or vice versa.

Modules may be created by dragging one of a plurality of module templates 360 (on the left side of the screen of FIG. 6) and placing the selected template into the configuration screen 362. The module may then be assigned to a particular device or data source, such as the turbine device within the IOP services or within the library of the hierarchy of FIG. 5 using pop up properties boxes and the like. Once connected with a particular external device or data source via an IOP service and external server, the module may be defined to include certain parameters associated with that device. Such parameters may be properties of the module that are available from the module such as, by way of example, outputs from the module. Some or all of the defined module parameter data may be reflected as associated with the external device or data source in the hierarchy 350 of FIG. 5.

In this case, a steam turbine module 364 includes an efficiency parameter 366 and a power parameter 368 which are available as outputs from the module. The other elements of the module 364 reflected in the hierarchy 350 of FIG. 5 are also provided as part of the module including the function blocks, the device inputs and outputs, alarms associated with the device, etc. The turbine module 364 associated with or created for the boiler steam turbine of the hierarchy 350 of FIG. 5 also includes alarms, which are the alarms identified by or enabled by the user in the IOP or library sections of the hierarchy 350. One of these alarms is available as an output. The outputs of the module are data associated with the turbine device that are provided through the external server from the device itself or other software associated with the device. These outputs may be parameters, measured values, etc. depending on how the module 364 is defined. The inputs to the module are inputs from applications etc. which may be sent through the external server to the actual device or software associated with that device to effect that device in some manner. In effect, the inputs of the module 364 are data or control signals that the associated device will accept or recognize. The function of these inputs will be defined by the device or software associated with the device. These inputs enable data from other modules, such as modules within the integrated system or modules associated with other external data sources to be sent to the external data source or device through the IOP services and thus through the external server connected to the external data source. The external data source may use this input data in any manner it desires. It may, for example, be controlled by this input data, or use this input data to make better or more accurate calculations about the parameters of the device, etc. If desired, the modules for the external data sources may also include software which use the inputs, outputs, parameters, etc. to make calculations of some nature.

In the preferred embodiment of the configuration system, the modules created for the devices, applications, etc. within the integrated system and the external data sources are based on the Fieldbus or DeltaV module concept, which are very similar. Here, the module 364, because it is associated with an external data source which does not use the module organization, is a shadow function block or shadow module. Generally speaking, a shadow function block or shadow module element is a function block or module in the configuration database of the integrated system and is configured to be useable as a module. This shadow module, however, is in contact with the data source or device and has its outputs generated by or provided by that external device. Furthermore, the shadow module provides the inputs it receives to the external data source. Thus, the shadow module merely has inputs and outputs and a state that reflects the inputs to, outputs of and the state of the actual device or data source as determined by the data received from that data source. The use of a shadow module, however, makes the inputs and outputs of the external device or data source accessible to the other modules within the integrated system, such as modules associated with applications in the asset utilization suite 50. In this manner, the shadow function block or module operates as a conduit of information between the external data source and the applications within the integrated system by putting the data received from the external data source in a format that is usable by other applications within the integrated system. The description and use of shadow function blocks is described in U.S. patent application Ser. No. 09/151,084 entitled "A Shadow Function Block Interface For Use in a Process Control Network" which was filed on Sep. 10, 1998, which is assigned to the assignee of the present application and which is hereby incorporated by a reference herein.

Figure 6:
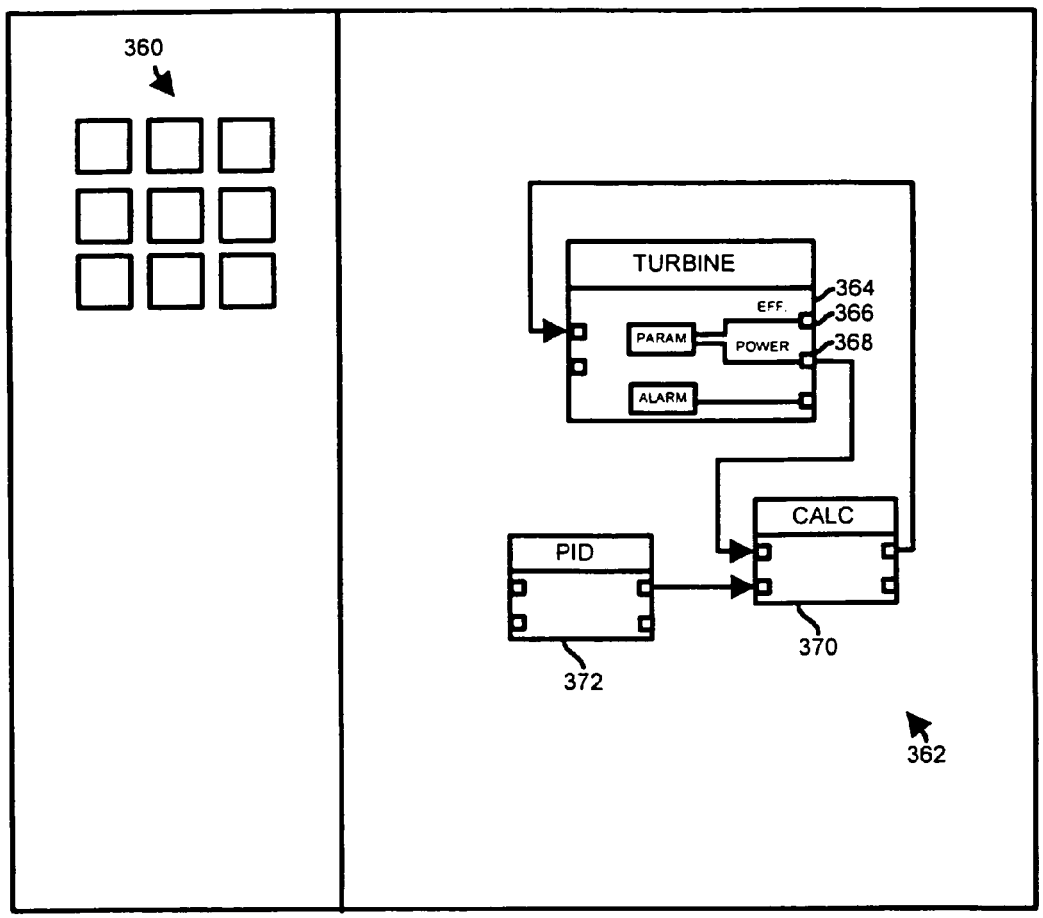
FIG. 6 is a diagram illustrating an application that enables a user to configure a data collection and distribution system to automatically provide collected data to applications within a process control environment in conjunction with the configuration system of FIG. 5.

The configuration screen 362 of FIG. 6 illustrates that the user has configured the turbine module 364 to provide outputs thereof to inputs of another module which is identified as a calculation or Calc module 370. The Calc module 370 includes a power input received from the turbine module 364 and an input received from a PID module 372 which may be a module associated with a process control routine within the integrated system. The Calc module 370 uses these inputs to create an output which may be indicative of a need to change some parameter within the turbine associated with the module 364. In this example, the output of the Calc module 370 is provided to an input of the turbine module 364 so that this data is sent, via the IOP services and the external server, to the application (such as the RTO+ application) that provides the data associated with the turbine. It will be understood that the Calc module 370 is a module which is implemented in and run in a workstation within the integrated system. The Calc module 370 may be associated with another application, such as one of the applications with the asset utilization suite 50. As such, the configuration screen 362 of FIG. 6 illustrates the manner in which one external data source is coupled to an application within the integrated system to provide data to that application. Still further, the application within the integrated system (i.e., the Calc module 360) uses the remote data and process control data to perform a calculation and sends other data or information to the external data source via an external server. It will be understood that the external server is configured to use OPC or any other desired communication conversion protocol to convert the data to the proper format when flowing in either direction between the integrated system and the external data source.

While a configuration or communication strategy between an external data source and an application within the integrated system is illustrated in FIG. 6, it will be understood that modules for other data sources, different modules associated with the same data source, etc. could be created as well and interconnected to provide communication between any external data sources and any applications within the integrated system. Still further, modules from different external data sources could be communicatively coupled together to provide communication between these data sources. In this case, the data collection and distribution system 102 provides the necessary data collection and conversion between the data formats associated with the different external data sources.

One example of manipulation of data from an external data source within a module created to collect and organization data from that source is the use or creation of alarms for an external data source. In particular, alarms can be defined for a module to collect and reflect actual alarm data provided from the external source. Additionally or alternatively, alarms can be created within a module based on data received from the external data source associated with that module. In the case in which alarms are created within the module, a function block within the module can acquire data from the external source as well as data from other sources if so desired and perform any desired computation to determine if an alarm or alert condition exists. If so, this function block may set an alarm signal that will be associated with the module and that can be monitored by or sent to alarming applications which process this alarm in the same manner as other alarms are processed. Such alarm processing could include displaying the alarm to the user, storing the alarm, enabling the alarm to be acknowledged, etc. Furthermore, the alarm capability of a module, such as a module associated with an external data source can be enabled or disabled (which may turn the alarm capabilities of the module on or off) via the hierarchy 350 of FIG. 5. Thus, it will be understood that data from external data sources can be mapped to an alarm within the module or can be used to generate an alarm for the module and, thus, for the external data source.

To access, acquire or view data from an external data or associated with an external data source, a user may go through library section of the hierarchy 350 to view the information associated with the external servers. Additionally, the user may view the control strategies and look for the particular module for the external data source. Still further, the user may use the ACN, workstation, IOP, external server, device path within the hierarchy 350 to find the appropriate data.

Similar to the alarm services, other types of services for the external data sources, such as diagnostic services, may be provided for the external data sources using the hierarchy 350 of FIG. 4 and the data collection and distribution system 102. For example, some diagnostic applications regularly collect data from or about modules within the integrated system and use this data to diagnose problems, poor performance, etc. The same diagnostic applications can now be used to collect data about external data sources using the modules created for that data source. Thus, the data needed by the diagnostic application can be collected in an automatic manner as long as the module associated with the external data source is configured to receive or collect the data needed for the diagnostic application from the external data source. In some cases, the information about the module itself, such as variability within inputs, outputs or other parameters of the module may be used for diagnostic purposes. Of course, any desired data may be collected or used for these diagnostic applications. Similar to alarms, the diagnostic applications, such as the Inspect application sold by Fisher-Rosemount Systems, Inc. may be enabled or disabled in the hierarchy 350 of FIG. 5. This diagnostic application is described in detail in U.S. patent application Ser. No. 09/256,585 entitled "Diagnostics in a Process Control System." Of course, other diagnostic applications could create indexes for the external data source to indicate a health of that data source or device associated with the data source. Such indexes might include a utilization index, a performance index, a variability index or other help index.

Using a common module definition or scheme within the data collection and distribution system 102 makes the creation and use of this system more easily understood, programmed and used. Thus, it may be desirable, although it is not necessary, to use an open or well known module protocol, such as the Fieldbus protocol, the DeltaV protocol, which is very similar to the Fieldbus protocol or other open protocol to create and manipulate the modules described herein. When using such and open protocol, service providers who may be supplying or overseeing the external data sources may be able to support the data collection and distribution system 102 by creating a front end for the external system that uses the open protocol to communicate data to the data collection and distribution system 102. If this is the case, an OPC, PI, etc. front end for the data collection and distribution system 102 may not be necessary for that data source. Instead, the modules created by the data collection and distribution system 102 may simply be imported from the remote data sources themselves. Furthermore, the provision of this front end on the external data sources enables the operators or owners of these data sources to define the data available from their system, to provide alarms and alerts that are most pertinent to their system, to better support diagnostic applications used within the integrated system, etc., all of which makes their products or services more desirable. Likewise, this front end makes it easier for their applications to acquire and use data from other sources, such as other external data sources and applications within the integrated system, which may add value to their product.

While the data collection and distribution system has been describe herein as using modules and being organized and manipulated using an explorer-type hierarchy such as that of FIG. 5, it will be understood that this is only one way to implement this system. Any other manner of collecting the data from external data sources, converting it to a common or usable format, storing that data and providing the data to other applications could be used as well. Furthermore, while the data collection and distribution system 102 of FIG. 3 has been illustrated as being a single entity, it could be distributed in nature. Thus, different workstations or other computer devices spread throughout an integrated system may collect data from different sources and process and store this data in a manner that makes it available to the integrated system.

Once the data collection and distribution system 102 is configured, there are many different types of applications which can use the data collected from disparate data sources to perform new or more complete functions within a process environment. For example, one or more of the applications within the asset utilization suite 50 may be used to execute or oversee the execution of one or more mathematical or software models that model the operation of a particular plant or entities within the plant, such as devices, units, loops, areas, etc. Thus, process or device models may be created and implemented to use the collected data. These models may be based on process equipment or process regions. In one embodiment, to generate these models, a modeling expert divides the plant into component equipment and provides a model for the different component parts at any desired level of abstraction. For example, the model for a plant is implemented in software and is made up of or may include a set of hierarchically related, interconnected models for the different areas of the plant. Similarly, the model for any plant area may be made up of individual models for the different units within the plant with interconnections between the inputs and outputs of these units. Likewise, units may be made up of interconnected equipment models, and so on. Of course, area models may have device models interconnected with unit models, loop models, etc. In this example model hierarchy, the inputs and outputs of models for the lower level entities, such as devices, may be interconnected to produce models for higher level entities, such as units, the inputs and outputs of which may be interconnected to create still higher level models, such as area models, and so on. The way in which the different models are combined or interconnected will, of course depend on the plant being modeled. Of course, these models may receive needed data from external data sources in the manner described above.

Figure 7A:
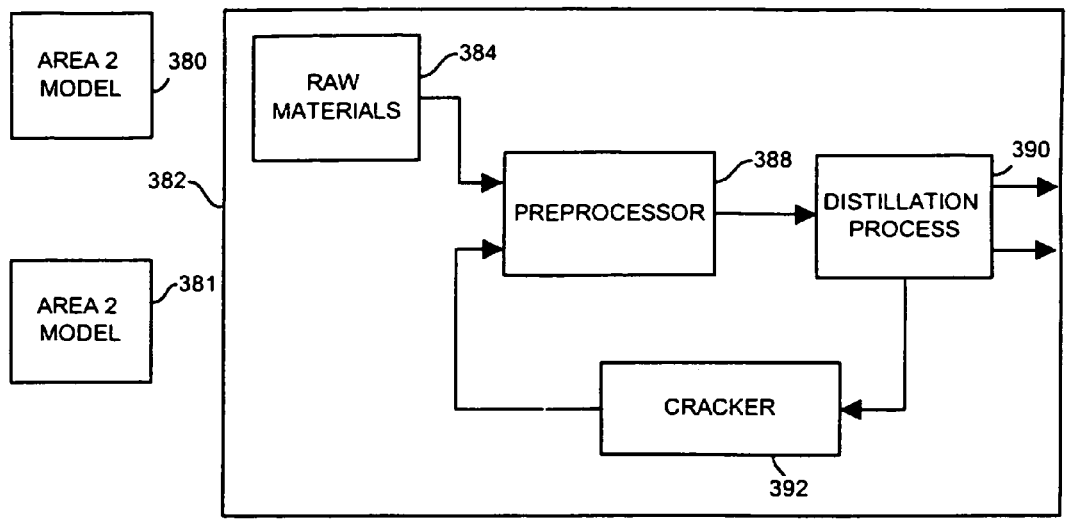
FIG. 7A is a block diagram of a model used to simulate the operation of an area within a plant.

An example use of hierarchical software models will now be described with respect to FIGS. 7A and 7B. FIG. 7A illustrates models for multiple areas 380, 381 and 382 within a refining plant. As illustrated in FIG. 7A, the area model 382 includes a component model of a raw material source 384 which feeds raw material such as crude oil to a pre-processor model 388. The pre-processor 388 provides some refining to the raw material and provides an output, typically crude oil to a distillation process 390 for further refining. The distillation process 390 outputs $C_2H_4$, usually a desired product, and $C_2H_6$ which, generally speaking, is a waste product. The $C_2H_6$ is fed back to a $C_2$ cracker 392 which provides its output to the pre-processor 388 for further processing. The feedback from the distillation process 390 through the $C_2$ cracker 392 is a recycling process. Thus, the model for the area 382 may include separate models for the raw material source 384, the pre-processor 388, the distillation process 390 and the $C_2$ cracker 392 having inputs and outputs interconnected as illustrated in FIG. 7A. That is, each component model may be tied to the inputs and outputs of other component models in the manner illustrated in FIG. 7A to form the model for the area 382. Of course, the models for the other areas 380 and 381 could have other component models having interconnected inputs and outputs. These models may be implemented in a processor associated with an external data source and provide outputs, such as efficiency, etc. to the integrated system. Conversely, the models may be implemented within the integrated system and receive data from one or more external data sources.

Figure 7B:
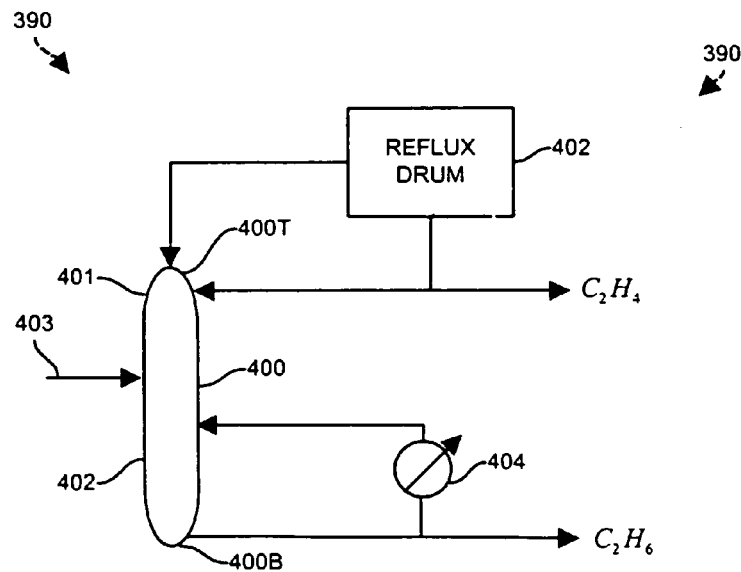
FIG. 7B is a block diagram of a model used to simulate the operation of a unit within the area model of FIG. 7A.

Referring now to FIG. 7B, the component model for the distillation process 390 is illustrated in more detail and includes a distillation column 400 having a top portion 400T and a bottom portion 400B. The input 403 to the distillation column 400 is an indication of pressure and temperature which may be tied to the output of the model for the pre-processor 388 shown in FIG. 7A. However, this input could be set by an operator or be set based on actual measured inputs or variables within the plant 10. Generally speaking, the distillation column 400 includes a number of plates disposed therein and fluid moves between the plates during the distillation process. $C_2H_4$ is produced out of the top 400T of the column 400 and a reflux drum 402 feeds back some of this material to the top 400T of the column 400. $C_2H_6$ generally comes out of the bottom of the column 400 and a reboiler 404 pumps polypropylene into the bottom 400B of the column 400 to aid in the distillation process. Of course, if desired, the model for the distillation process 390 may be made up of component models for the distillation column 400, the reflux drum 402 and the reboiler 404, etc. having the inputs and outputs of these models connected as illustrated in FIG. 7B to form the component model for the distillation process 390.

As noted above, the component model for the distillation process 390 maybe executed as part of a model for the area 382 or may be executed separately and apart from any other models. In particular, the input 403 to the distillation column 400 and/or the outputs $C_2H_4$ and $C_2H_6$ can actually be measured and these measurements may be used within the model of the distillation process 390 in a number of ways as described below. In one embodiment, the inputs and outputs of the model of the distillation process 390 may be measured and used to determine other factors or parameters associated with the model of the distillation process 390 (such as the distillation column efficiency, etc.) to force the model of the distillation process 390 to more accurately match the operation of the actual distillation column within the plant 10. The model of the distillation process 390 may then be used with the calculated parameters, as part of a larger model, such as an area or plant model. Alternatively or additionally, the model of the distillation process 390 with the calculated parameters may be used to determine virtual sensor measurements or to determine if actual sensor measurements within the plant 10 are in error. The model of the distillation process 390 with the determined parameters may also be used to perform control or asset utilization optimization studies, etc. Still further, component models may be used to detect and isolate developing problems in the plant 10 or to see how changes to the plant 10 might affect the selection of optimization parameters for the plant 10.

If desired, any particular model or component model may be executed to determine the values of the parameters associated with that model. Some or all of these parameters such as efficiency parameters may mean something to an engineer within the context of the model but are generally unmeasurable within the plant 10. More particularly, a component model may be generally mathematically described by the equation $Y=F(X, P)$, wherein the outputs $Y$ of the model are a function of the inputs $X$ and a set of model parameters $P$. In the example of the distillation column model of the distillation process 390 of FIG. 7B, an expert system may periodically collect data (e.g., every hour, every ten minutes, every minute, etc.) from the actual plant indicative of the actual inputs $X$ to and the outputs $Y$ from the entity to which the model pertains. Then, every so often, a regression analysis, such as a maximum likelihood, least squares or any other regression analysis may be performed using the model and multiple sets of the measured inputs and outputs to determine a best fit for the unknown model parameters $P$ based on the multiple sets of measured data. In this manner, the model parameters $P$ for any particular model may be determined using actual or measured inputs and outputs to reconcile the model with the entity being modeled. Of course, this process can be performed for any and all component models used within the plant 10 and can be performed using any appropriate number of measured inputs and outputs. Still further, the collected data, or the information calculated from this data, may be provided to the data collection and distribution system 102 and used in modules reflecting these models, the elements modeled by these models, etc.

In any event, using these component models, or the data collected or generated by these models, the asset utilization suite 50 can perform asset performance monitoring by plotting the values of the determined model parameter(s) (and/or model inputs and outputs) versus time. Still further, the models, whether run in a data source or in the asset utilization suite 50, can detect potentially faulty sensors. If one or more of the sensors appears to have a high or an otherwise unacceptable error associated therewith, the asset utilization suite 50 can notify a maintenance person and/or a process control operator of the faulty sensor.

As noted above, the parameters, inputs, outputs or other variables associated with any particular model may be stored and tracked to provide performance monitoring for a unit, an area or any other entity of a process or a plant. If desired, two or more of these variables may be tracked or monitored together to provide a measure of the performance of the entity.

The asset utilization suite 50 can monitor one or more entities based on model parameters or other model variables and can report the operating states or performance measures of these entities to any other desired persons, functions or applications within the process control plant 10, such as to a process control expert system, a maintenance person, a business application, a user interface routine, etc. Of course, the asset utilization suite 50 may perform performance or condition monitoring on any desired entity, based on one, two, three or any other desired number of parameters or variables for each entity. The identity and number of variables or parameters to be used in this performance monitoring will generally be determined by an expert familiar with the process and will be based on the type of entity being monitored.

If desired, the asset utilization suite 50 or more particularly, the state monitor application 240 may define a performance index or plot by comparing one or more of the parameters determined by the models as described above with the same parameter determined by the model run in accordance with the design parameters of the entity being modeled. In particular, the asset utilization suite 50 may execute a model using the design parameters of the entity within the plant 10 to which the model pertains to determine what the designed performance of the entity would be if it was operating according to the current state of the process and using the actual inputs to the entity as measured within the plant 10. This design performance can then be compared to the actual performance of the entity as determined by the component model for that entity or as determined by the measured inputs and outputs of the entity to generate a measure of the performance of the entity.

The component models may also be used to perform process optimization. In particular, the asset utilization suite 50 may use one or more optimization routines which execute the individual component models to optimize the operation of the plant in terms of some optimization criteria provided by, for example, a process control operator or a business person via a business application. The optimizer can be a real time optimizer which operates in real time to optimize the plant 10 based on the actual state of the plant 10 at that time. Alternatively or additionally, an optimizer may determine changes to be made to the plant 10, such as bringing certain devices or units back on line, that will provide the greatest optimization of the plant 10. Of course, other types of optimization routines may be executed instead of or in addition to those mentioned here.

As a result of the above discussion, it can be seen that the use of models provides many new types of data or information for the business applications, process control applications and asset maintenance and performance monitoring applications. In particular, the models can be used to perform performance monitoring and to produce a performance index which indicates the relative performance of a device, unit, area, etc. within a plant. This performance index may be a measure of the performance of an entity with respect to the possible performance of that entity. Furthermore, while device and unit models have been discussed above, similar models could be made and executed for process control entities, such as loops, units, etc. to provide performance measures and optimization criteria for these types of entities as well. Also, as indicated above, models may, in some cases, be used to measure or indicate the health of certain devices or other entities and to provide a health index indicative of these entities. For example, the error measurements of certain input and output sensors as determined by the regression analysis used on certain models may be used as or converted into an indication of the health of those devices. Also, other information not otherwise available to the process controller, such as model parameters and virtual sensor measurements based on the models could be provided to the process controllers or to the business persons for use in numerous manners.

Besides performance and health indexes, the asset utilization suite 50 can assist the index generation routine in creating other types of indexes such as a utilization index and a variability index. A variability index indicates how much some signal into or out of, or some other parameter associated with a device, loop, unit, etc. varies as compared to how much this signal or parameter is expected to vary. The data needed to create this variability index may be collected by the asset utilization suite 50 via the data collection and distribution system 102 and provided to the index generation routine at any desired or convenient times. Of course, the normal amount of variation of a signal or parameter may be set by a manufacturer, engineer, operator or maintenance person familiar with the entity or may be based on a statistical measure (such as an average, standard deviation, etc.) associated with that or other similar entities within the plant and this normal or expected variation may be stored by or updated within the index generation routine.

The utilization index, in one form or another, tracks or reflects the utilization of individual loops or other entities and may provide some indication as to whether these entities are being utilized based on previously determined bench marks or operational goals. A utilization index can be generated based on measured uses of the actual device. For example, a device may be measured as to how often it is being used within a process compared to a desired utilization. The utilization index might identify loops, etc. which are not being used as designed.

As indicated above, the user interface routine 244 provides a graphical user interface (GUI) that is integrated with the asset utilization suite 50 described herein to facilitate a user's interaction with the various asset utilization capabilities provided by the asset utilization suite 50. However, before discussing the GUI in greater detail, it should be recognized that the GUI may include one or more software routines that are implemented using any suitable programming languages and techniques. Further, the software routines making up the GUI may be stored and processed within a single processing station or unit, such as, for example, a workstation, a controller, etc. within the plant 10 or, alternatively, the software routines of the GUI may be stored and executed in a distributed manner using a plurality of processing units that are communicatively coupled to each other within the asset utilization system. Still further, the data used by the GUI to create certain screens may be accessed from external data sources via the data collection and distribution system 102.

Preferably, but not necessarily, the GUI may be implemented using a familiar graphical windows-based structure and appearance, in which a plurality of interlinked graphical views or pages include one or more pull-down menus that enable a user to navigate through the pages in a desired manner to view and/or retrieve a particular type of information. The features and/or capabilities of the asset utilization suite 50 described above may be represented, accessed, invoked, etc. through one or more corresponding pages, views or displays of the GUI. Furthermore, the various displays making up the GUI may be interlinked in a logical manner to facilitate a user's quick and intuitive navigation through the displays to retrieve a particular type of information or to access and/or invoke a particular capability of the asset utilization suite 50.

In one embodiment, similar to FIG. 5 above, the GUI may perform or present a set or series of hierarchical displays in which more basic or common information about the nature of the process control system (such as the areas, loops, devices, controller routines performance monitoring applications, etc. within the plant) is displayed in some manner in a higher level display. Then, in a series of subsequent lower level displays, which may be accessed by selecting and clicking on any of the particular information within the higher level display, may provide further information about the control routines, the maintenance routines, the interconnections of process control equipment, as well as actual performance measurements, process control routine activity such as alarms, problems, etc., performance measurements such as performance recommendations, predictions, etc. and maintenance information such as problems occurring within the plant etc. Other lower-level displays may then provide further information about elements in those displays. In general, such a hierarchical display provides more information about particular areas, loops, etc. and the problems associated therewith from the standpoint of process control activities, maintenance activities as well as process performance activities as the user drills down or go into lower levels in the display.

Generally speaking, the GUI described herein provides intuitive graphical depictions or displays of process control areas, units, loops, devices, etc. Each of these graphical displays may include numerical status and performance indexes (some or all of which may be generated by the index generator routine described above) that are associated with a particular view being displayed by the GUI. For example, a display depicting a process control area may provide a set of indexes reflecting the status and performance of that area (i.e., a particular portion of the process control system at a particular level of the equipment hierarchy). On the other hand, a display depicting a loop may provide a set of status and performance indexes associated with that particular loop. In any event, a user may use the indexes shown within any view, page or display to quickly assess whether a problem exists within any of the devices, loops, etc. depicted within that display.

Additionally, the GUI described herein may automatically, or may in response to a request by a user, provide maintenance information to the user. The maintenance information may be provided by any portion of the asset utilization suite 50. Similarly, the GUI may display alarm information, process control information, etc., which may also be provided by the asset utilization suite 50. Still further, the GUI may provide messages to the user in connection with a problem that has occurred or which may be about to occur within the plant 10. These messages may include graphical and/or textual information that describes the problem, suggests possible changes to the system which may be implemented to alleviate a current problem or which may be implemented to avoid a potential problem, describes courses of action that may be pursued to correct or to avoid a problem, etc.

Still further, the GUI described herein may automatically, or in response to a request by a user, provide process performance information to the user. The process performance information may be provided by any portion of the asset utilization suite 50. Such performance data or information may include performance measures, predictions or recommendations to the user about changes to the process to alter the performance, may include inputting or displaying the performance goals currently being used by the system etc.

Figure 8:
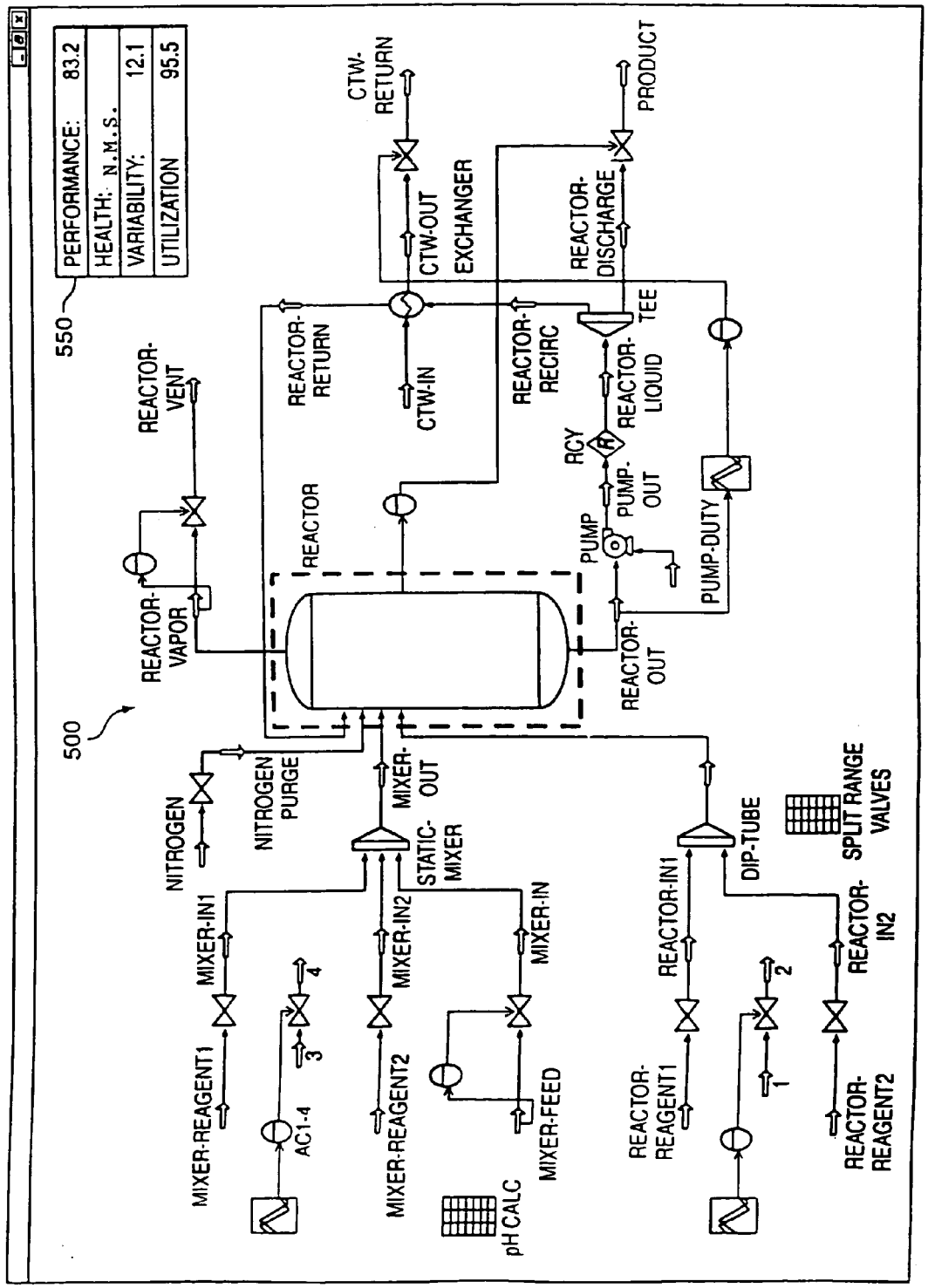
FIG. 8 is an exemplary depiction of a display representing a unit within a process control system that may be displayed by a graphical user interface using data collected from different data sources.

FIG. 8 is an exemplary depiction of a display representing a unit 500 within a process control system that may be displayed by the GUI. As illustrated in FIG. 8, the unit 500 includes a plurality of devices such as, for example, valves, pumps, temperature transmitters, etc., all of which may be depicted graphically as shown. Additionally, the display may further include lines arrows, and any other indicia to represent logical and physical interconnections between the various devices. Of course, such graphical representations of process control systems (or portions of process control systems) are well known in the art and, thus, the manner of implementing these graphical representations or displays will not be described in further detail herein.

The GUI display shown in FIG. 8 also includes a plurality of index names and values 550. In particular, the index names and values 550 include a performance index, a health index, a variability index and a utilization index, all of which have been discussed briefly above in connection with the asset utilization suite 50 and the index generation routine thereof. The index names and values 550 may be displayed in a tabular format as shown or in any other desired format. The index names and values 550 are representative of the performance and status of the entire unit 500 and, thus, the index values shown are preferably, but not necessarily, composed of the index values or fields associated with each of the sub-units and/or devices that make up the unit 500.

Before discussing the GUI and the manner in which asset information, process control information, maintenance information, diagnostic information, performance information or any other type of information is displayed to a user thereby, a brief discussion of the manner in which the performance and status indexes are generated is provided below. Also, it should be recognized that while a performance index, a health index, a variability index and a utilization index are described in detail herein in connection with the various displays of the GUI, additional and/or different indexes may be generated by the asset utilization suite 50 and displayed via the GUI. It will also be understood that some or all of the data displayed by the GUI may come from an external data source.

In general, the indexes generated by the index generator routine and displayed via the GUI may be calculated for individual devices, for logical and/or physical groupings of devices, for logical processes (e.g., control loops), for logical groupings of process equipment such as units and areas, etc. In other words, the indexes may, in principal, be calculated at each level of the equipment and logical hierarchy of a process control system or, more generally, an asset utilization system, which may include one or more process control systems. However, the meaning of a particular index may depend on the context (i.e., whether the index corresponds to a logical or a physical grouping of devices and/or parameters) in which the index is generated and displayed and may depend on the level of the hierarchy at which it is displayed. For example, at the lowest level of the equipment hierarchy, indexes correspond to physical devices such as valves, temperature sensors, actuators, etc. Thus, each device may have a unique set of indexes that may be generated within the device or for the device based on information stored within the device at the time the device is manufactured. Accordingly, each device may generate and provide its indexes to higher levels of the hierarchy and to the asset utilization suite 50 as needed.

Similarly, units or loops, each of which is composed of one or more devices or function blocks may each have a unique set of indexes. Of course, the calculation of one or more of the performance, health, variability and utilization indexes may not be appropriate, required or useful for every level of the logical and equipment hierarchies. Any or all of these indices may be indicative of the health of a device or other entity within the system. For example, the health index (HI) for a device may be based on historical usage of the device. In particular, the device manufacturer may store information relating to the life cycle of the device within the device and, based on the usage of the device and the environmental impacts imparted to the device during its operation (e.g., temperature variations, shocks, etc.), the device may determine to what extent the device has moved along its life cycle curve (i.e., aged). The manufacturer may program a device to provide an HI value which is indicative of the current status of the life cycle of the device. For example, a stroke type valve may have an expected useful operating life cycle of 250,000 full stroke cycles and the manufacturer of the stroke valve device, which is typically a smart field device, has stored in its memory the expected number of lifetime operating strokes along with the current number strokes that the valve has completed. Thus, in the case where an HI value may range from good, need maintenance soon (NMS) and need maintenance now (NMN), the HI value generated may be based on the number of strokes ranging from zero to 250,000. Of course, the precise relationship between the HI values and the life cycle characteristic (e.g., strokes) may not be linear. To the contrary, many life cycle characteristics follow an exponential characteristic, whereby failure and degradation in device performance/ operation progresses more rapidly as time passes, as strokes are completed, etc. Of course, there are many other manners of defining or computing an HI for a device, based on the current detected state of the device and how well it is operating. The HI for a loop, on the other hand, is preferably, but not necessarily, based on functions blocks that make up the loop.

Similarly, the UI calculated for the loop, area and unit levels, represents the degree to which a particular asset (e.g., a loop) is being exploited in comparison to its capacity or desired utilization. For example, the UI value may be based on the amount of time for which loops are being used to perform control as designed.

Figure 9:
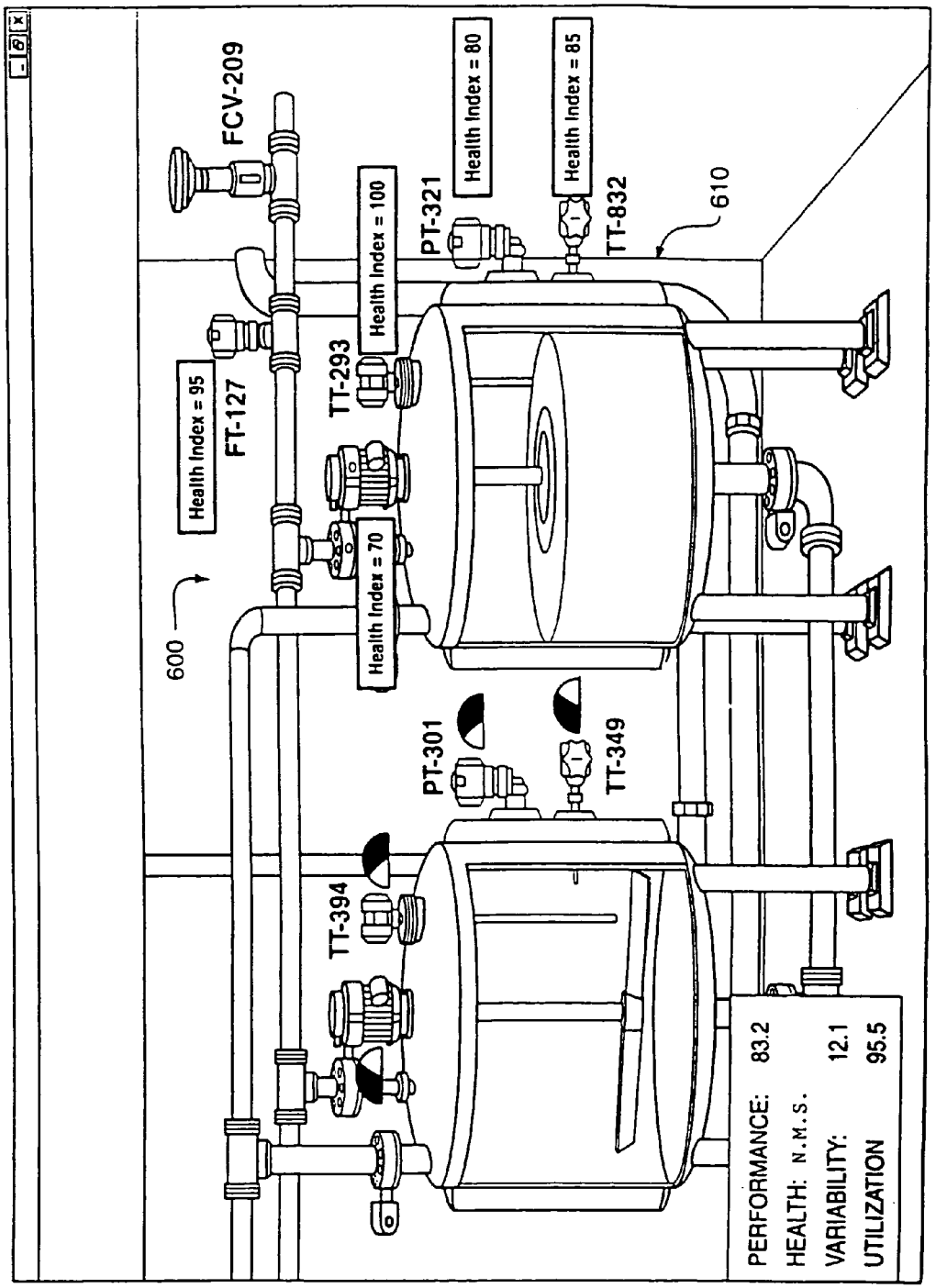
FIG. 9 is an exemplary graphical display that may be provided by a graphical user interface using data collected from different data sources.

FIG. 9 is an exemplary graphical display that may be provided by the GUI to enable a user to quickly analyze the operational status and performance of a process area within the plant 10. As shown in FIG. 9, the GUI may graphically depict the physical equipment (and the interconnections therebetween) within a process area 600. Of course, it should be recognized that although a process area is depicted within the GUI display shown in FIG. 9, any other portion of the plant 10 such as, for example, a unit, sub unit, loop, device, etc. may be shown instead to achieve the same or similar results. In any event, the process area 600 is depicted as having a pair of tanks, a plurality of temperature transmitters, pressure transmitters, flow transmitters, etc. and pipes, all of which may be interconnected as shown in FIG. 9. Further, each of the physical devices may be displayed along with an associated alphanumeric identifier (e.g., TT-394) that uniquely identifies that device within the plant 10 and may also be displayed along with a graphic meter or gauge (i.e., the partially shaded semi-circular features) that enables a user to quickly determine the status of the sensing parameter associated with that device. For example, the GUI may display a graphic meter or gauge associated with a temperature transmitter and may shade more or less of the meter based on the temperature currently being sensed by the temperature transmitter. Importantly, one or more of the VI, HI, UI and PI values may be displayed for one or more of the devices shown within the area 600. By way of example only, the HI values for several of the devices that are connected to a tank 610 within the area 600 are displayed. However, more or fewer HI values could be displayed if desired. Additionally, different index values or groups of index values may be displayed for any of the devices that appear within the area 600 as desired. As can be appreciated from the display shown in FIG. 9, a user can quickly ascertain whether an area is performing properly and will continue to perform properly. Further, a user can also quickly identify those devices, units, sub units, etc. that may need attention and/or which may be causing a particular problem.

It will also be understood that a user may view successively lower and lower entities within a plant and be provided information about the indexes associated with each of these different entities or views. Thus, for example, a user may look at a view of the plant and see a particular set of indexes for the plant. The user may then focus on one area, such as by clicking on one of the areas within the plant view, and see the indexes associated with that area. Similarly, by clicking on units within the displayed area, the indexes for different units may be viewed. Likewise indexes for loops, sub units, devices etc. may then be viewed by focusing in on these different entities from a view of an entity in which these entities are located. In this manner, a user can quickly find the cause of a lower than (or higher than) expected index at any point or level of the plant. Of course, some of the displayed data for the system is based on or developed from data received from external data sources via the data collection and distribution system 102.

Figure 10:
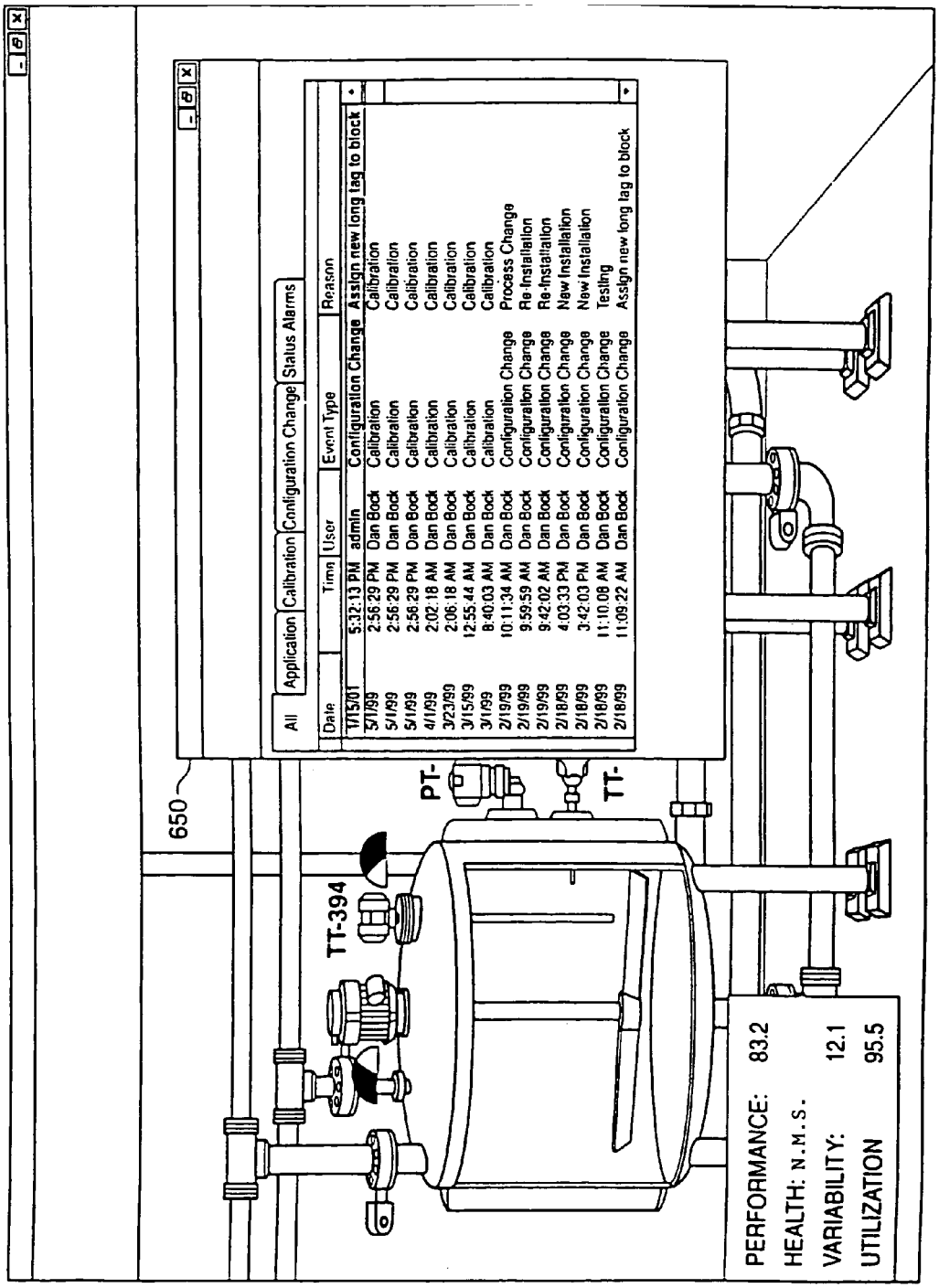
FIG. 10 is an exemplary depiction of a display that may be provided by a graphical user interface to enable a user to view audit trail information compiled from different data sources.

FIG. 10 is an exemplary depiction of a display that may be provided by the GUI to enable a user to view audit trail information in connection with any device used within the area 600. By way of example, a user may use a mouse to click on a given device or its alphanumeric identifier or, alternatively, may enter the identifier via a keyboard, to request a pop-up audit trail window 650 for that device. In this manner, a user can use the audit trail information to determine whether an improper or unacceptable index value may be related to a failure to calibrate the device properly or in a timely manner, whether a device has been configured properly or at all, etc.

Figure 11:
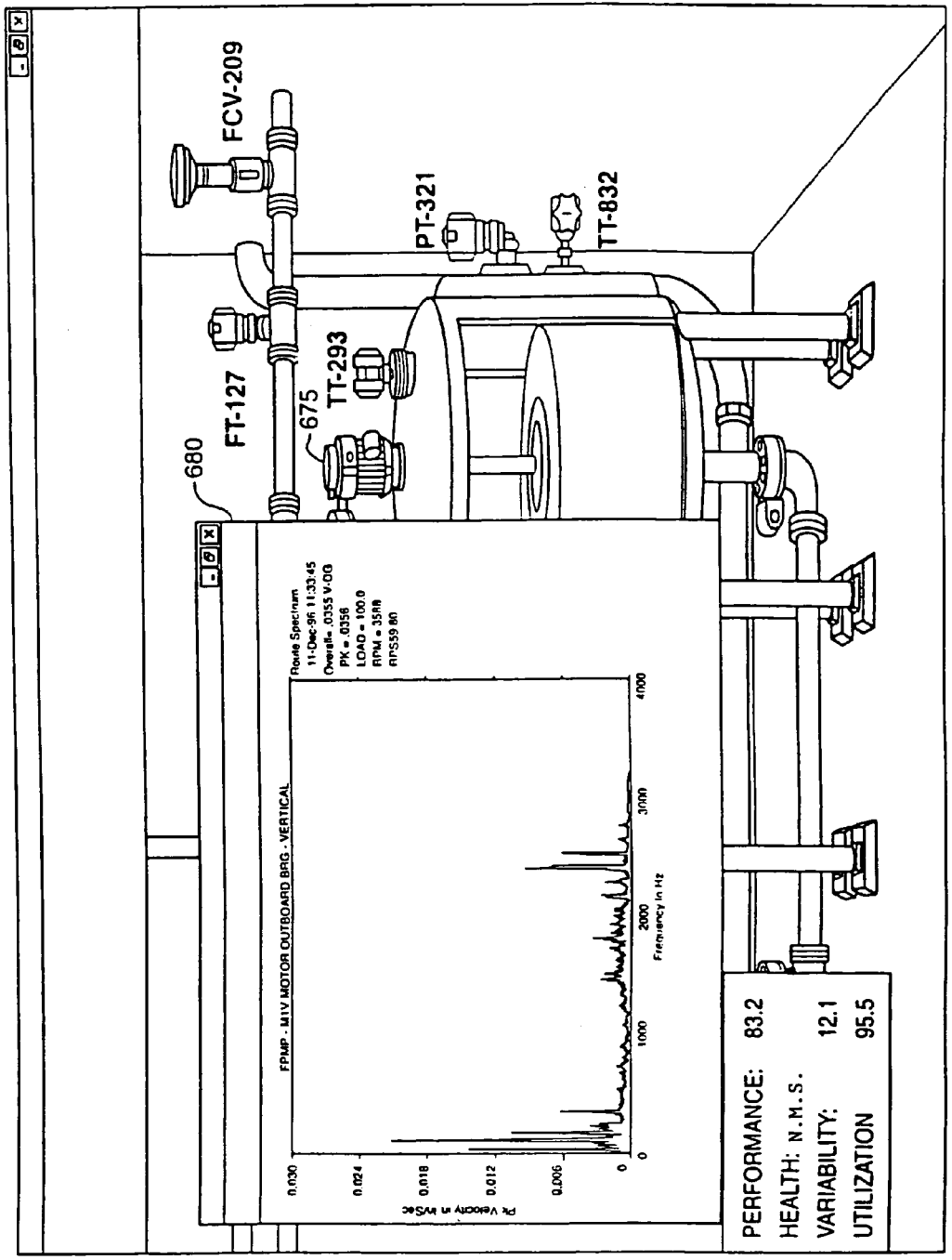
FIG. 11 is an exemplary depiction of a display that may be provided by a graphical user interface to enable a user to perform a more detailed analysis of data collected from different data sources and used to generate one or more indexes for a device.

FIG. 11 is an exemplary depiction of a display that may be provided by the GUI to enable a user to perform a more detailed analysis of the data which may be used in generating one or more of the indexes for a particular device within the area 600 or to perform condition monitoring. By way of example only, a vibration analysis for a motor 675 may be displayed in a pop-up window 680. A user may request such a pop-up window in response to an abnormally high or an abnormally low index value for the unit affected by the motor 675 and/or may request the window if an index value associated with the motor is indicative of a possible problem. Furthermore, if desired, the GUI may automatically provide such pop-up windows containing a detailed data analysis for those devices, units, etc. that have one or more abnormal index values.

Figure 12:
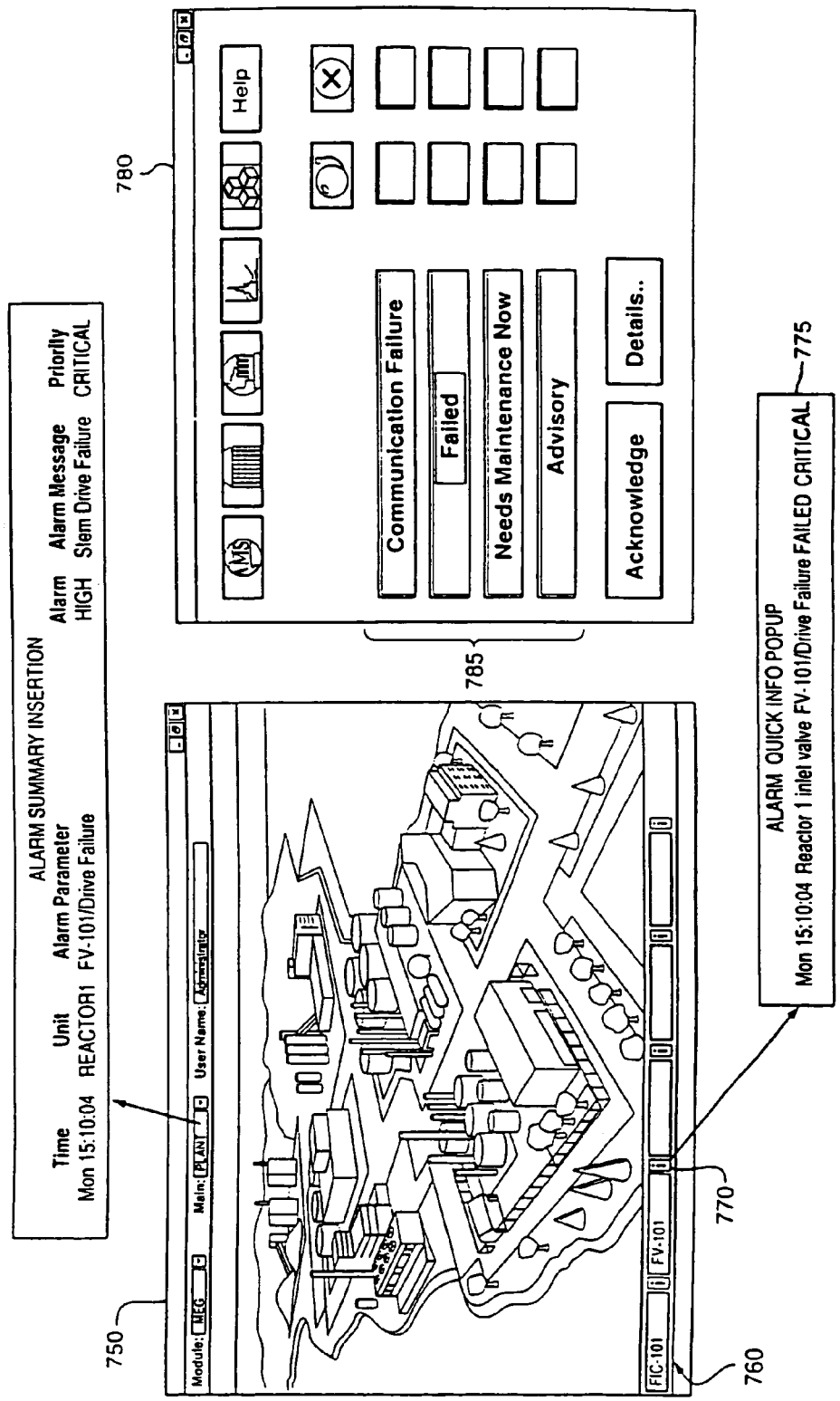
FIG. 12 is yet another exemplary depiction of a display that may be provided by a graphical user interface to enable a user to quickly investigate information within a plant.

FIG. 12 is yet another exemplary depiction of a display that may be provided by the GUI to enable a user to quickly investigate alarm information, conditions, etc. within the plant 10. A high level graphical view 750 of the plant 10 may include an alarm banner 760 having one or more pending alarms. Each of the alarms within the alarm banner may be represented using an alphanumeric indicator that is uniquely associated with the device or other entity which generated the alarm or event. Additionally, each of the alarms within the banner 760 may also include an information button 770, which may be selected by a user to generate a pop-up window 775 containing more detailed information relating to that particular alarm. Further, the user may also select the alphanumeric designator for the device causing a particular alarm to investigate the possible reasons for the alarm. When the alphanumeric designator is selected, a pop-up window 780 may be provided by the GUI. The pop-up window 780 may provide one or more response categories 785, which may facilitate the user's understanding of how a particular alarm should be addressed and within what time frame the alarm should be addressed. By way of example, the pop-up window 780 may indicate that a particular device is no longer communicating, that the device has failed, that the device needs maintenance immediately, or that the device requires maintenance or some other attention soon. Of course more, fewer and/or different response categories may be used instead. The alarm display generated by the GUI at this point may be the integrated display disclosed in U.S. patent application Ser. No. 09/707,580 (filed Nov. 7, 2000) which is hereby expressly incorporated by reference herein. Generally, this alarm display may show process alarms and alerts as well as other types of alarms like maintenance alarms and alerts. Still further, process performance alarms may be displayed to show alarms related to poor process performance. Furthermore, information about the alarm, such a specific information provided in the field 775 of the alarm banner may be sent to the GUI or to the asset utilization suite 50 along with the alarm. As will be understood, the alarm and alert information may come from external data sources in the manner indicated above with respect to FIGS. 3–6.

Figure 13:
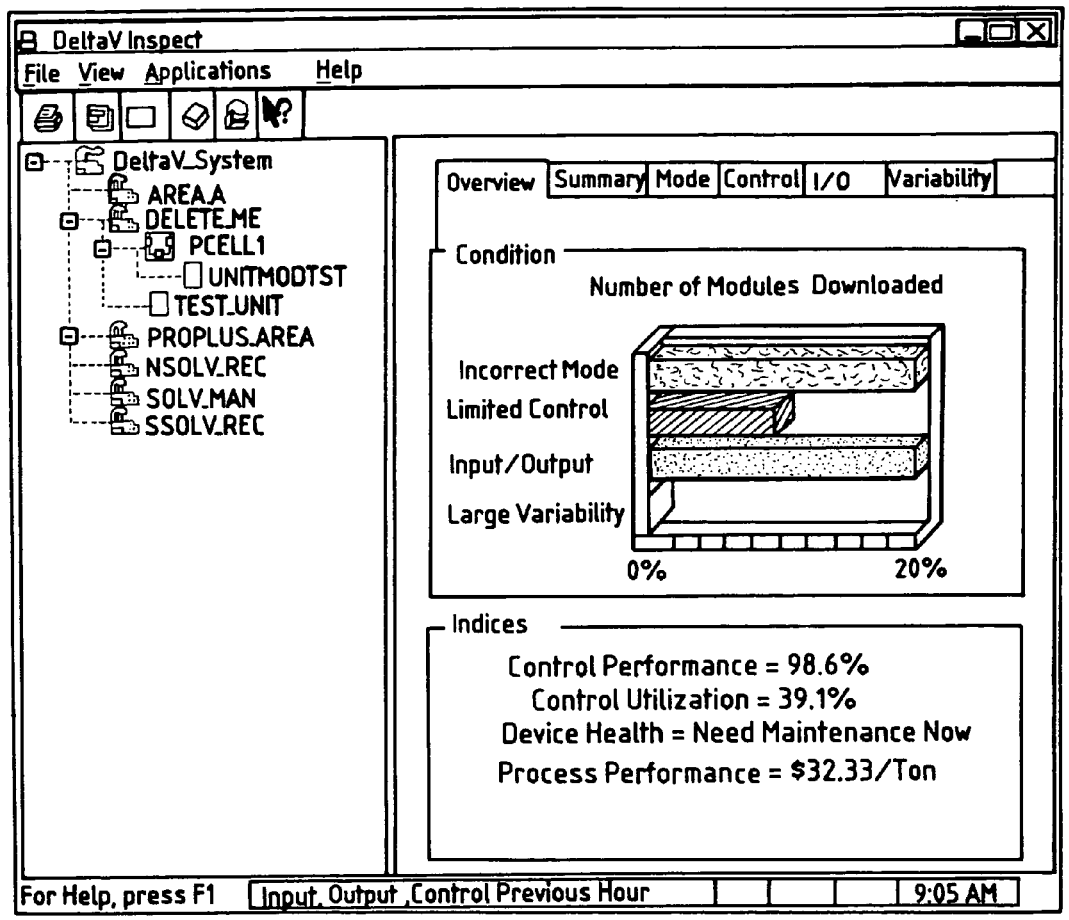
FIG. 13 is an exemplary depiction of a diagnostic display that may be provided by a graphical user interface that enables a user to analyze the performance and/or status of one or more process control loops or other process control entities using data collected from different data sources.
Figure 14:
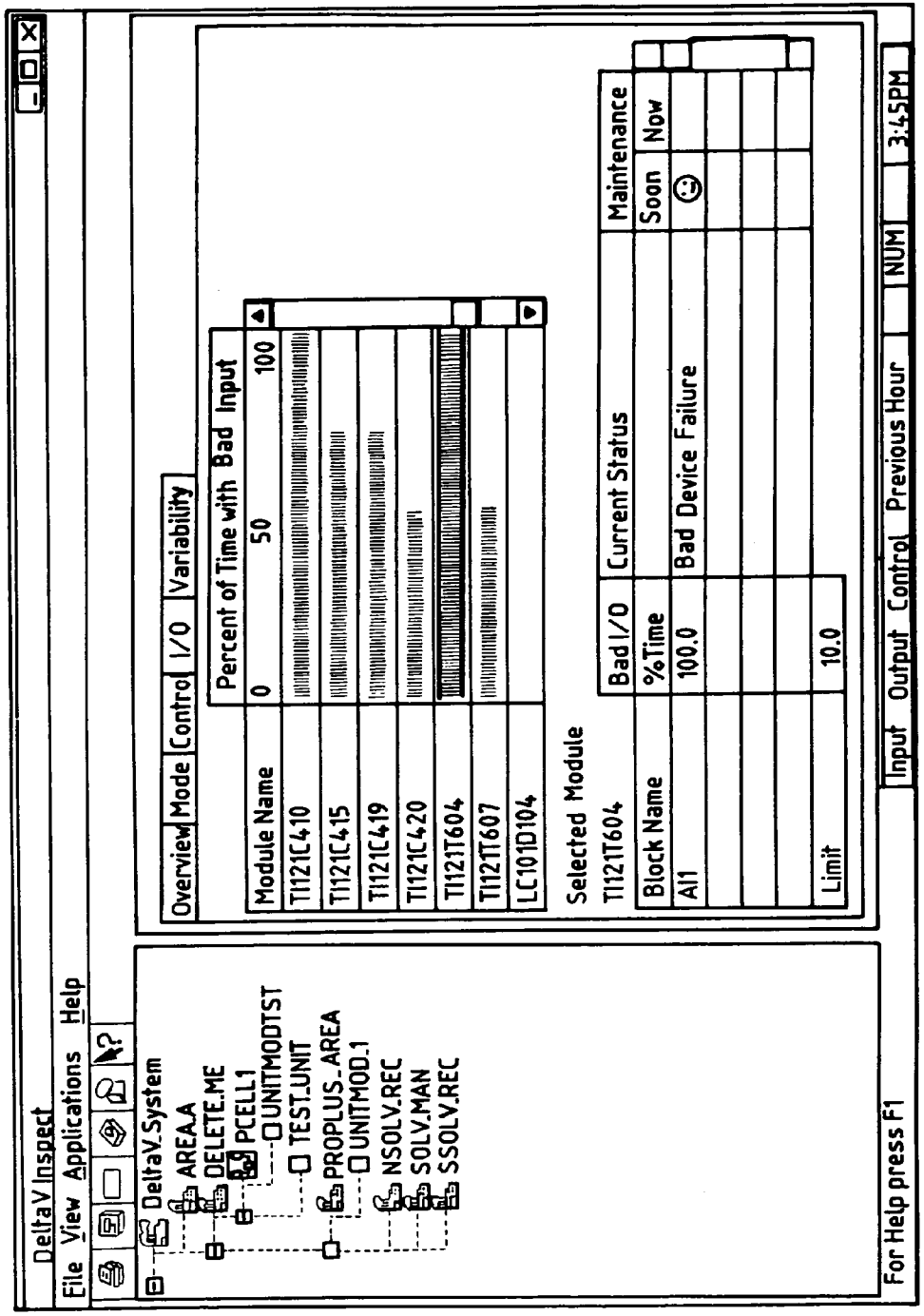
FIG. 14 is an exemplary depiction of a diagnostic display that may be provided by a graphical user interface that enables a user to analyze the performance and/or status of one or more process control loops or other process control entities.

FIGS. 13 and 14 depict further displays which may be produced by the GUI to provide additional information related to control performance, control utilization, device health or process performance. In particular, referring to FIG. 13, the left-hand side shows a tree structure having hierarchical information about the process control plant, including a DeltaV system (which is a controller system), an "Area A," a "Pro-Plus" area as well as additional higher level elements within the process control plant. Selecting some of these elements such as DeltaV system will provide further information related to the devices or control systems or other performance characteristics of the selected element. On the right-hand side of FIG. 13, an expert engine has collected and displayed information regarding diagnostics of the selected DeltaV system including the number of modules (in this case 42) which are within the incorrect mode, the number of modules which have exhibited limited control, the number of modules having had input/output problems and the number of modules having large variability. Again, the data used to create this screen may come from external data sources through the data collection and distribution system described herein. Still further, control performance, control utilization, device health and process performance measures developed from one or more of the control data, device data and performance data are illustrated at the bottom of the display of FIG. 12.

Referring to FIG. 14, more information about the same system in terms of the modules with bad input/output is displayed as another lower level display. Here the right side of the display shows particular module names and the percentage of time each has had bad input. This screen also shows a list of alarms generated and, in particular, that an alarm for a block AI1 exists as the block AI1 is having bad input 100% of the time due to a device failure. This display also illustrates that the device needs maintenance soon. Of course these and other types of user interface screens could be provided for any or all of the information pertaining to device health, variability, status, etc. The displays of FIGS. 13 and 14 may be generated by a diagnostic control routine such as that disclosed in the U.S. patent application Ser. Nos. 09/256,585 and 09/499,445.

Figure 15:
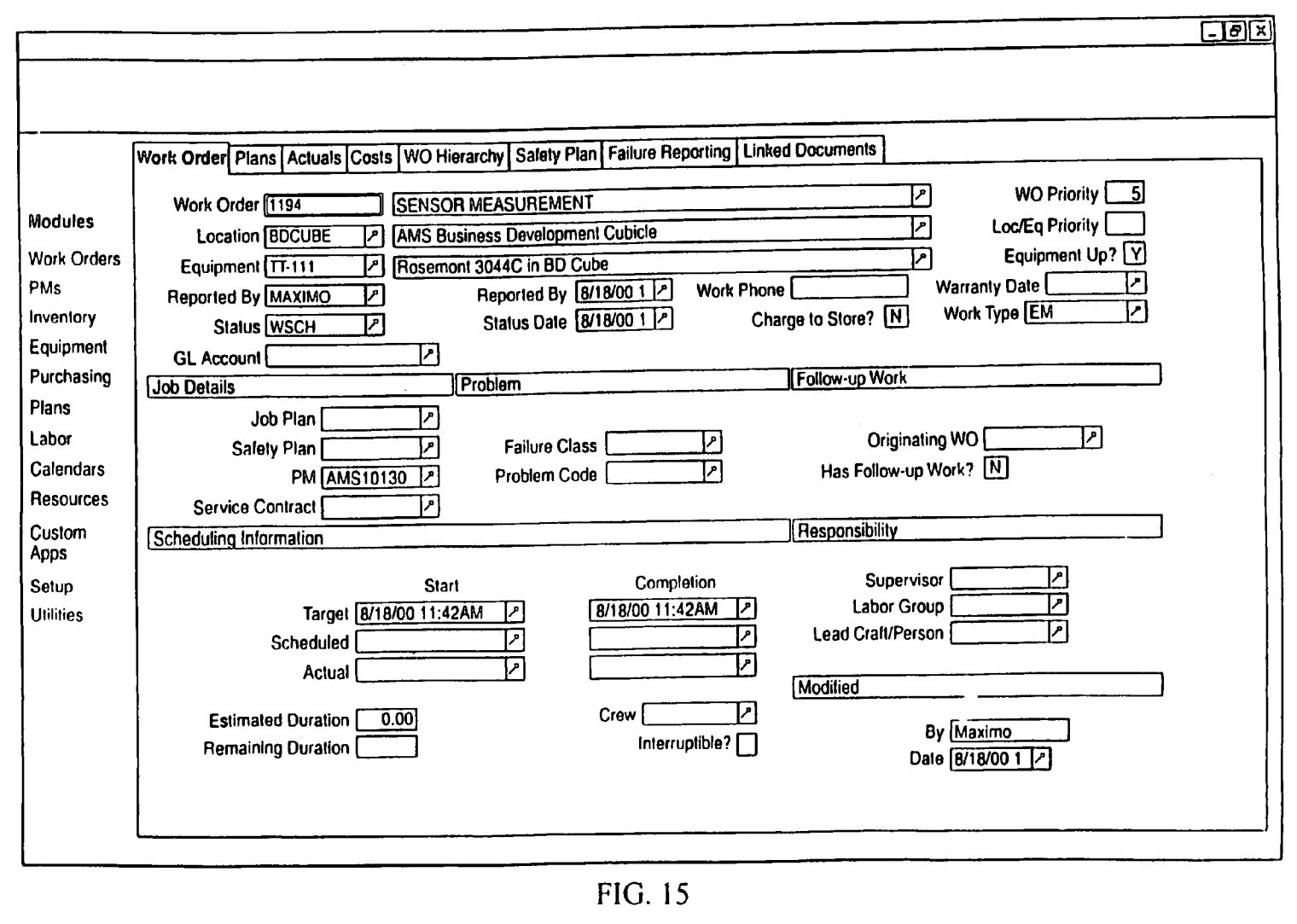

FIG. 15 is still another exemplary depiction of a display that may be provided by the GUI which enables a user to track work orders which may have been automatically generated by the work order generation routine 270. The asset utilization suite 50 may provide data to the work order generator routine 270 which causes that routine to automatically generate work orders in response to a problem or potential problem discovered or recognized by the asset utilization suite 50 and/or a user working with the asset utilization suite 50 via the GUI. For example, the asset utilization suite 50 may receive diagnostic information, maintenance requests, etc. from internal and external data sources and, in response, may cause the maintenance system to generate a work order that requests a maintenance person to attend to one or more problems in connection with the diagnostic information. Of course, the specifics of the work order generated will depend on the type of problem or situation detected and the standard forms used to correct the problem, such as ordering parts, supplies, etc.

Still further, the work order generation routine 270 could include a business to business communication function that, based on detected actual or predicted problems within the plant 10, will automatically communicate with a supplier or other business to order parts, supplies, etc. with or without operator or maintenance person intervention. More particularly, the routine 270 can receive notifications of current problems or predicted future problems with devices or other assets based on data provided by or predictions made by the asset utilization suite 50 or any of the data analysis tools, such as the rotating equipment analysis tools. The routine 270 then automatically contacts a supplier via, for example an internet, telephone or other communication connection and orders the parts, equipment or supplies to be delivered to the plant 10 before the device needs to be replaced. In this manner, the work order generation routine 270 limits the down time or helps to assure that there is little or no down time caused by the need to wait for parts, equipment or supplies to fix the problem when it actually occurs. This fact, then makes the plant 10 more efficient.

Figure 16:
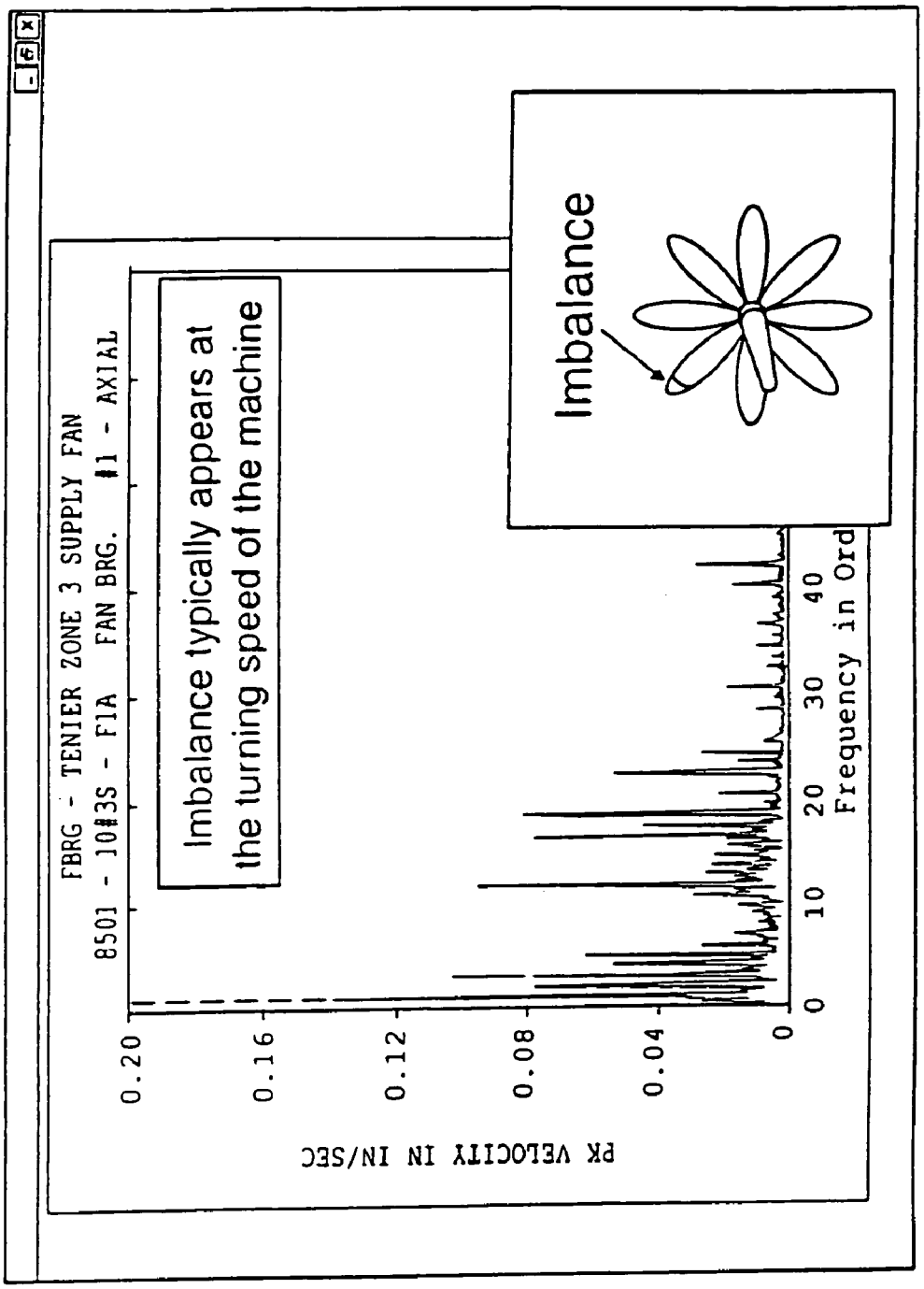
FIG. 16 illustrates a display showing a spectral plot of vibration of an element within a rotary device that may have been generated by an external data source.

Referring now to FIG. 16, the GUI can provide other screens to a user to indicate current or future problems, such as predicted problems, which can be detected by the asset utilization suite 50 or any of the data analysis tools within the plant 10 such as data analysis tools associated with remote data sources. In particular, FIG. 16 illustrates a display showing spectral plots of vibration of an element, such as a shaft, within a rotary device performed by the vibration analysis programs 23 of FIG. 1 and conditions or problems detected by the analysis tool based on these plots. Of course other conditions for rotary or other devices based on the results of data analysis tools can also be displayed. Still further, the results of these tools can be used to cause the work order generation routine 270 to automatically order replacement parts and/or to order or schedule work (such as repair or maintenance) to be performed within the plant 10.

While the data collection and distribution system 102 and the asset utilization suite 50 and other process elements have been described as preferably being implemented in software, they may be implemented in hardware, firmware, etc., and may be implemented by any other processor associated with the process control system 10. Thus, the elements described herein may be implemented in a standard multi-purpose CPU or on specifically designed hardware or firmware such as an application-specific integrated circuit (ASIC) or other hard-wired device as desired. When implemented in software, the software routine may be stored in any computer readable memory such as on a magnetic disk, a laser disk, or other storage medium, in a RAM or ROM of a computer or processor, in any database, etc. Likewise, this software may be delivered to a user or a process control plant via any known or desired delivery method including, for example, on a computer readable disk or other transportable computer storage mechanism or over a communication channel such as a telephone line, the internet, etc. (which are viewed as being the same as or interchangeable with providing such software via a transportable storage medium). Also, while the suite 50 is described as possibly being or using a rule-based expert, other types of expert engines could be used as well, including those which use other known data mining techniques.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A process control system within a plant including:
   process equipment monitoring devices that collect equipment data related to the status of equipment within the plant;
   process control monitoring devices that collect process control data related to the status of process control activities within the plant;
   process models adapted to perform process performance monitoring to generate process performance data related to the performance of the process; and
   a computer system that externally receives the equipment data, the process control data and the process performance data and implements a software routine, wherein the received equipment data, the received process control data and the received process performance data are concurrently available to the software routine and the software routine uses two or more of the received equipment data, the received process control data and the received process performance data to perform a function within the plant.

2. The process control system of claim 1, wherein the function within the plant is a diagnostic function and the software routine is a diagnostic routine that combines two or more of the equipment data, the process control data and the process performance data to perform a diagnostic function.

3. The process control system of claim 2, wherein the software routine includes two or more of a process control diagnostic routine, an equipment monitoring diagnostic routine and a process performance diagnostic routine.

4. The process control system of claim 3, wherein the software routine includes two or more of a process control model, an equipment model and a performance monitoring model.

5. The process control system of claim 2, wherein the diagnostic routine includes a predictive routine that predicts a condition in the future based on two or more of the equipment data, the process control data and the process performance data.

6. The process control system of claim 2, further including a recommendation software routine which makes recommendations to a user in response to a diagnostic decision made by the diagnostic routine.

7. The process control system of claim 2, further including an action software routine which implements one of a control action or a process action based on a diagnostic decision made by the diagnostic routine.

8. The process control system of claim 2, wherein the diagnostic routine performs backtracking based on two or more of the process control data, the equipment data and the process performance data.

9. The process control system of claim 1, wherein the function is a viewing function and the software routine is adapted to create and display a display screen via a display terminal using two or more of the collected equipment data, the process control data and process performance data.

10. The process control system of claim 9, wherein the software routine includes an index creation routine that creates indexes associated with process control components or with equipment components or process performance components and wherein the software routine creates a view of the process control plant displaying the indexes.

11. The process control system of claim 9, wherein the software routine displays two or more of a process control alarm, an equipment alarm and a process performance alarm together on a display screen.

12. The process control system of claim 1, further including one or more data reconciliation applications which process the collected equipment data or the collected process control data or the process performance data.

13. The process control system of claim 12, wherein the equipment data or the process control data or the process performance data is compressed.

14. The process control system of claim 1, wherein the software routine is distributed among two or more computers within the plant.

15. A method of operating a process control system within a plant including the steps of:
   collecting equipment data related to the status of equipment within the plant;
   collecting process control data related to the status of process control activities within the plant;
   collecting process performance data related to the performance of the process;

externally receiving the equipment data, the process control data and the process performance data at a computer system;

causing the received equipment data, the received process control data and the received process performance data to be concurrently available to perform a further function within the plant; and using two or more of the received equipment data, the received process control data and the received process performance data to perform the further function within the plant.

16. The method of claim 15, wherein the further function within the plant is a diagnostic function and the step of using two or more of the equipment data and the process control data and the process performance data includes the step of combining two or more of the equipment data and the process control data and process performance data to perform a diagnostic function.

17. The method of claim 16, wherein the step of combining two or more of the equipment data and the process control data and the process performance data includes the steps of using two or more of a process control diagnostic routine to process the process control data, an equipment monitoring diagnostic routine to process the equipment data and a process performance monitoring routine to process the process performance data.

18. The method of claim 17, wherein the step of combining two or more of the equipment data and the process control data and the process performance data includes the step of using two or more of equipment models, process control models and process performance models.

19. The method of claim 16, wherein the step of combining two or more of the equipment data and the process control data and the process performance data includes the step of predicting a condition in the future based on two or more of the equipment data and the process control data and the process performance data.

20. The method of claim 16, further including the step of recommending one or more actions to a user in response to a diagnostic decision made during the step of combining two or more of the equipment data and the process control data and the process performance data.

21. The method of claim 16, further including the step of implementing one of a control action or a process action based on a diagnostic decision made during the step of combining two or more of the equipment data and the process control data and the process performance data.

22. The method of claim 16, wherein the step of combining two or more of the equipment data and the process control data and the process performance data includes the step of performing backtracking based on two or more of the equipment data and the process control data and the process performance data.

23. The method of claim 15, wherein the function is a viewing function and the step of using two or more of the equipment data and the process control data and the process performance data includes the step of creating a display screen using two or more of the collected equipment data and the process control data and the process performance data.

24. The method of claim 23, wherein the step of using two or more of the equipment data and the process control data and the process performance data include the step of creating one or more indexes associated with process control components or with equipment components or with process performance components and wherein the step of creating a display screen includes the step of creating a view of the process control plant displaying the one or more indexes.

25. The method of claim 23, wherein step of creating a display screen includes the step of displaying two or more of a process control alarm, an equipment alarm and a process performance alarm together on the display screen.

26. The method of claim 15, further including the step of processing the collected equipment data or the collected process control data or the process performance data prior to the step of using two or more of the equipment data and the process control data and the process performance data.

27. The method of claim 15, further including the step of compressing at least a portion of the process control data or the equipment data or the process performance data.

28. A process control system comprising:
multiple process control devices;
one or more controllers;
one or more user interfaces;
one or more data collection routines implemented on processing devices that collect process control data related to the status of process control activities within the plant, equipment data related to the status of equipment within the plant and process performance data generated by process models related to the performance of the process; and
a condition monitoring routine communicatively connected to the data collection routines to externally accept and process the process control data, the equipment data and the process performance data collected by the data collection routines, wherein the process control data, the equipment data and the process performance data are concurrently available to perform condition monitoring within the process control system;
wherein the process control devices, controllers and user interfaces are communicatively connected via one or more communication networks and wherein the data collection routines are configured to transparently accept data from multiple different source types within the process control system.

29. The process control system of claim 28, wherein the multiple different source types includes two or more of hand held collection devices, laboratory chemical and physical measurement sources, direct on line input sources and remote sources.

30. The process control system of claim 28, wherein the process control system is distributed across a geographically distributed network.

31. The process control system of claim 30 wherein at least one of the communication networks is a shared communication channel comprising one of the internet or a satellite communication network.

32. The process control system of claim 30 wherein the data collection routines collect data via a physical medium comprising one of wired, wireless, coaxial cable, telephone modem, fiber optic, optical, meteor burst, satellite medium using one of a Fieldbus, IEEE 802.3, blue tooth, X.25 or X.400 communication protocol.

33. The process control system of claim 28, wherein the data collection routines operate independently and communicate with each other via the one or more communication networks.

34. The process control system of claim 28, wherein each of the data collection routines includes a data processing routine that reconciles, verifies, validates and formats the collected data in a consistent format.

35. The process control system of claim 28, wherein the data collection routines send the collected data to a control system using one of the controllers and one of the user interfaces and wherein the condition monitoring routine reconciles, verifies, validates and formats the collected data in a consistent format.

36. The process control system of claim 35, wherein the condition monitoring routine is stored and executed on a subassembly processor associated with the control system.

37. The process control system of claim 36, wherein the subassembly processor is connected directly to the user interface and the controller of the control system via a system bus.

38. The process control system of claim 36, wherein the controller includes an input/output system adapted to connect the controller of the control system to process control equipment and wherein the subassembly processor is integrated with the controller input/output system.

39. The process control system of claim 38, wherein the data collection routines include a compression routine that compress the collected data.

40. The process control system of claim 39, wherein the compression routine uses a compression technique comprising one of wavelet signal representation, Fourier, Hadamard transformation and communication of the coefficients, exception processing, and swinging door data compression.

41. A process control system comprising:
multiple process control devices;
one or more controllers;
one or more user interfaces;
a communication network that interconnects the one or more controllers and the one or more user interfaces;
a database that stores equipment and process control strategy configuration information pertaining to the configuration of the process control system;
one or more data collection routines implemented on processing devices that collect process control data related to the status of process control activities within the plant, equipment data related to the status of equipment within the plant and process performance data generated by process models related to the performance of the process;
a condition monitoring routine communicatively connected to the one or more data collection routines to externally accept and process the process control data, the equipment data and the process performance data collected by the data collection routines, wherein the process control data, the equipment data and the process performance data are concurrently available to perform condition monitoring within the process control system; and
a display routine that displays the equipment and process control strategy configuration information associated with the process control system as stored in the database along with condition monitoring information pertaining to or generated by the condition monitoring routine, via the one or more user interfaces.

42. The process control system of claim 41, wherein the display routine displays the equipment and process control strategy configuration information and the condition monitoring information in multiple levels, including a high level presenting information pertaining to different elements of the equipment and process control strategy and one or more lower levels providing more information about individual elements within the high level including condition monitoring information.

43. The process control system of claim 42, wherein the display routine enables a user to go from a higher level layer to a lower level layer by selecting an element within a screen depicting the higher level layer.

* * * * *

UNITED STATES PATENT AND TRADEMARK OFFICE
CERTIFICATE OF CORRECTION

PATENT NO. : 7,206,646 B2
APPLICATION NO. : 09/953811
DATED : April 17, 2007
INVENTOR(S) : Mark J. Nixon et al.

It is certified that error appears in the above-identified patent and that said Letters Patent is hereby corrected as shown below:

On Page 4:

At field (56), Other Publications, 26th reference, "$1_{st}$ 'Plant information" should be -- $1^{st}$ 'Plant Information --.

On Page 5:

At field (56), Other Publications, 49th reference, "controls" should be -- Controls --.

At field (56), Other Publications, add -- Search Report under Section 17 issued by the United Kingdom Patent Office on December 12, 2002. --.

In the Specification:

At Column 8, line 8, "temporary" should be -- temporarily --.

At Column 8, line 27, "temporary" should be -- temporarily --.

At Column 16, line 9, "standard.(common)" should be -- standard (common) --.

At Column 16, line 13, "and method" should be -- and any method --.

At Column 28, line 43, "of devices" should be -- of the devices --.

At Column 32, line 23, "and" should be -- an --.

At Column 32, line 46, "describe" should be -- described --.

At Column 37, line 46, "go" should be -- goes --.

At Column 39, line 2, "principal" should be -- principle --.

UNITED STATES PATENT AND TRADEMARK OFFICE
CERTIFICATE OF CORRECTION

| | | |
|---|---|---|
| PATENT NO. | : 7,206,646 B2 | |
| APPLICATION NO. | : 09/953811 | |
| DATED | : April 17, 2007 | |
| INVENTOR(S) | : Mark J. Nixon et al. | |

It is certified that error appears in the above-identified patent and that said Letters Patent is hereby corrected as shown below:

In the Claims:

At Column 45, line 64, "include" should be -- includes --.

At Column 47, line 21, "compress" should be -- compresses --.

Signed and Sealed this

Twenty Second Day of April, 2008

JON W. DUDAS
*Director of the United States Patent and Trademark Office*